US010402825B2

(12) United States Patent
Song et al.

(10) Patent No.: US 10,402,825 B2
(45) Date of Patent: Sep. 3, 2019

(54) DEVICE, SYSTEM, AND METHOD OF ENHANCING USER PRIVACY AND SECURITY WITHIN A LOCATION-BASED VIRTUAL SOCIAL NETWORKING CONTEXT

(71) Applicant: Kairos Social Solutions, Inc., Dallas, TX (US)

(72) Inventors: Tailim Song, Dallas, TX (US); Dae Yong No, Plano, TX (US); Jin Chul Kim, Flower Mound, TX (US)

(*) Notice: Subject to any disclaimer, the term of this patent is extended or adjusted under 35 U.S.C. 154(b) by 713 days.

(21) Appl. No.: 14/972,348

(22) Filed: Dec. 17, 2015

(65) Prior Publication Data

US 2016/0104253 A1  Apr. 14, 2016

Related U.S. Application Data

(63) Continuation-in-part of application No. 14/492,151, filed on Sep. 22, 2014, now Pat. No. 9,245,282.

(Continued)

(51) Int. Cl.
*G06Q 20/40* (2012.01)
*G06Q 20/04* (2012.01)
(Continued)

(52) U.S. Cl.
CPC ........... *G06Q 20/40* (2013.01); *A63F 13/213* (2014.09); *A63F 13/323* (2014.09); *A63F 13/71* (2014.09);
(Continued)

(58) Field of Classification Search
CPC ...... A63F 13/213; A63F 13/323; A63F 13/71; G06F 21/6245; G06F 3/0481;
(Continued)

(56) References Cited

U.S. PATENT DOCUMENTS 3,950,015 A * 4/1976 Shrock .................. B42D 25/29
 283/70
8,572,711 B1 * 10/2013 Klau ................... H04L 63/0807
 726/29

(Continued)

OTHER PUBLICATIONS

Namiot, Dmitry, and Manfred Sneps-Sneppe. "A new approach to advertising in social networks-business-centric check-ins." 2011 15th International Conference on Intelligence in Next Generation Networks. IEEE, 2011.*

*Primary Examiner* — Asfand M Sheikh

(57) ABSTRACT

Via a graphical user interface on a first mobile computing device of a first user, the first user is prompted to upload a first electronic photograph representing an appearance of the first user who is a participant of a virtual social network. Via the graphical user interface, the first electronic photograph uploaded by the first user is received. From a second user who is also a participant of the virtual social network, an electronic voucher is received. The electronic voucher is redeemable for a merchandise item that is offered by a physical venue, the physical venue corresponds to the virtual social network. A screen is generated that contains both the electronic voucher and the first electronic photograph. An electronic scan of the electronic voucher is detected. An electronic transaction is completed, in which the merchandise item is redeemed in response to the electronic scan of the electronic voucher.

20 Claims, 60 Drawing Sheets

Related U.S. Application Data

(60) Provisional application No. 61/882,616, filed on Sep. 25, 2013.

(51) Int. Cl.

| | | |
|---|---|---|
| *G06Q 20/32* | (2012.01) | |
| *G06Q 30/02* | (2012.01) | |
| *G06Q 30/06* | (2012.01) | |
| *G06Q 50/00* | (2012.01) | |
| *G06Q 50/12* | (2012.01) | |
| *A63F 13/213* | (2014.01) | |
| *A63F 13/323* | (2014.01) | |
| *A63F 13/71* | (2014.01) | |
| *G06F 3/0481* | (2013.01) | |
| *G06F 3/0482* | (2013.01) | |
| *G06F 3/0485* | (2013.01) | |
| *G06F 21/62* | (2013.01) | |
| *G06Q 10/08* | (2012.01) | |
| *G06Q 20/12* | (2012.01) | |
| *H04L 12/58* | (2006.01) | |
| *H04L 29/06* | (2006.01) | |
| *H04W 4/02* | (2018.01) | |
| *H04W 4/021* | (2018.01) | |
| *H04W 4/08* | (2009.01) | |
| *H04W 4/21* | (2018.01) | |
| *G06F 3/0484* | (2013.01) | |
| *H04W 4/04* | (2009.01) | |

(52) U.S. Cl.
CPC .......... *G06F 3/0481* (2013.01); *G06F 3/0482* (2013.01); *G06F 3/0485* (2013.01); *G06F 3/04842* (2013.01); *G06F 21/6236* (2013.01); *G06F 21/6245* (2013.01); *G06Q 10/087* (2013.01); *G06Q 20/042* (2013.01); *G06Q 20/045* (2013.01); *G06Q 20/12* (2013.01); *G06Q 20/123* (2013.01); *G06Q 20/32* (2013.01); *G06Q 20/3224* (2013.01); *G06Q 20/3274* (2013.01); *G06Q 30/0267* (2013.01); *G06Q 30/0619* (2013.01); *G06Q 50/01* (2013.01); *G06Q 50/12* (2013.01); *H04L 51/32* (2013.01); *H04L 65/403* (2013.01); *H04W 4/02* (2013.01); *H04W 4/021* (2013.01); *H04W 4/04* (2013.01); *H04W 4/08* (2013.01); *H04W 4/21* (2018.02); *G06F 2221/2111* (2013.01)

(58) Field of Classification Search
CPC .. G06F 3/0482; G06F 3/04842; G06F 3/0485; G06F 21/6236; G06F 2221/2111; G06Q 10/087; G06Q 20/042; G06Q 20/12; G06Q 20/123; G06Q 20/32; G06Q 20/3224; G06Q 30/0267; G06Q 30/30; G06Q 30/0619; G06Q 50/01; G06Q 50/12; G06Q 20/45; G06Q 30/3274; G06Q 20/40; H04L 51/32; H04L 65/403; H04W 4/21; H04W 4/02; H04W 4/021; H04W 4/04; H04W 4/08
See application file for complete search history.

(56) References Cited

U.S. PATENT DOCUMENTS

| | | | | |
|---|---|---|---|---|
| 2002/0095298 | A1* | 7/2002 | Ewing | G06Q 30/02 705/26.1 |
| 2009/0055292 | A1* | 2/2009 | Chong | G06Q 30/0643 705/26.3 |
| 2010/0250372 | A1* | 9/2010 | Smith | G06Q 20/045 705/14.68 |
| 2013/0006848 | A1* | 1/2013 | Kuttuva | G06Q 20/3223 705/39 |
| 2013/0325704 | A1* | 12/2013 | Gorman | G06Q 50/265 705/39 |
| 2014/0040059 | A1* | 2/2014 | Barabas | G06Q 30/0601 705/26.1 |
| 2014/0108177 | A1* | 4/2014 | Erke | G06Q 30/0601 705/26.1 |
| 2014/0157333 | A1* | 6/2014 | Daniel | H04N 21/2143 725/81 |
| 2014/0358717 | A1* | 12/2014 | Clark | G06Q 30/0621 705/26.5 |
| 2017/0024699 | A1* | 1/2017 | Millership | G06Q 50/10 |

* cited by examiner

Select a username

Joe Anderson

Select a password

*******

I am a  *man  *woman        seeking a  *man  *woman

What are your favorite drinks?

Scotch
Beer

Feel free to tell us something else about yourself

I work at a law firm. I like playing basketball and poker in my spare time.

Click here to upload a picture of yourself

Fig. 4

Select a username

Joe Anderson

Select a password

********

What handle would you like to user?
(may be different from your username)

AverageJoe

I am a   *man  *woman    seeking a   *man  *woman

What are your favorite drinks?

Scotch

Feel free to tell us something else about yourself

I work at a law firm. I like playing basketball and poker in my spare time.

Click here to upload a picture of yourself

Fig. 5

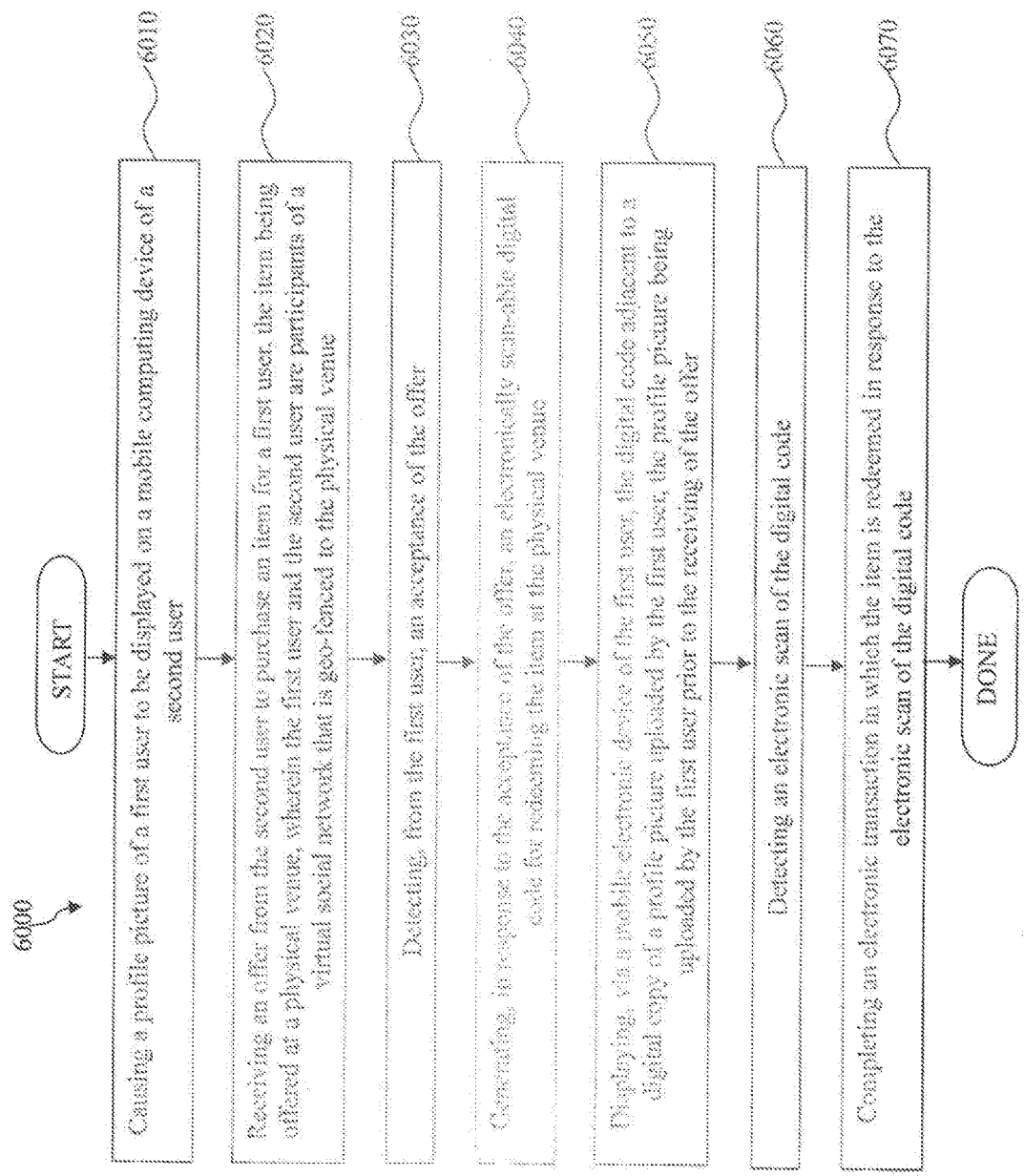

US 10,402,825 B2

DEVICE, SYSTEM, AND METHOD OF ENHANCING USER PRIVACY AND SECURITY WITHIN A LOCATION-BASED VIRTUAL SOCIAL NETWORKING CONTEXT

PRIORITY DATA

The present application is a continuation-in-part patent application of U.S. patent application Ser. No. 14/492,151, filed on Sep. 12, 2014, entitled "Device, System, and Method of Enhancing User Privacy and Security Within a Location-Based Virtual Social Networking Context", which is a utility patent application of provisional U.S. patent application No. 61/882,616, filed on Sep. 25, 2013, entitled "Mobile Social Electronic Commerce Application", the content of each of which is hereby incorporated by reference in their respective entireties.

BACKGROUND

Technical Field

The present disclosure generally relates to using mobile computing devices to engage in social networking.

Related Art

In recent years, the rapid advances in computer technology and broadband telecommunications have enhanced the popularity of mobile computing devices such as smartphones and tablet computers. Among other things, these mobile computing devices can be used to browse the web, play games, music, or videos, take pictures, send/receive emails, etc. However, the capabilities of these mobile computing devices have not been fully explored within a social networking context. For example, users with these mobile computing devices have not been fully able to take advantage of the abilities of the mobile electronic devices' to conduct telecommunications display visual objects, and make payments, within the social networking context.

Therefore, while existing mobile computing devices have been generally adequate for their intended purposes, they have not been entirely satisfactory in every aspect.

SUMMARY

One aspect of the present disclosure is directed to a mobile electronic device. The mobile electronic device includes: a screen configured to display visual content; a computer memory storage module configured to store executable computer programming code; and a computer processor module operatively coupled to the computer memory storage module, wherein the computer processor module is configured to execute the computer programming code to perform the following steps: receiving a request from a user to participate in an electronic social network; prompting, in response to the receiving of the request, a user to upload a digital picture that is representative of the user; receiving an uploaded digital picture in response to the prompting; scanning the uploaded digital picture of the user for human faces; prompting the user to upload a different digital picture that is representative of the user if the scanning indicates that the uploaded digital picture contains no human faces; and prompting the user to identify the human race belonging to the user if the scanning indicates that the uploaded digital picture contains a plurality of human faces.

Another aspect of the present disclosure is directed to a method. The method includes: receiving a request from a user to participate in an electronic social network; prompting, in response to the receiving of the request, a user to upload a digital picture that is representative of the user; receiving an uploaded digital picture in response to the prompting; scanning the uploaded digital picture of the user for human faces; prompting the user to upload a different digital picture that is representative of the user if the scanning indicates that the uploaded digital picture contains no human faces; and prompting the user to identify the human face belonging to the user if the scanning indicates that the uploaded digital picture contains a plurality of human faces.

Another aspect of the present disclosure is directed to a method. The method includes: receiving a request from a user to participate in an electronic social network, wherein the request is received from a mobile computing device of the user; prompting, via the mobile computing device and in response to receiving of the request, a user to upload a digital profile picture; receiving an uploaded digital profile picture in response to the prompting, wherein the receiving of the uploaded digital profile picture comprises one of: receiving a user selection from an existing digital picture album of the user or taking a digital picture of the user via a camera module of the mobile computing device; electronically examining the uploaded digital profile picture; determining, based on the electronically examining, whether one or more human faces are present in the digital profile picture; prompting the user to upload a different digital profile picture if it has been determined that the uploaded digital profile picture contains no human faces; and prompting the user to identify the human face belonging to the user if it has been determined that the uploaded digital picture contains multiple human faces.

Another aspect of the present disclosure is directed to a mobile electronic device. The mobile electronic device includes: a screen configured to display visual content; a computer memory storage module configured to store executable computer programming code; and a computer processor module operatively coupled to the computer memory storage module, wherein the computer processor module is configured to execute the computer programming code to perform the following steps; performing a digital check-in to a venue that is within a predefined proximity of the mobile computing device, wherein a plurality of users have already digitally checked into the venue via their respective mobile computing devices; displaying, on the screen of the mobile computing device, respective digital profiles of a first subset of the users; designating, in response to input from an operator of the mobile computing device, rate or more users who are within the first subset of the users as favorite users; and displaying, on the screen of the mobile computing device, respective digital profiles of a second subset of the users, wherein the second subset of the users includes the designated favorite user and users who are not within the first subset.

Another aspect of the present disclosure is directed to a method. The method includes: performing, via a mobile computing device of a first user, a digital check-in to a venue that is within a predefined proximity of the first user, wherein a plurality of other users have already digitally checked into the venue; displaying, on a screen of the mobile computing device of the first user, respective digital profiles of a first subset of the other users; designating, in response to input from the first user, one or more second users who are within the first subset of the other users as favorite users; and displaying, on the screen of the mobile computing device of the first user, respective digital profiles of a second subset of the other users, wherein the second subset of the other users include the designated favorite user and users who are not within the first subset.

Another aspect of the present disclosure is directed to a method. The method includes: establishing, at least in part via a radio component of a mobile computing device of a first user, a wireless link with a venue that is within a predefined proximity of the first user, wherein the venue has a plurality of wireless links established with a plurality of second users; obtaining, from the first user, a preferred gender for the second users for viewing on the screen of the mobile computing device; displaying, on a screen of the mobile computing device of the first user, respective digital pictures of a first group of the second users belonging to the preferred gender, selecting one or more favorite users from the second users in response to input from the first user; displaying a symbol on, or adjacent to, the digital picture of each of the one or more favorite users; displaying, on the screen of the mobile computing device of the first user, respective digital pictures of the one or more favorite users and a second group of the second users belonging to the preferred gender, wherein non of the second users in the second group belong to the first group; and displaying, on the screen of the mobile computing device of the first user, the digital pictures of only the one or more favorite users.

Another aspect of the present disclosure is directed to a mobile electronic device. The mobile electronic device includes: a screen configured to display visual content; a computer memory storage module, configured to store executable computer programming code; and a computer processor module operatively coupled to the computer memory storage module, wherein the computer processor module is configured to execute the computer programming code to performing the following steps: performing a digital check-in to a venue that is within a physical proximity of a first user of the mobile computing device; accessing, after the digital check-in, a digital menu that contains a list of drinks available at the venue; displaying the digital menu to the first user via the screen; designating, in response to selection from the first user, one or more drinks from the digital menu as preferred drinks of the first user; and electronically communicating the first user's preference of the one or more drinks to another electronic device.

Another aspect of the present disclosure is directed to a method. The method includes: performing, via a mobile computing device of a first user, a digital check-in to a venue that is within a physical proximity of the first user; accessing, after the digital check-in, a digital menu that contains a list of drinks available at the venue; displaying the digital menu to the first user via a screen of the mobile computing device; designating, in response to selection from the first user, one or more drinks from the digital menu as preferred drinks of the first user; and electronically communicating the first user's preference of the one or more drinks to another electronic device.

Another aspect of the present disclosure is directed to a method. The method includes: detecting, from a first mobile computing device of a first user, a digital check-in to a venue that is within proximity of the first user, wherein the venue offers a digital menu that includes a list of available drinks; receiving, from the first mobile computing device, one or more preferred drinks from the first user, the one or more preferred drinks being a subset of the list of available drinks; electronically associating the one or more preferred drinks with the first user; detecting, from a second mobile computing device of a second user, a request from the second user to electronically communicate with the first user; and causing, in response to the request, the one or more preferred drinks to be displayed with graphical emphasis on a screen of the second mobile computing device.

Another aspect of the present disclosure is directed to a mobile electronic device. The mobile electronic device includes: a radio component configured to conduct telecommunications with external devices; a screen configured to display visual content; a computer memory storage module configured to store executable computer programming code; and a computer processor module operatively coupled to the computer memory storage module, wherein the computer processor module is configured to execute the computer programming code to perform the following steps: receiving a request from a first user of the mobile computing device to participate in a location-based virtual social network; detecting, at least in part via the radio component, one or more venues within proximity of the first user, wherein each venue includes a host of a respective virtual social network; selecting, in response to input from the first user, one of the venues in which to participate in the virtual social network; establishing, at least in part via the radio component, a wireless connection with the virtual social network at the selected venue; conducting electronic communications with one or more second users at the selected venue who are also participants of the virtual social network via their respective mobile computing devices; thereafter detecting a departure of the first user from the selected venue; and erasing from the first mobile computing device, in response to the detected departure, electronic records pertaining to the conducted electronic communications with the one or more second users.

Another aspect of the present disclosure is directed to a method. The method includes: receiving, via a first mobile computing device of a first user, a request from the first user to participate in a location-based virtual social network; detecting, at least in part via a radio component of the first mobile computing device, one or more venues within proximity of the first mobile computing device, wherein each venue includes a host of a respective virtual social network; selecting, in response to input from the first user, one of the venues in which to participate in the virtual social network; establishing, at least in pan via the radio component of the first mobile computing device, a wireless connection with the virtual social network at the selected venue; conducting electronic communications with one or more second users at the selected venue who are also participants of the virtual social network via their respective mobile computing devices; thereafter detecting a departure of the first user from the selected venue; and erasing from the first mobile computing device, in response to the detected departure, electronic records pertaining to the conducted electronic communications with the one or more second users.

Another aspect of the present disclosure is directed to a method. The method includes: receiving, via a first mobile computing device of a first user, a request from the first user to participate in a location-based virtual social network; detecting, at least in part via a radio component of the first mobile computing device, one or more venues within proximity of the first mobile computing device, wherein each venue includes a host of a respective virtual social network; selecting, in response to input from the first user, one of the venues in which to participate in the virtual social network; wirelessly connecting, at least in part via the radio component of the first mobile computing device, with the virtual social network at the selected venue; conducting electronic communication with a plurality of second users at the selected venue who are also participants of the virtual social network via their respective mobile computing devices, wherein the electronic communication comprises: making a digital profile of the first user available for viewing on respective mobile computing devices of the second users; placing one of the second users in a blacklist in response to a request from the first user; and thereafter causing the digital profile of the first user to be unviewable on the mobile computing device of the second user in the blacklist; thereafter detecting one of the following: a departure of the first user from the selected venue, or an excessive period of time in which the first mobile computing device has maintained the wireless connection with the virtual social network at the selected venue; and erasing from the first mobile computing device, in response to the detecting, electronic records pertaining to the conducted electronic communications with the one or more second users.

BRIEF DESCRIPTION OF THE DRAWINGS

FIGS. 1-44 are diagrammatic views of one or more example mobile computing devices at various stages of participation with an electronic virtual social network according to various aspects of the present disclosure.

FIGS. 59-60 are flowcharts illustrating various example methods for using the mobile computing device to facilitate a user's participation on the electronic virtual social network according to various aspects of the present disclosure.

DETAILED DESCRIPTION

Figure 1:
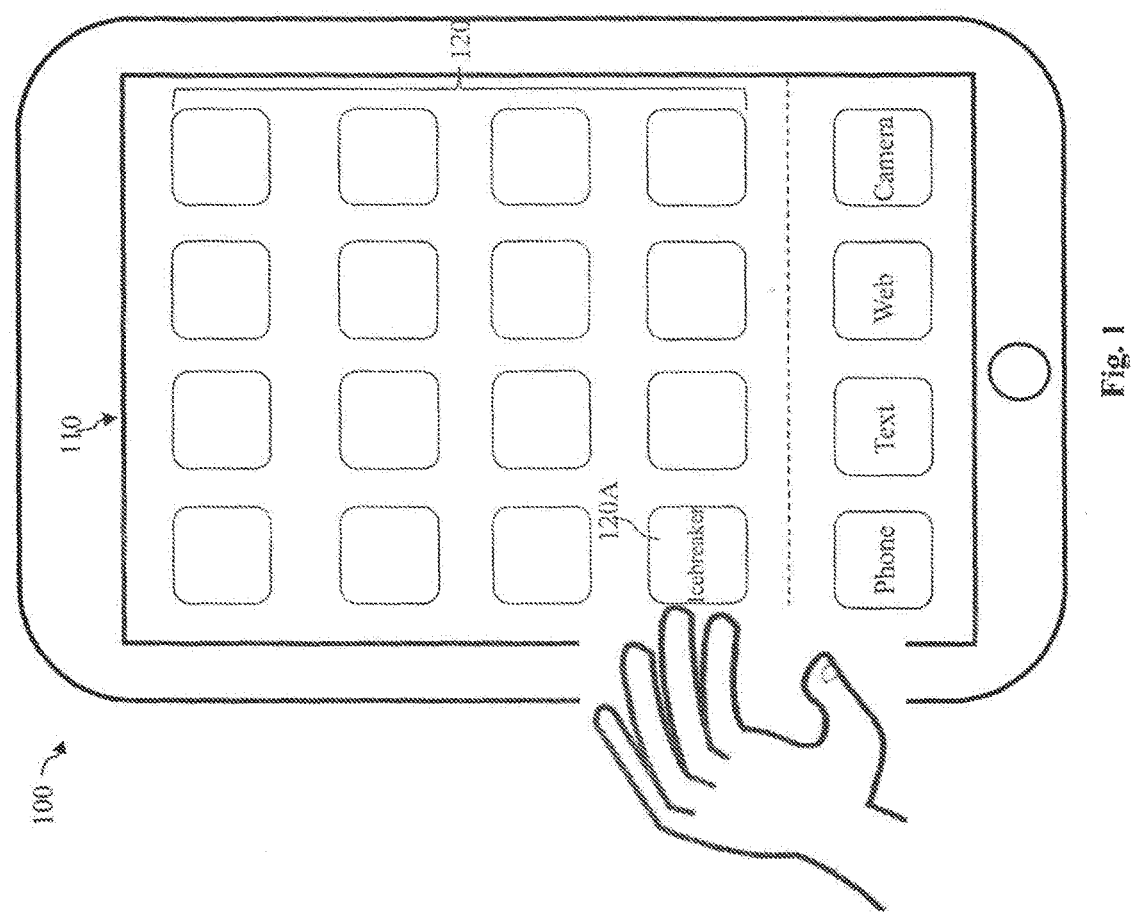

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity. In addition, the present disclosure may repeat reference numerals and/or letters in the various examples. This repetition is for the purpose of simplicity and clarity and does not in itself dictate a relationship between the various embodiments and/or configurations discussed As used herein, the term "about" refers to a +/−5% variation from the nominal value. As used herein, the term "and/or" includes any and all combinations of one or more of the associated listed items. As used herein, the singular forms "a", "an", and "the" are intended to include the plurality forms as well, unless the context clearly and specifically indicates otherwise. In addition, unless defined otherwise all technical and scientific terms used herein have the same meaning as commonly understood by one of ordinary skill in the art to which this disclosure belongs.

In recent years, the rapid advances in computer technology and broadband telecommunications have led the growing popularity of mobile computing devices such as tablet computers and mobile telephones. A user of these mobile computing devices can perform a plurality of tasks on these mobile computing devices, for example tasks that previously required a conventional desktop or laptop computer. Among other things, a user can play movies/videos, browse the web, play games, view photographs, listen to digital music, read e-books, receive navigational instructions, send and receive emails, conduct audio or video telephone calls, perform word processing/spreadsheet calculation/presentation management tasks, or take advantage of additional functionalities offered by applications (apps) that can be downloaded from online app stores.

However, the capabilities of these mobile computing deuces have not been fully explored within a social networking context. For example, users with these mobile computing devices nave not been able to take advantage of the abilities of the mobile electronic devices' to conduct telecommunications display visual objects, and make payments, within the social networking context.

To overcome the problems discussed above, the present disclosure is directed to a mobile computing device with custom software implemented thereon to facilitate social networking electronically, as discussed in greater detail below.

Referring to FIG. 1, a simplified diagrammatic view of a mobile computing device 100 is illustrated. In some embodiments, the mobile computing device 100 may be a smartphone (for example, APPLE's® IPHONE®, an ANDROID® phone, a WINDOWS® phone, or a BLACKBERRY®), a tablet computer (for example, APPLE's® IPAD®, an ANDROID® tablet, a WINDOWS® at powered tablet, or a BLACKBERRY® tablet), or a laptop-tablet hybrid.

In some embodiments, the mobile computing device 100 may include a screen 110 for displaying visual information. The screen 110 may be touch-sensitive. A user may interactively engage with objects shown on the screen 110 by touching the objects with a finger, a stylus, or by hovering over the object. In some embodiment, the user may engage with the objects shown on the screen 110 even while wearing gloves or other clothing.

Visual content may be displayed on the screen 110 once the screen 110 is activated. The visual content may include a plurality of icons, for examples icons 120 that are arranged into rows and columns. Each of these icons 120 may represent an application (app) that can be executed to perform a particular function. These apps 120 may be electronically downloaded from an apps store, as such APPLE's® APP STORE® or GOOGLE's® GOOGLE PLAY®, etc.

One of these apps 120A is the app that includes the custom software that can be executed to facilitate social networking electronically. An example name for the app 120A is "icebreaker," which signifies the app 120A's ability to help the user of the mobile computing device 100 meet or "break the ice" with other users. The user of the mobile computing device 100 may click on the app 120A to launch it. For purposes of the present disclosure, the application 120A may be interchangeably referred to as an electronic (or virtual) social networking game/application or as the icebreaker game/application.

Figure 2:
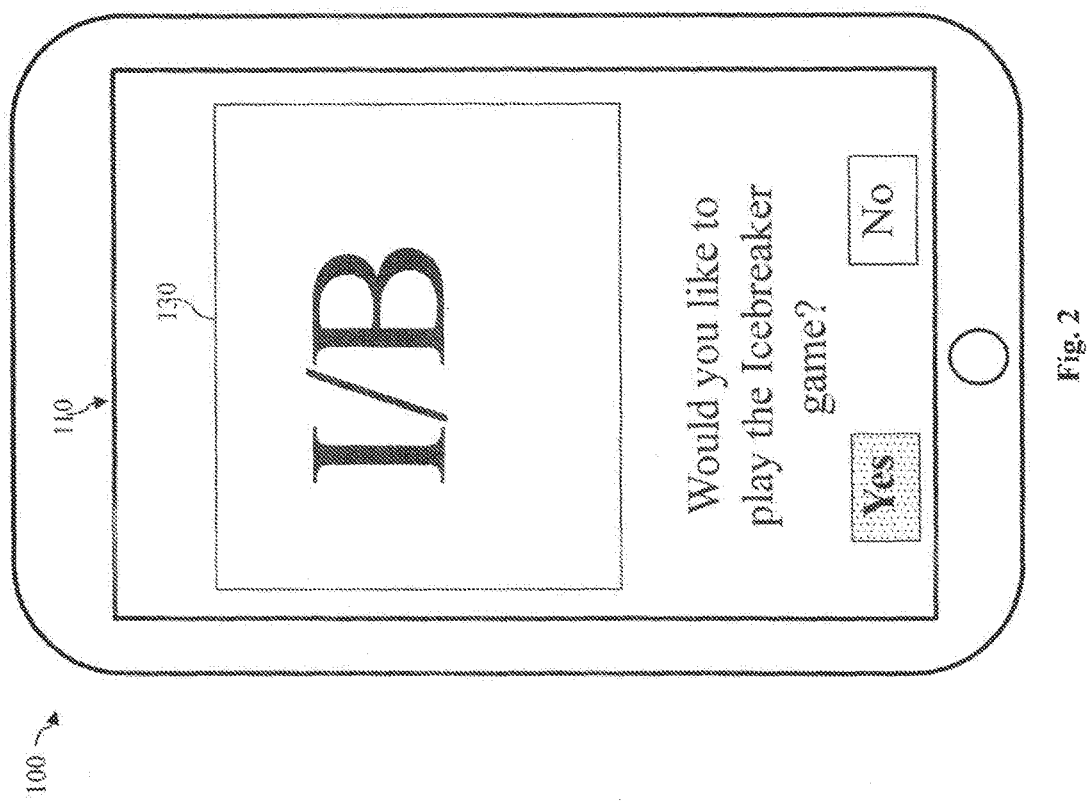

Referring now to FIG. 2, the screen 110 shows the visual content that is displayed to the user when the app 120A is launched. An example logo 130 (e.g., I/B) may be displayed along with text instructions "Would you like to play the Icebreaker game?" The user may click a "yes" button to continue playing the game, or a "no" button to exit the game and return to the previous screen.

Figure 3:
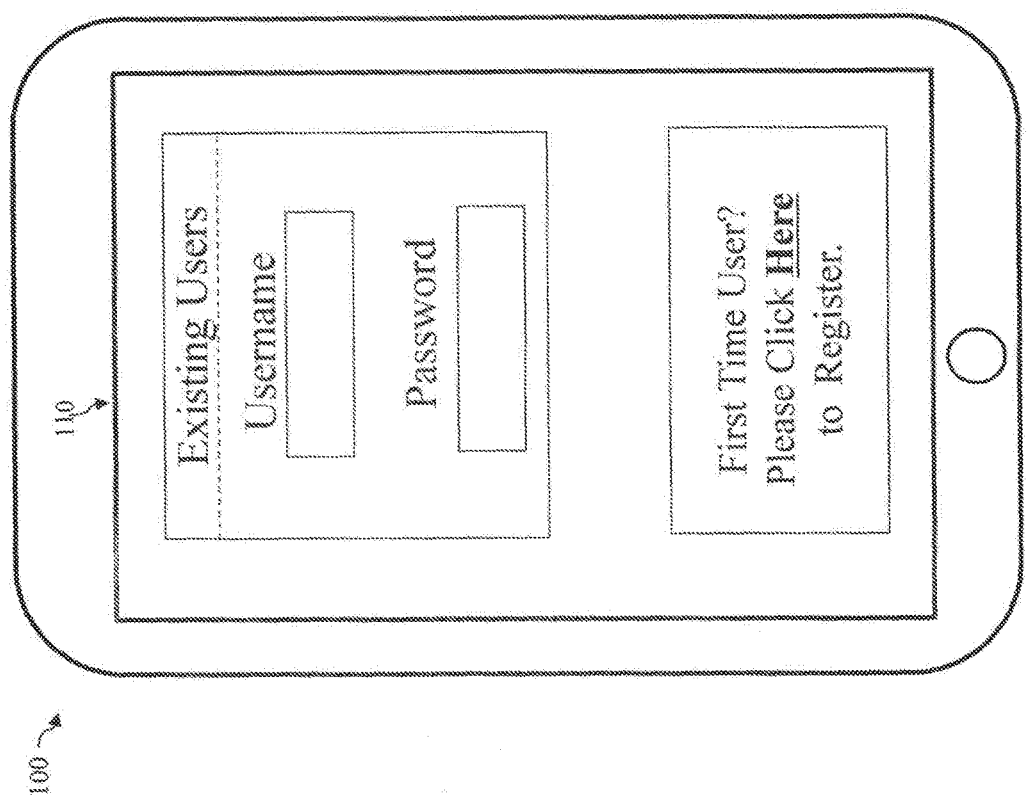

Referring now to FIG. 3, if the user clicked "yes" (on the previous screen) to continue playing the game, existing users will be prompted to enter a username and a password, and first time users will be prompted to register before proceeding further.

FIG. 4 illustrates an example registration screen (also referred to as a profile screen) for a first time user according to one embodiment. As an example, the user herein is a male. He selects a username "AverageJoe" and an appropriate password. He also indicates that he is a "man" seeking a "woman." Optionally, the user may also be allowed to specify one or more of his favorite drinks (such as Scotch and beer) or to say anything else about himself that he would like other users to know. The user may also be allowed to upload one or more pictures of himself by clicking on a link.

FIG. 5 illustrates an example registration screen according to another embodiment. The embodiments shown in FIGS. 4 and 5 are similar, except that the user may also be able to specify a "handle." The handle may be different from the username and may be changed dynamically each time the user plays the game (or even during the game). The handle is what the user will be known as to the other participants or the icebreaker game. Thus, allowing the user to specify a handle that is different from the user name and that can be dynamically changed offers the user more privacy and security. For example, a changeable handle reduces the likelihood of the user being stalked by other users.

Figure 6:
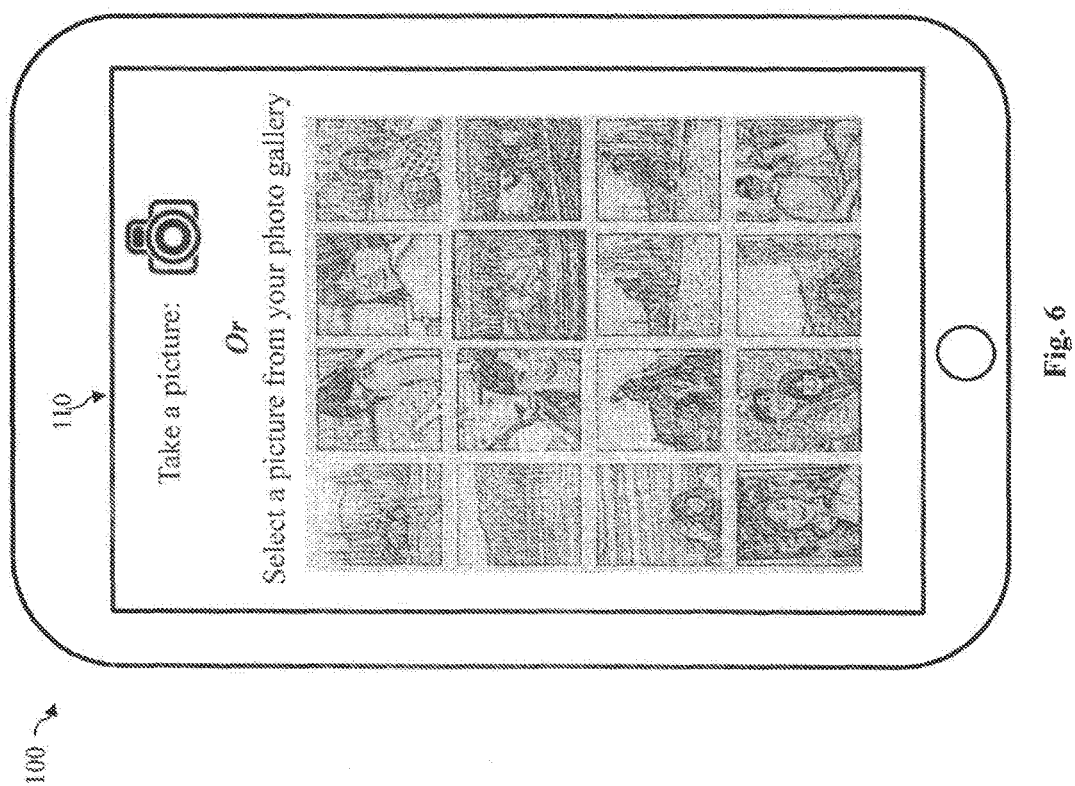

FIG. 6 shows an example picture upload screen in response to the user clicking on the link to upload a picture. The user can select a picture from an existing photo gallery on his mobile computing device 100, or he can take a picture of him using the mobile computing device, which is equipped with a digital camera. The user may be able to crop a digital picture, or add special effects to it, such as turning a color picture into a black and white picture, etc.

Figure 7:
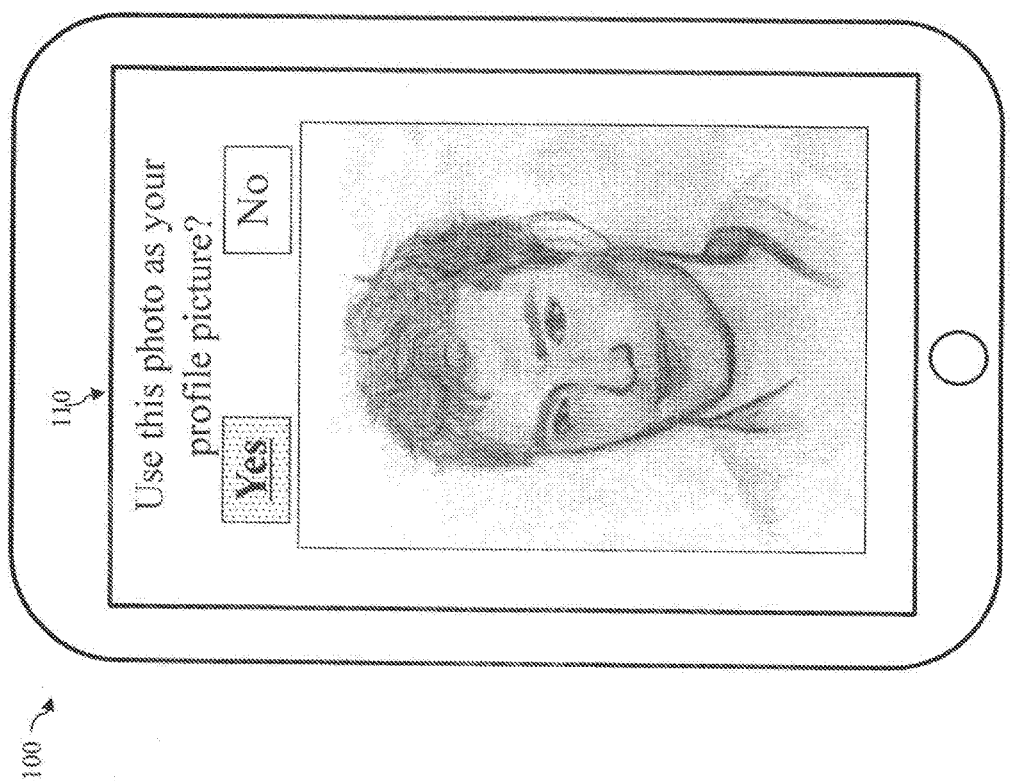

Referring now to FIG. 7, regardless of how the selection is made (i.e., from an existing photo album or from a digital camera), the user selects a digital picture representative of himself to upload. The user will be reminded that this is the digital picture that will appear as his profile picture when the game is played.

Requiring users to upload one or more digital pictures to represent the user is not uncommon in the electronic social networking context. However, one problem for existing social networking applications is that they do not actively monitor or regulate the digital pictures uploaded by its participant users. As a result, some users may choose to upload an inanimate object (such as a building, a mountain, a lake, a car, etc.) to represent themselves.

Figure 8:
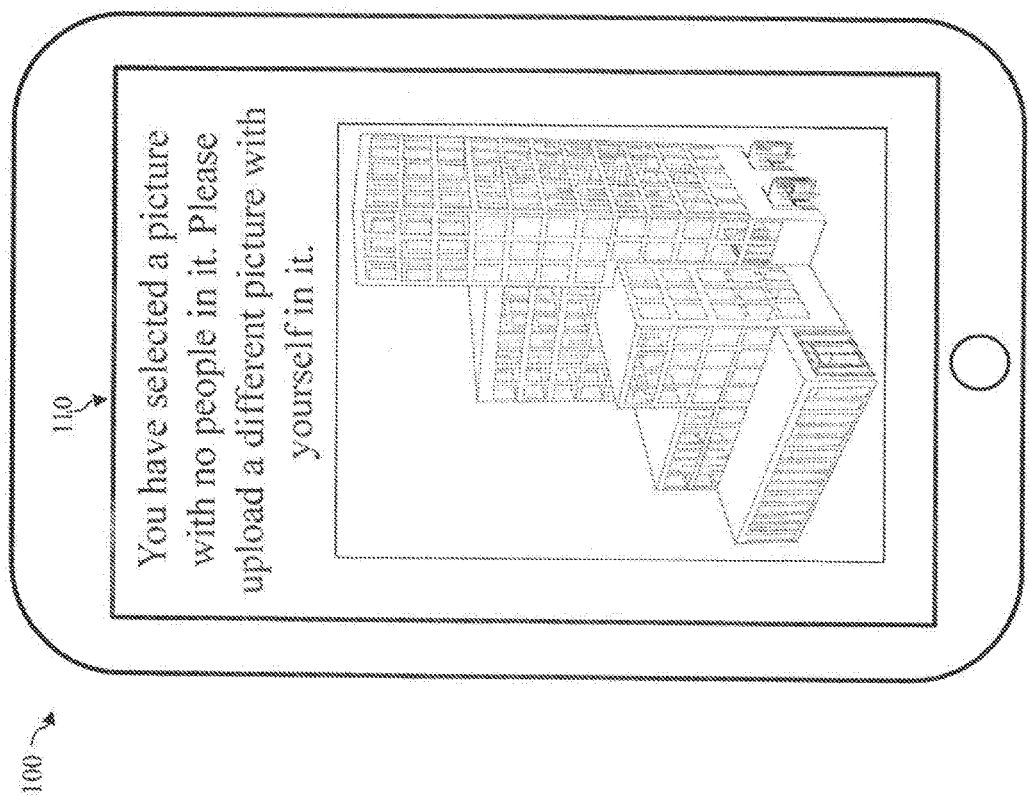

An example of this is illustrated in FIG. 8, where the user has uploaded a building as his profile picture. Having an inanimate object as one's profile picture may be acceptable in some social network contexts, but within the context of the social networking context described in the present application, it is important for the user's digital profile picture be an accurate representation of himself/herself. Using an inanimate object such as a building of a landmark as a user's profile picture within the context of the present application will cause confusion and likely dissatisfaction for other users in the electronic social network.

To remedy this issue, the mobile computing device 100 will perform an electronic scan or examination of the digital picture uploaded by the user to detect whether or not the uploaded digital picture contains a human face. In some embodiments, the detection of a human face is performed by scanning the digital picture for objects that resemble human eyes, for example a pair of closely located objects that represent a pair of human eyes. Of course, the electronic scan may also employ other algorithms to detect a human face, for example algorithms that look for other human facial features such as nose, mouth, ears, or hair. If the result of the scan indicate that no human face is present in the uploaded digital picture, the user will be notified that he/she has uploaded a picture with no people in it, and he/she will be prompted to upload a different picture.

Figure 9:
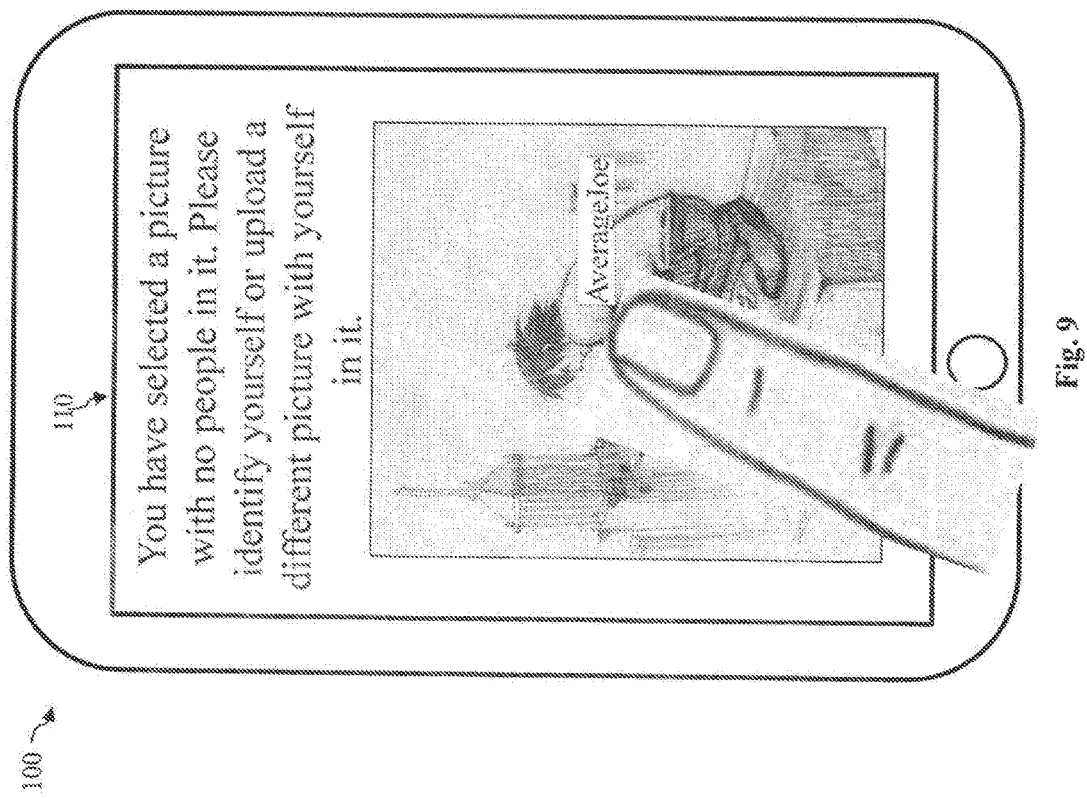

In some embodiments, the user may be given the option of identifying his/her face in the digital picture in case the face detection scan incorrectly determines that no human face is present, when a human face is in face present. For example, referring to FIG. 9, the user AverageJoe has uploaded a picture with his face in it, but the electronic scan has incorrectly determined that the uploaded pictures does not contain a human face. Thus, the user may use his finger or a stylus to touch or pinpoint a region of the digital picture where he is located. This region will be marked and remembered. When the profile picture is eventually displayed on other mobile computing devices (belonging to other risers participating in the electronic social network), the user AverageJoe's handle will be displayed alongside it. By doing so, other users will have a clear idea of who the user AverageJoe is and what he looks like, which will help other users decide on whether or not in (or how to) engage with the user AverageJoe within the context of the electronic social networking game.

Figure 10:
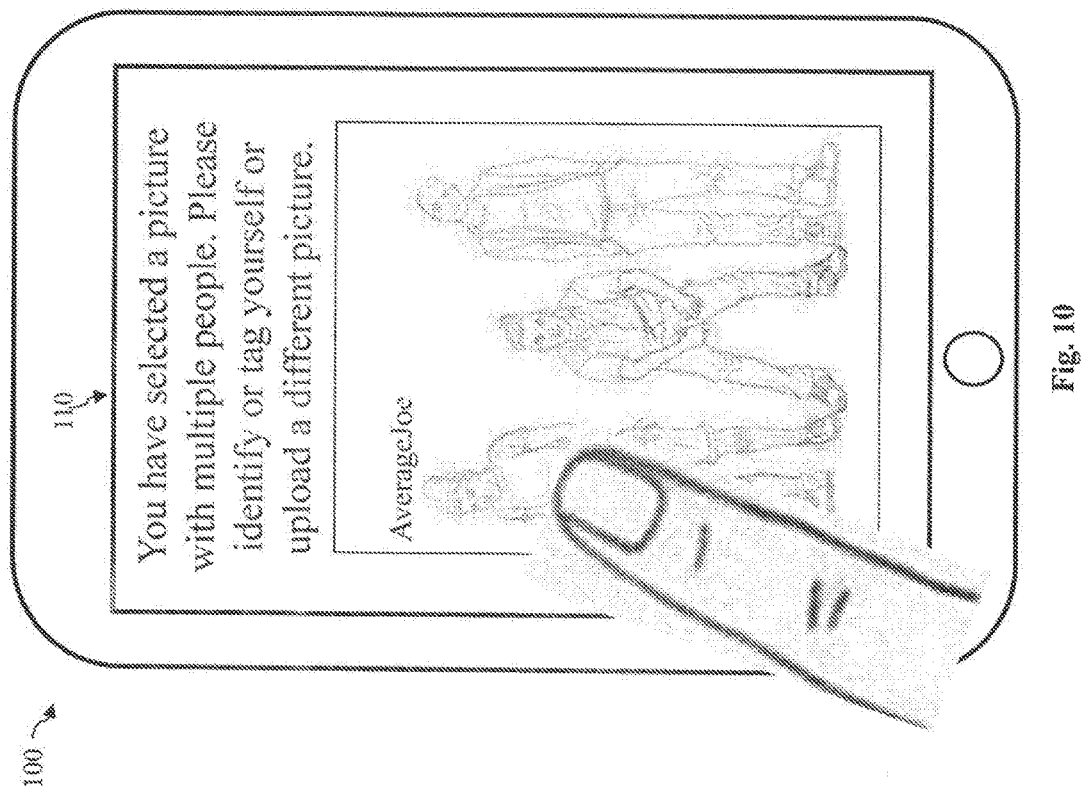

FIG. 10 illustrates another similar example problem that occurs frequently in existing electronic social networking contexts, where a user uploads a profile picture that contains multiple people. As a result, other participants of the electronic social network may get confused as to which person the user actually is. This may prevent other participants from proactively engaging with the user, and even when they do, they may engage the user under false assumptions (i.e., they may think that the user is someone else in the uploaded digital profile picture).

To address this problem, the mobile computing device 100 will perform an electronic scan or examination of the digital picture uploaded by the user to detect how many human faces the uploaded digital picture actually contains. Again, the detection of the human face may be accomplished by electronically scanning the digital picture for objects that resemble human eyes, or other easily recognized facial features on a human face. If the results of the scan indicate that the uploaded digital profile picture contains multiple people, for example three people as shown in the embodiment of FIG. 10, the user will be prompted to either identify himself or upload a different picture. Once again, the user may identify himself by touching (e.g., via a finger or a stylus) the region of the uploaded digital picture where the user is located. This region will be marked accordingly, and the user's handle will be displayed on or adjacent to this region when the digital profile picture of the user is eventually displayed to other participants of the electronic social network. Once again, this will help other users understand who the user AverageJoe is and what he looks like, thereby making it easier for these other participants to decide whether or not to (or how to) engage with the user AverageJoe within the context of the electronic social networking game.

In some embodiments, the user will not be allowed to proceed further with the icebreaker game until he/she has supplied a digital profile picture that contains one and only one human face, presumably the face of the user himself/herself.

Figure 11:
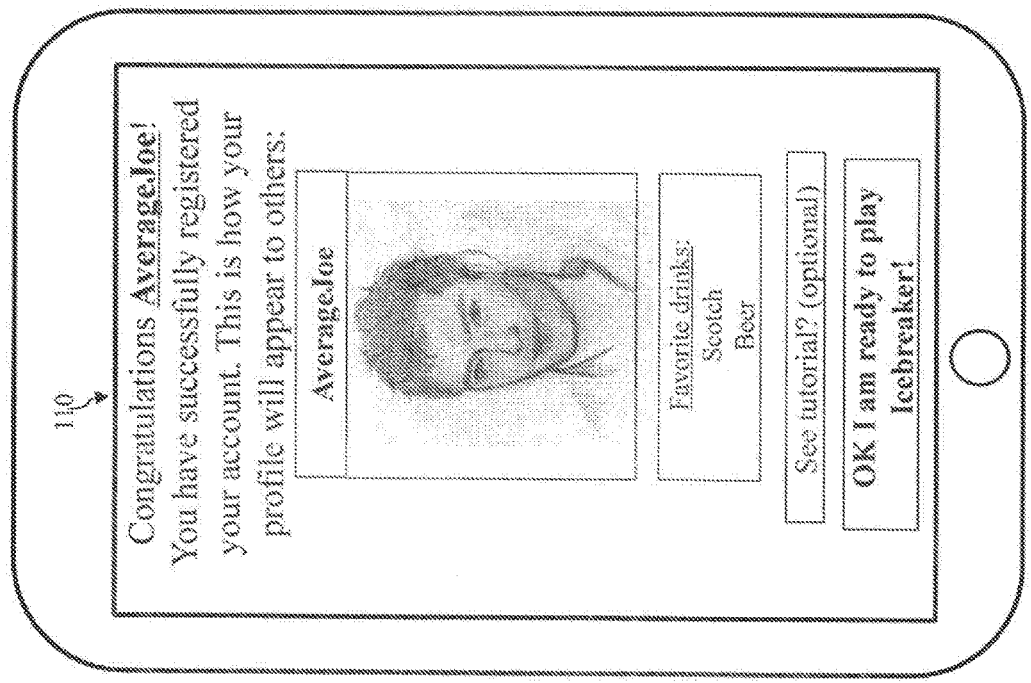

Referring now to FIG. 11, once the user has supplied a satisfactory digital profile picture, he/she is allowed to proceed as a participant on the virtual social network (i.e., icebreaker herein). A tutorial may be optionally displayed to help the user understand how the virtual social network operates.

Figure 12:
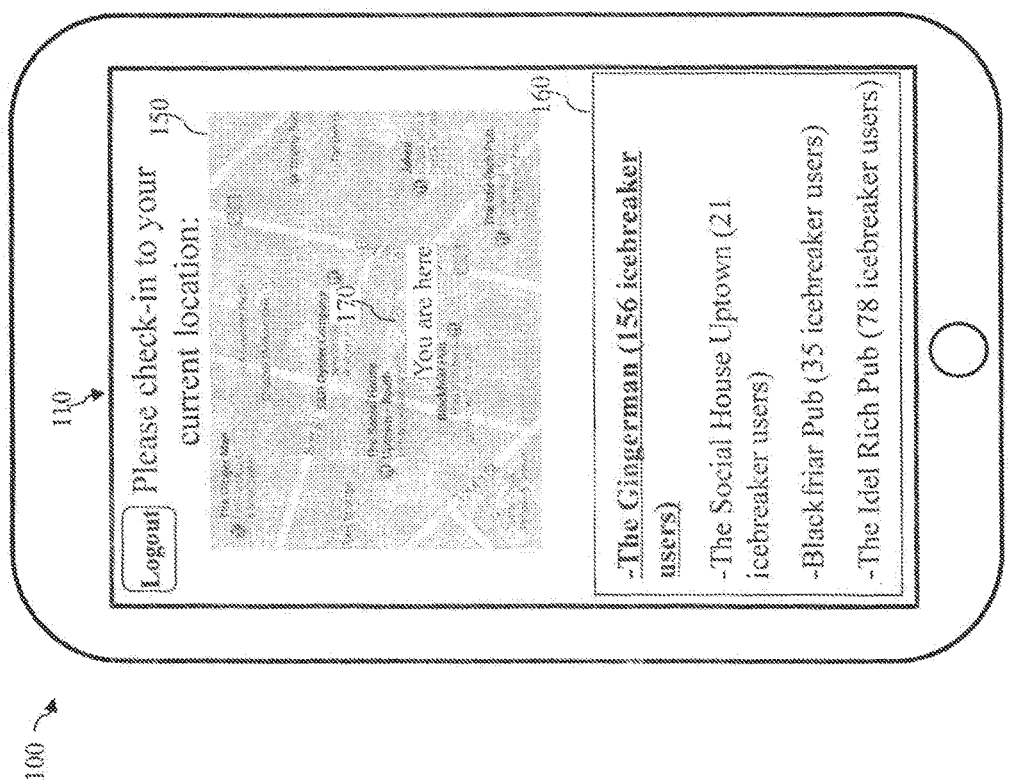

Referring now to FIG. 12, after the user agrees to participate on the virtual social network, the mobile computing device 100 may conduct an electronic search for venues within range of the mobile computing device 100 (and thus within range of the user). For example, the mobile computing device 100 may be equipped with a radio component that contains one or more transceivers, such us a Wi-Fi transceiver. Thus, in some embodiments, the search may be performed at least in part via the Wi-Fi transceiver, which is used by the mobile computing device 100 to search for Wi-Fi networks within range. Alternatively, the search may be done via a global positioning system (GPS) device implemented on the mobile computing device. The GPS device can triangulate the geographical position/location of the mobile computing device 100. The mobile computing device 100 may also have access to electronic map data such as Google Maps or Apple Maps. Based on the triangulated position of the mobile computing device 100, and based on the electronic map data that includes which businesses are nearby the triangulated position of the mobile computing device 100, the mobile computing device 100 can display one or more of the venues that are nearby.

In the context of the present disclosure, each of the venues is a bar, a club, a restaurant, or another suitable place of providing entertainment, and/or serving food/drinks for its patrons. In some embodiments, all venues fitting in the above description may be displayed on the screen 110 as a result of the search by the mobile computing device. In some other embodiments, only the venues that are actually participating in the virtual social network (as a host thereof) will be displayed as a result of the search by the mobile computing device 100. For example, if and when a venue is ready to participate in the virtual social network as a host, it may send an electronic message to a remote server that, among other things, keeps track of which venues are hosts of the virtual social network. The mobile computing device 100 is also telecommunicatively coupled to the remote server. When the mobile computing device 100 performs the search, the remote server may then help the user of the mobile computing device 100 narrow down which venues are actually venues of interest (i.e., venues that are actually participating in the virtual social network). Otherwise, the user may become overwhelmed by a large list of venues returned by the search, where many (if not most) of them are not actual participants of the virtual social network and is therefore of no interest to the user.

In any case, the list of venues discovered as a result of the electronic search by the mobile computing device may be shown on the screen in a map 150, or in a text box 160, or both. The map 150 may display a location 170 of the user relative to the locations of the participating venues. This helps the user orient himself/herself and understand how far he/she may be from any particular venue. The text box 160 includes details regarding the name of each venue. In some embodiments, the text box 160 also displays, next to the name of each venue, the number of participants of the virtual social network at each venue (i.e., the number of "icebreaker" users herein). The number of participants of the virtual social network at each venue may be supplied by each venue to the mobile computing device 100 directly in response to the search request issued by the mobile computing device 100. Alternatively, each venue may supply this information to the remote server discussed above. The remote server may then electronically send the information (regarding number of participants at each venue) to the mobile computing device 100.

Knowing the number of participants at each venue may be helpful for the user. In more detail, in a social networking context, the user experience is typically enhanced as the number of participants on the social network increases, at least up to a certain point. At the minimum, there needs to be a critical mass of participants for the social network to be enjoyable. As such, if a venue herein only has 4 or 5 participants, the user may not wish to go to that venue, because a social network having only 4 or 5 user may not be sufficient to provide a satisfactory user experience. Thus, by listing the number of participants of the virtual social network alongside each venue, the user may get a snapshot of the venues around him/her and determine which venue is likely to be a "hotspot" for the virtual social network. The user may then base his/her decision on which venue to visit accordingly.

Once the user has decided on the venue to visit, he/she may digitally "check-in" to the venue. In some embodiments, a digital check-in at the venue means that the user (via the mobile computing device 100) has agreed to log on to, or establish a wireless link or telecommunications connection with the virtual social network at the venue. In some embodiments, the wireless link may be established between the mobile computing device 100 and a computer (i.e., a desktop or a laptop computer) or a portable handheld electronic device (e.g., a smartphone or a tablet computer) of the venue. In other embodiments, the wireless link may be established between the mobile computing device 100 and a network router at the venue. For example, the mobile computing device 100 may simply log on to the Wi-Fi network provided by the venue by digitally checking into the venue. In the embodiment shown, the venue that is selected for the digital check-in is highlighted.

Figure 13:
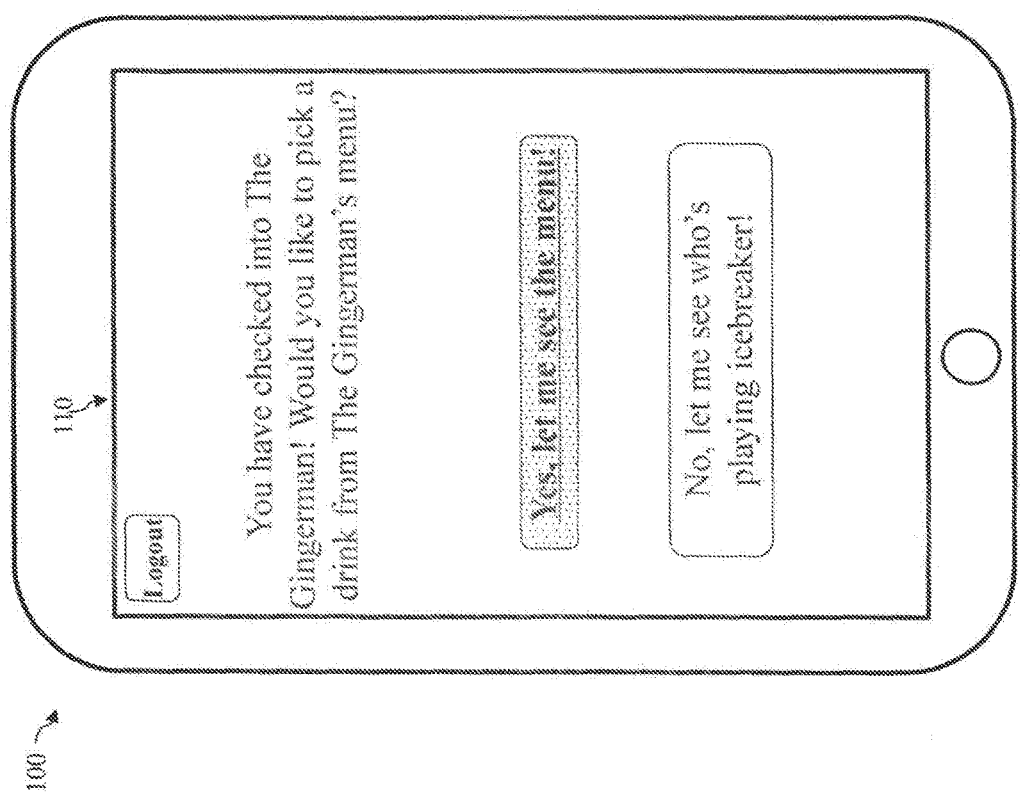

Referring now to FIG. 13, once the user has digitally checked into a venue (e.g., "Gingerman" in this embodiment, which is a bar), he may be optionally prompted to view a digital menu of items offered at the venue. Since the venue herein is a bar, the digital menu is a drink menu. The user may decline and go straight to the virtual social network game, or he/she may decide to view the digital menu.

Figure 14:
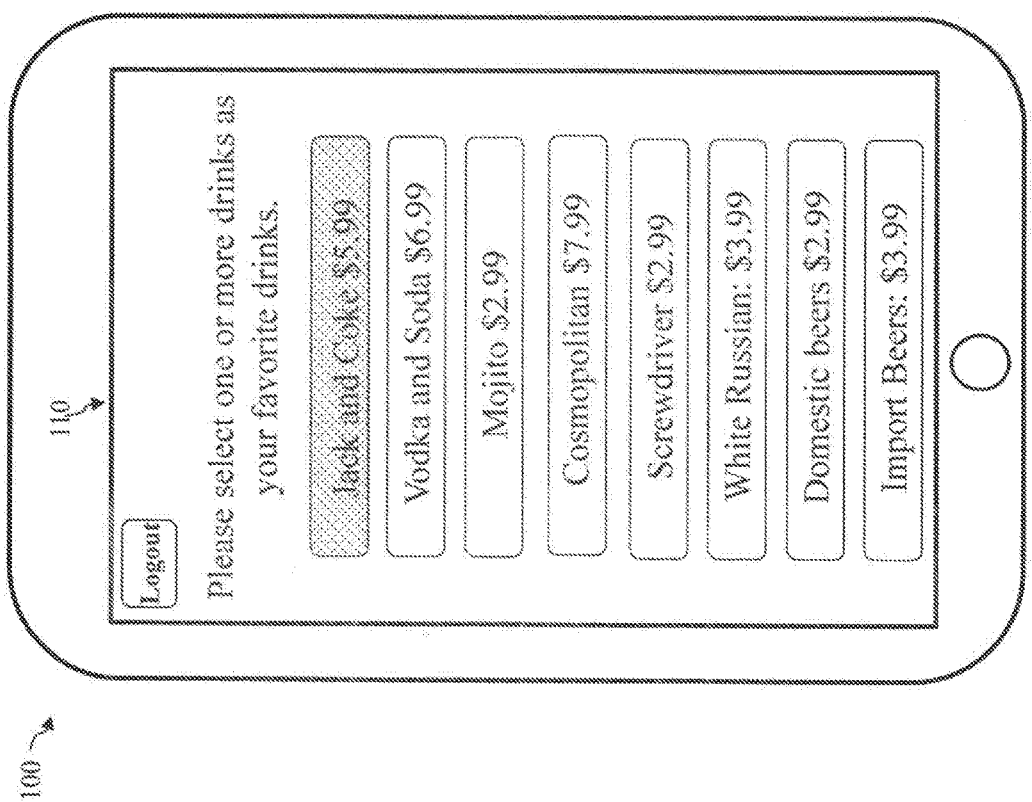

Referring now to FIG. 14, if the user decides to take a look at the digital menu, he/she will be presented with a list of hems (e.g., drinks) offered by the venue. In some embodiments, the entire list of available items may be shown in the form of a scrollable list. In other embodiments, only a subset of the available items may be shown, for example the top 10 or 20 most popular items at the venue. The user may specify which items are his favorite or preferred. In this example, the user chooses Jack and Coke as his favorite drink.

After the user selects his/her favorite or preferred drink (or if he/she never saw the digital menu and instead elected to proceed to the virtual social network game right away in the first place), the user may be presented with a list of digital profiles of a subset of the participants of the virtual social network at the venue. The subset of the participants is determined by the user selection of which gender of participants he/she is interested in interacting with at the user profile setup screen (FIG. 4 or 5). For example, in this example, the user AverageJoe is a man seeking a woman, so only digital profiles of women participants may be displayed on the screen 110 of the mobile computing device 100 of the user AverageJoe.

In the embodiment shown in FIG. 13, the digital profiles of the women participants are displayed as a scrollable grid on the screen 110 of the mobile computing device 100. Again, these women are all physically located at (or at least near) the venue that is hosting the virtual social network (the venue being Gingerman in this example). These women, have previously digitally checked into the venue using a process similar to the user AverageJoe's digital check-in process discussed above. Again, by checking in to the venue, each participant agrees to have their digital profiles discoverable or viewable by other participants of the virtual social network at the venue.

Figure 15:
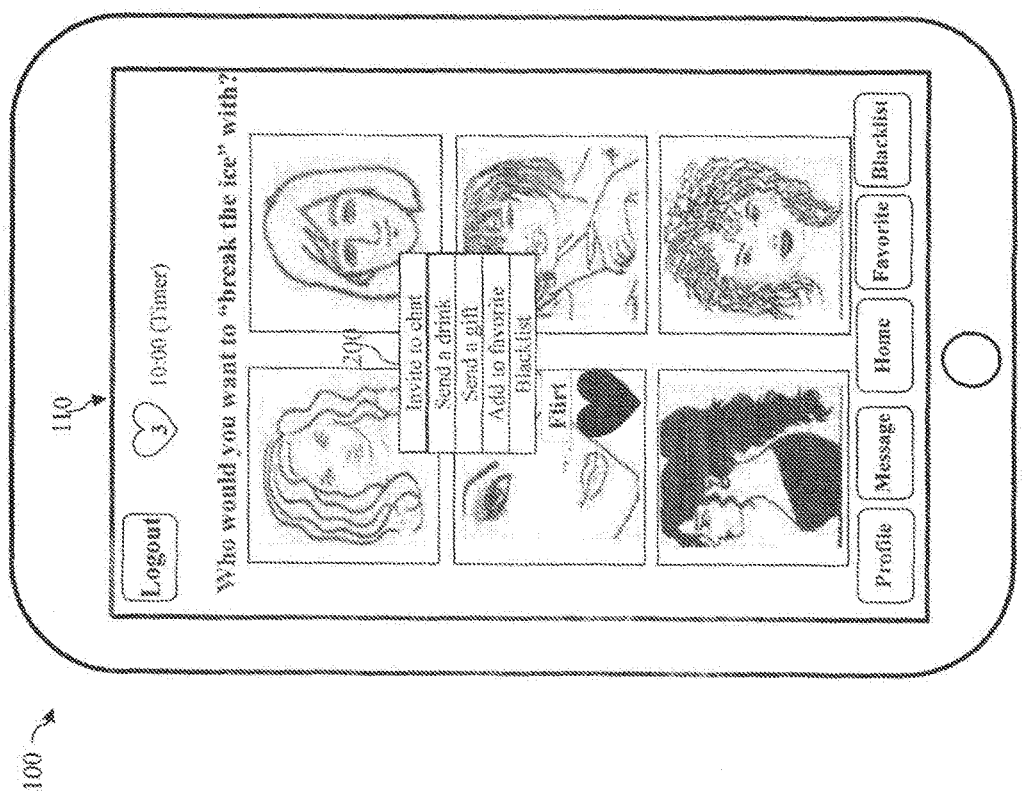
Figure 16:
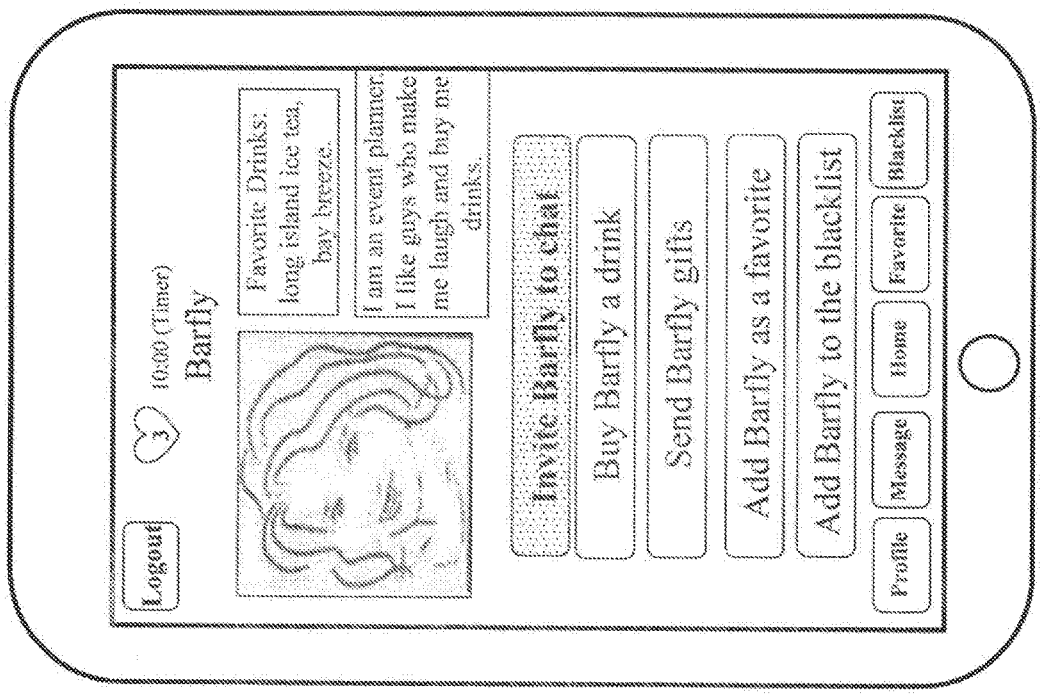

Using the grid shown in FIG. 15, the user herein may determine which one of the other participants (females for the user AverageJoe) he would like to interact with. A click or tap on the digital profile of any of the other participants will trigger the display of a more detailed profile of such participant, as shown in FIG. 16. For example, as shown in FIG. 16, the detailed profile of a participant may include the participant's favorite or preferred drinks, food items, what she does for a living, her likes and dislikes, etc. In addition, the detailed profile of the participant also allows the user (e.g., user AverageJoe) to send her a chat request, buy her a drink, or send her virtual or physical gifts, designate her as a favorite participant, or blacklist her, as discussed in more detail below.

Meanwhile, a long press of on the digital profile of the participant shown. In FIG. 15 (or in FIG. 16) may trigger the display of a menu 200 containing a plurality of options, such as "Invite to chat", "Send a drink", "Send a gift", "Add to favorite", and "Blacklist." These options are also available in the detailed profile of a participant, for example as shown in FIG. 16. Generally, an invitation for a chat means that the user sending the chat would like to electronically chat with the recipient of the chat request.

An offer to buy a drink means that the user would like to buy a drink for the recipient, where the drink is in the form of a digital voucher/coupon (such as a QR code or a barcode discussed below).

An offer to send a gift means that the user would like to send a virtual or a physical gift to the recipient. The virtual gifts may be animations or pictures, or digital currency such as virtual coins, or store credit such as ITUNEs credit. The physical gift may be a coupon for a physical merchandise item.

Adding a participant as a favorite participant means that the favorited participant is someone whom the user is interested in and may desire further interaction therewith. In some embodiments, if the user decides to add another participant (participant with the handle "Flirt" in the embodiment shown herein) as a favorite, a symbol such as a heart may be displayed on or adjacent to the digital profile picture of the favorited participant.

Blacklisting a participant means that the user is uninterested in the participant and does not wish to be contacted by, or even seen by the blacklisted participant. In some embodiments, once a user has blacklisted a participant, the user's digital profile will no longer be accessible by the mobile computing device of the blacklisted participant. For example, the user's digital profile may disappear from the list of available participants on the mobile computing device of the blacklisted participant. The blacklisted participant may not be aware that he/she has been blacklisted, and he/she may or may not even know that the user who has blacklisted him/her is in the same venue participating in the same virtual social network.

It is understood that alternative mechanisms may be employed to trigger the display of a detailed participant profile, or to trigger the display of the menu 200 containing options, for example, the single click and long press may be reserved (i.e., single click will trigger the display of the menu 200 containing a plurality of options, whereas a long press will trigger the display of a detailed participant profile), or a double click may be used to replace or supplement the functionalities of the single click or lone press.

Figure 17:
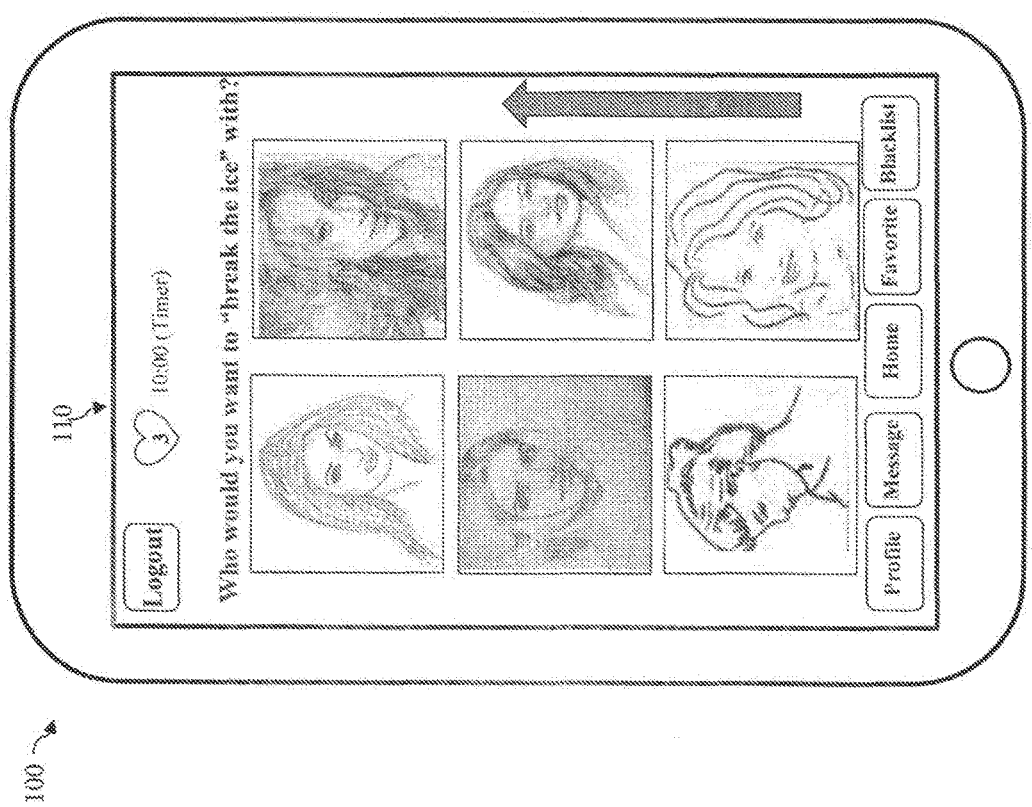

Referring now to FIG. 17, a new picture grid is displayed on the screen 110 of the mobile computing device 100 in response to user engagement. For example, the user may "swipe" up or down on the screen 110 to bring up a new grid of digital profiles of women participants. Alternatively, the user may "swipe" left or right on the screen 110 to bring up the new grid of digital profiles of women participants. In addition to, or instead of "swiping" up/down/left/right, the user may also click and drag on a portion of the screen toward a given direction in order to get stew digital profile pictures displayed.

Figure 18:
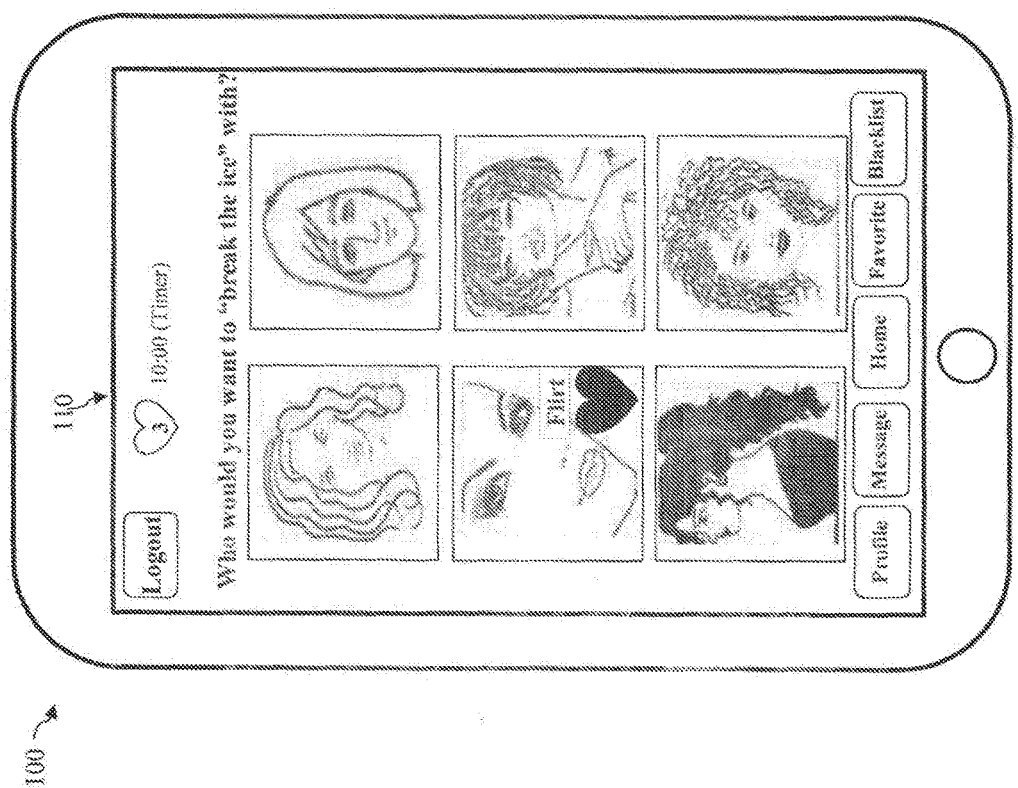
Figure 19:
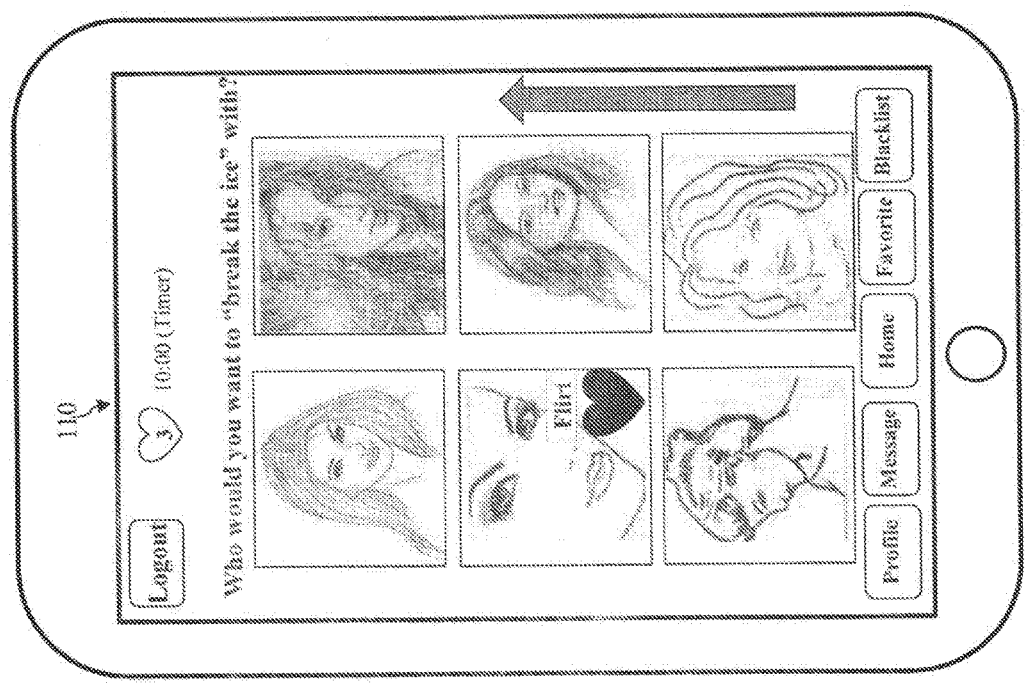

FIGS. 15-17 illustrate an example embodiment in which a user may browse through the digital profiles of the other participants of the virtual social network at the venue. FIGS. 18-19 illustrate an alternative embodiment of visually providing a list of participants of the virtual social network that can be browsed through. In more detail, the embodiment shown in FIGS. 18-19 is similar to the embodiment discussed above with reference to FIGS. 15-17 but with an added functionality.

Referring to FIG. 18, supposed the user AverageJoe has designated the participant with the handle "Flirt" as a favorite participant. A symbol such as a heart may be displayed on the digital profile of Flirt's profile picture. Referring now to FIG. 19, as the user scrolls through the list of available women participants, the digital profiles of the rest of the participants are replaced by digital profiles of other participants not shown in FIG. 18, with the exception of Flirt's digital profile. Alternatively stated, as the user brings up the display of a new grid of digital profiles of participants, the new grid shown in FIG. 19 and the previous god shown in FIG. 18 overlap or share the digital profile of the favorited participant Flirt. In some embodiments, the digital profile of the favorited user occupies substantially the same position in both the new grid and in the previous grid. In the embodiment shown herein, Flirt's digital profile picture is located at the middle left position in both the previous grid shown in FIG. 18 and in the new grid shown in FIG. 19.

For reasons of simplicity, additional grids are not shown, but it is understood that the digital profile of Flirt will remain fixed in the additional new grids as the user AverageJoe continues with the browsing of digital profiles of other participants. Keeping the digital profile of the favorited participant in the new grid while the user browses through the digital profiles of other participants is helpful for the user. For example, in the embodiment shown in FIGS. 15-17, suppose the user AverageJoe has designated Flirt as a favorite participant in a first grid. As he scrolls through the rest of the participants in new grids, the digital profile picture of Flirt is not displayed in these new grids, and he may have forgotten what Flirt looks like. Therefore, the user AverageJoe would have to scroll back up to the initial grid where Flirt's digital profile picture was displayed to remind himself of what she looks like. This process may be time consuming and is inefficient for the user's browsing of other participants. This problem is exacerbated if the user has designated multiple favorite participants in different grids, which may entail the user having to scroll back and forth multiple times to see who the favorited participants are.

In comparison, the embodiment shown in FIGS. 18-19 obviates this problem because the digital profiles of the favorited participants will always remain in the current grid of digital profiles. In this manner, the user need not scroll back and forth to find the favorited users, since they are all currently displayed on the screen 110 even as the user browses through the list of participants.

It is understood that although a grid is used herein to illustrate an example approach of displaying the digital profiles of participants of the virtual social network, a scrollable list may be used instead of the grid. For example, referring to FIG. 20, a scrollable list may be displayed on the screen 110 of the mobile computing device 100. Each list entry corresponds to a particular participant of the virtual social network. Each list entry includes the participant's profile picture and a text box displayed alongside the profile picture. Among other things, text box may specify which drinks the participant prefers. Optionally, the text box may also include information regarding the participant's likes and dislikes, hobbies, or what she is looking for in a man, etc. Again, the user may be able to designate any of the participants as a favorite, or interact with her by sending her a drink, a gift, a chat request, or put her on the blacklist, as discussed in greater detail below. Furthermore, the favorited users may also remain displayed (for example in the same position on the list) in the scrollable list as the user continues to scroll through the list.

Figure 21:
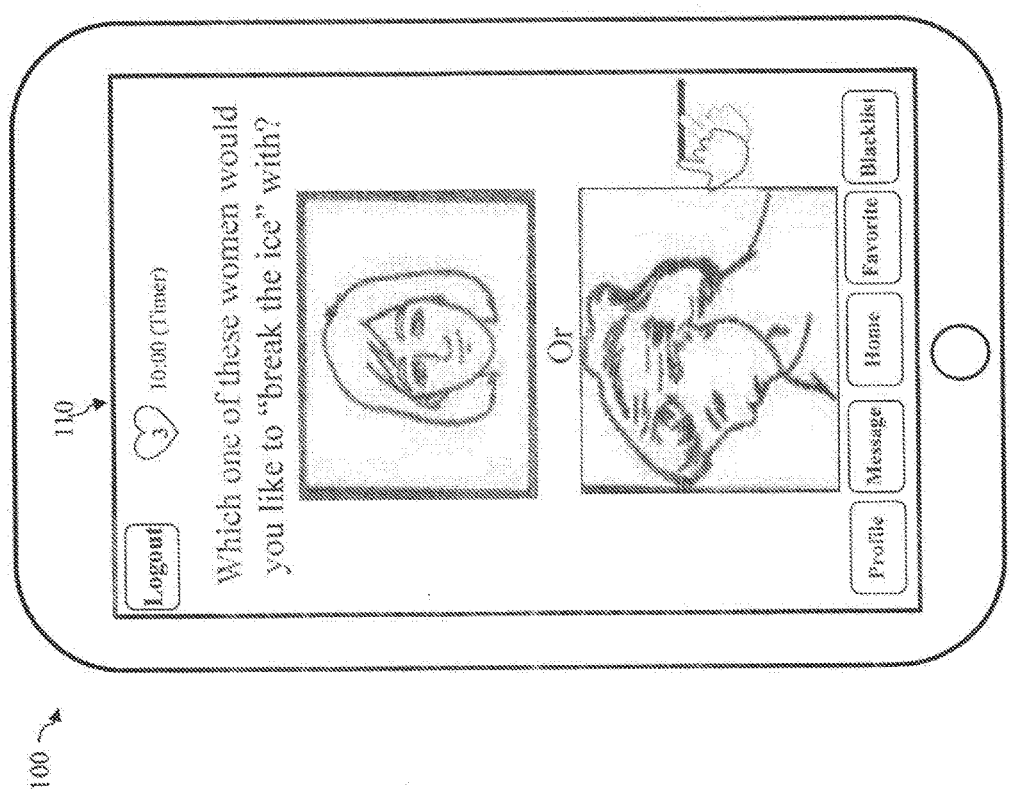
Figure 22:
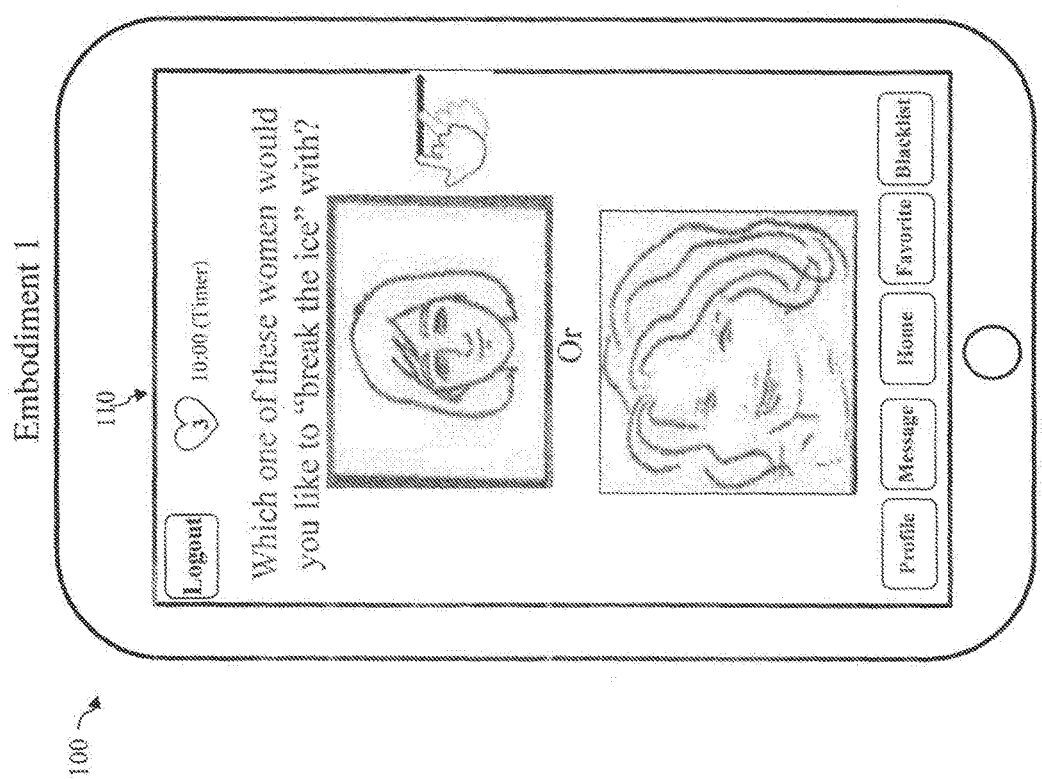
Figure 23:
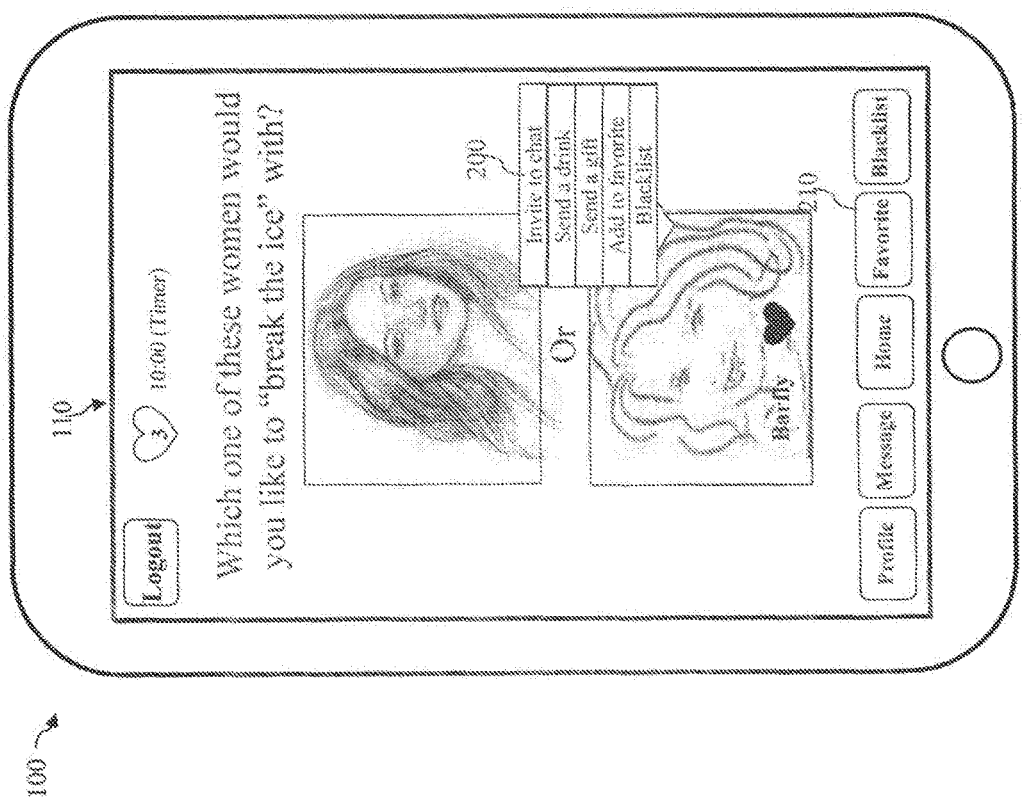

FIGS. 21-23 illustrate yet another embodiment of allowing the user to browse through available participants at a target venue. Referring to FIG. 21, rather than being presented with a scrollable grid of digital profiles of participants, the digital profiles of two of the available participants are randomly selected and displayed on the screen 110 of the mobile computing device 100. Based on the two digital profiles, the user is prompted to select the participant with whom he would be more interested in interacting. The user may be able to swipe away the digital profile of the participant with whom he is less interested in interacting. For example, the user is less interested in the participant shown at the bottom, so he may swipe her digital profile to the left or right.

Referring now to FIG. 22, as the digital profile of the participant on the bottom is swiped away, it is replaced by a digital profile of another randomly selected participant. Again, the user may select the participant that he is more interested in, and swipe away the digital profile of the participant with whom he has less interest. For the sake of continuing with the example, the user is less interested in the participant shown at the top this time, so he may swipe her digital profile to the left or right.

Referring now to FIG. 23, as the digital profile of the participant on the top is swiped away, it is replaced by a digital profile of yet another randomly selected participant. This comparison and selection process may continue for as long as the user wishes. During the comparison and selection process, the user may also be able to click or tap on a digital profile of any of the participants to view a more detailed profile (e.g., as shown in FIG. 16), and the user may also be able to long press on a digital profile of any of the participants to bring up the same menu 200 discussed above with reference to FIG. 15. For example, the user may decide to designate either of the two (or both) participants shown on the screen 110 as a favorite participant.

Figure 24:
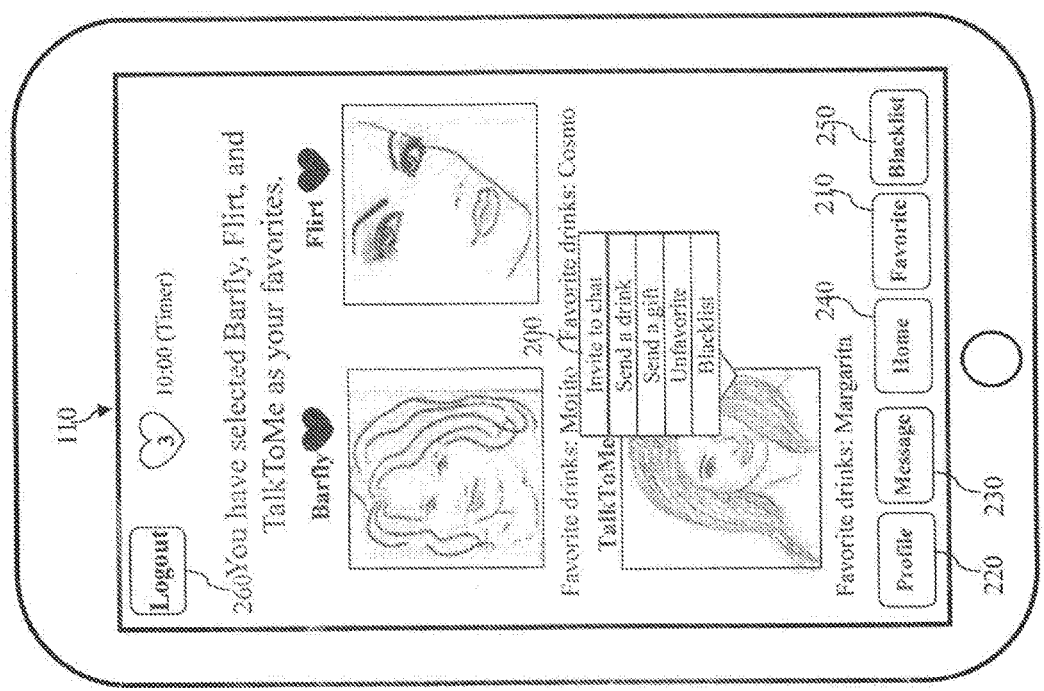

Once the user has selected one or more favorite participants, he may click on a favorite button 210 to display, on the screen 110, the digital profiles of the participants who have been designated as favorite participants of the user, for example as shown in FIG. 24. From this list of favorite participants, the user may also choose to view their detailed profile or to trigger the menu 200 in a similar manner as discussed above.

Figure 20:
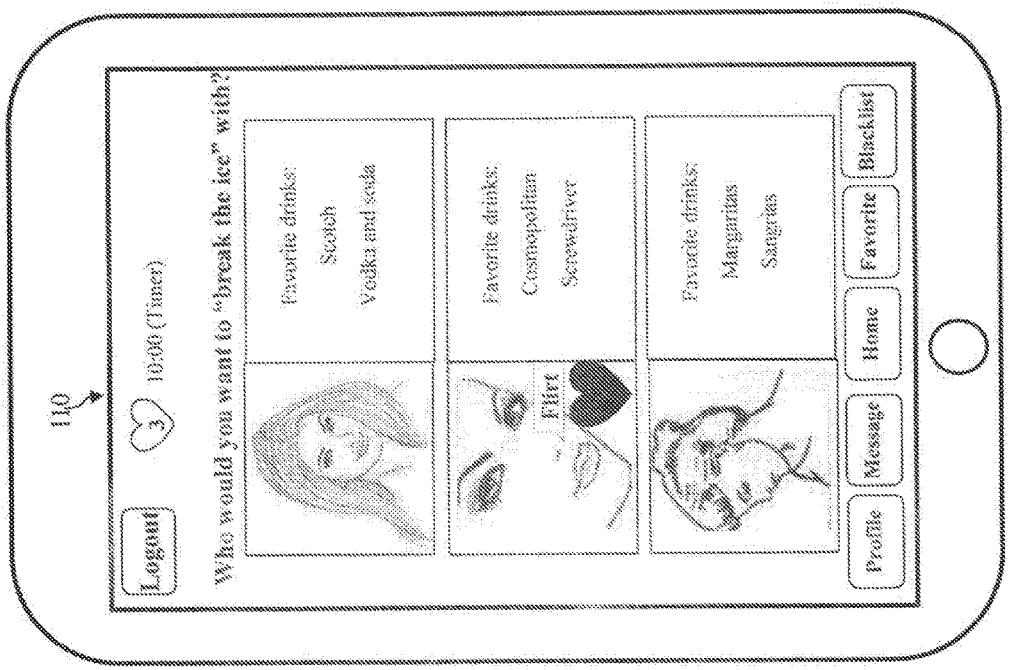

Alongside the button 210, a plurality of a profile button 220, a message button 230, a home 240, and a blacklist button 230 are displayed. The list of buttons 210-250 are displayed throughout the application and allows the riser to navigate through the application as desired. The profile button 220 allows the user to return to his/her own profile screen, for example the profile screen as shown in FIG. 4 or 5, so that the user can dynamically change his/her handle, speedy the different types of drinks he/she prefers, or just edit things he/she would like to share with the other participants when the view the profile of the user. The message button 230 allows the user to view a list of incoming and outgoing messages within the context of the virtual social network, as discussed below in more detail with reference to FIG. 37. The home button 240 allows the user to return back to the "grid" style display of the digital profiles of other participants, such as shown in FIGS. 15-10, or the "list" style display of the digital profiles of other participants, such as shown in FIG. 20, or the side-by-side style display of the digital profiles of other participants, such as shown in FIGS. 21-23.

Figure 25:
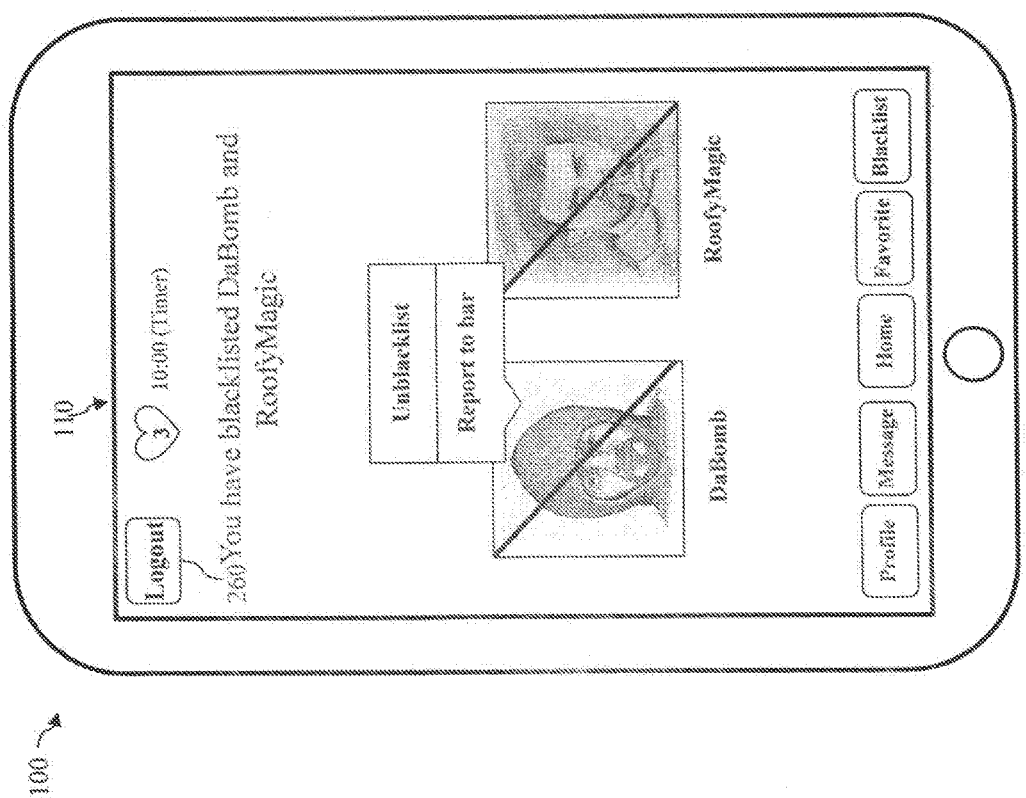

The blacklist button 250 displays a list of the participants who have been blacklisted by the user, for example as shown in FIG. 25. The blacklist option is particularly helpful for female users, who may occasionally be harassed by one or more male participants on the virtual social network. For example, if participants with the handles "DaBomb" and "RoofyMagic" have made user "Flirt" feel uncomfortable, she may blacklist "DaBomb" and "RoofyMagic." Alternatively, if Flirt has no interest in engaging them or wanting to be engaged by them, she may blacklist DaBomb and Roofy-Magic as well. Once the DaBomb and RoofyMagic are blacklisted by Flirt, Flirt's digital profile will no longer be accessible by either DaBomb or RoofyMagic via their respective mobile computing devices. In some embodiments, the digital profile of Flirt will disappear from the screen of the mobile computing devices of DaBomb and RoofyMagic. Thus, from DaBomb and RoofyMagic's point of view, the participant Flirt may have left the venue, or decided to exit the virtual social network, or they may never even know she existed or was at the venue in the first place. In other words, the blacklisted users are not specifically notified of their blacklisting by other participants, and as such they may not be aware of them being put on anyone's blacklist.

Once in the blacklisted participants screen as shown in FIG. 25, the user may unblacklist a particular participant (thereby returning him to "normal" status), or report the participant to the venue, which will be discussed in more detail later. Similarly, the user may also unfavorite a participant who has been previously favorited, thereby also returning said participant to normal status. Additionally, the user may also exit the virtual social network via the click of a logout button 260.

Figure 26:
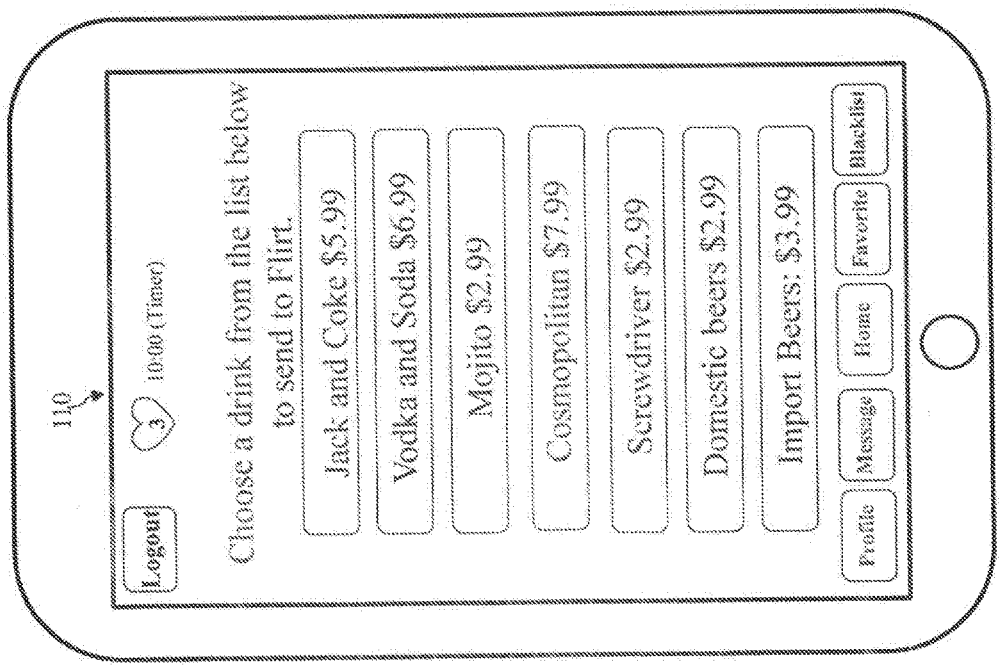

Suppose that the user AverageJoe would like to send a drink to one of his favorited participants. This may be done either by triggering the menu 200 (e.g., shown in FIG. 15, 23, or 24) or going to the detailed digital profile of the participant (i.e., the target drink recipient) such as the profile shown in FIG. 16. When the user clicks on the corresponding button to send/buy a drink for the target recipient, digital menu of the venue may be displayed on the screen 110 of the mobile computing device 100 of the user (i.e., the sender of the drink), as shown in FIG. 26. Again, a drink menu is provided in the example provided herein, but it is understood that food or other merchandise items may also apply in other embodiments. The user may browse through the digital drink menu and select one or more drinks to send to the target recipient, for example Flirt. This is advantageous over conventional social settings where the buyer of the drink usually does not know what drinks are preferred by the target recipient. As such, the buyer may end up buying a drink that the recipient does not like at all, thereby diminishing chances of using the drink as an icebreaker between the buyer and the recipient. In comparison, the present disclosure allows users such as Flirt to indicated her favorite/preferred drinks (e.g., cosmopolitan) and make that information available for other participants of the virtual social network. Consequently, the user AverageJoe may buy and send a drink such as cosmopolitan to Flirt with more confidence knowing that she will like the drink.

Figure 27:
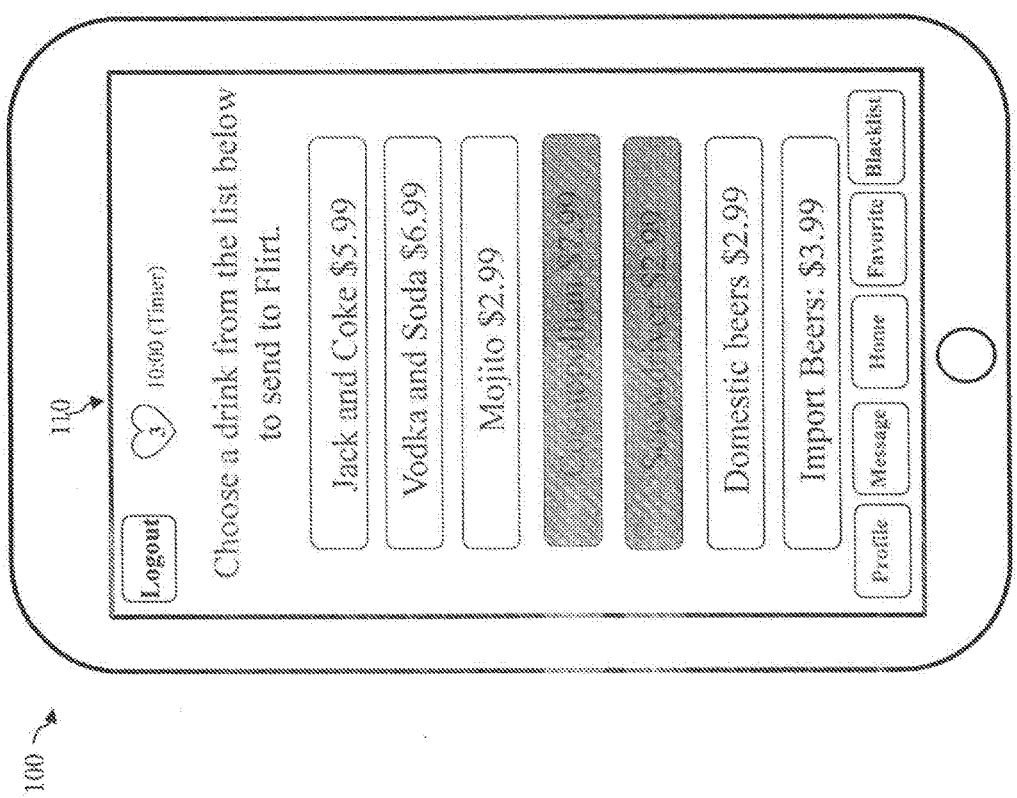

FIG. 27 illustrates another embodiment of the digital drink menu displayed to the user when he is ready to buy a drink for a target recipient. Suppose the target recipient Flirt has already selected cosmopolitan and screwdriver as her favorite drinks at some point from the digital menu (for example when she registered to participate with the virtual social network) as shown in FIG. 14. The selection of Flirt's favorite drinks may be displayed with graphical emphasis on the screen 110 of AverageJoe's mobile computing device 100 when the user AverageJoe is ready to buy Flirt a drink. For example, Flirt's favorite drinks cosmopolitan and screwdriver may be highlighted so that they stand out from the rest of the drinks on the menu. The display of the target recipient's favorite drinks with graphical emphasis helps the buyer remember what drinks he needs to buy. This is especially true when the drink menu is fairly extensive, and even if the buyer remembers what the target recipient's favorite drinks are, he will have to comb through the entire menu to identify the drinks of interest. This is a time consuming process and may frustrate the buyer. However, if the drinks of interest are displayed with graphical emphasis, the buyer may be able to easily find them and complete the transaction, which saves time and provides a more pleasant user experience.

Figure 28:
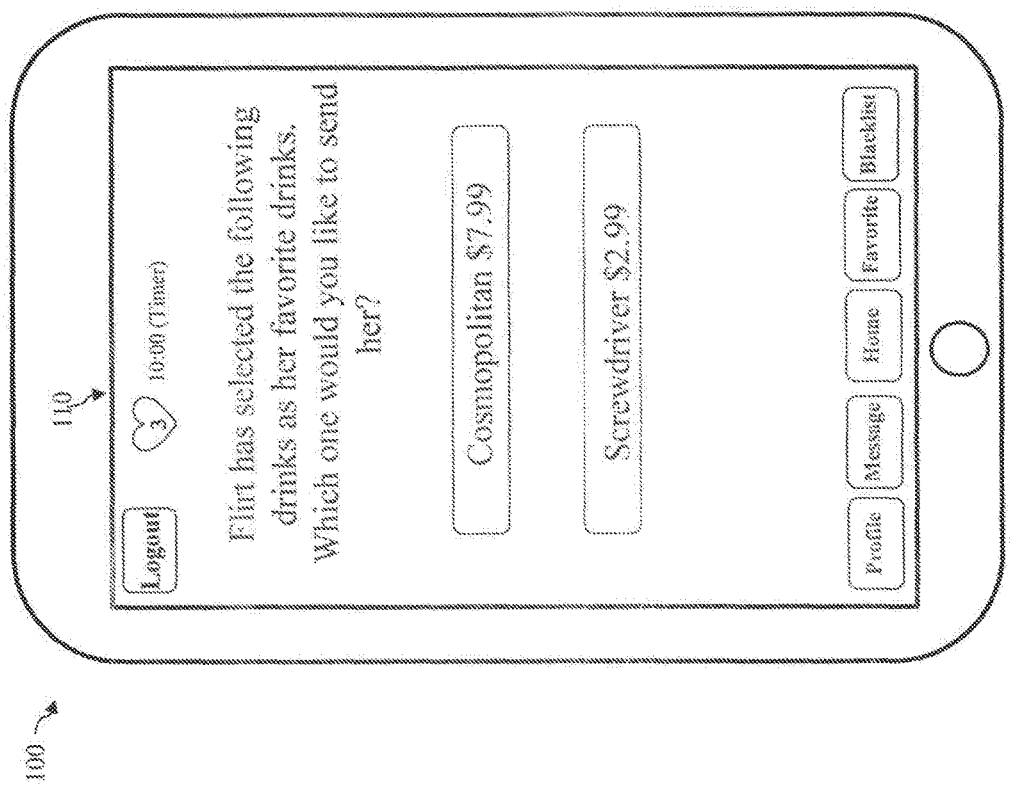

FIG. 28 illustrates yet another embodiment of the digital drink menu displayed to the user when he is ready to buy a drink for a target recipient. In this embodiment, the only drinks displayed are the drinks that have been specified as favorite drinks by the target recipient. In other words, the graphical emphasis of the target recipient's favorite drinks is manifested as the only drinks being displayed, while the rest of the drinks on the menu are hidden. This may make it even easier for the buyer to choose the drink to send to the recipient.

It is understood that in both the embodiments shown in FIGS. 27-28, the drinks displayed with graphical emphasis or by themselves may vary depending on the target recipient. In other words, Flirt may prefer cosmopolitan and screw driver, and as such these drinks are displayed with graphical emphasis in the embodiment of FIG. 27 and FIG. 28. However, had the user been trying to send a drink to another participant Barfly, then the drink displayed with graphical emphasis would have been mojito, since Barfly has selected mojito as her preferred drink.

In some embodiments, each participant's selection of preferred drinks is transmitted to, and stored on, a remote server via the mobile computing device of said participant. When another user tries to send a drink to said participant, the remote server sends the recipient's selection of preferred drinks to the mobile computing device of the buyer's mobile computing device, so that the buyer's mobile computing device may be able to display the target recipient's preferred drinks with graphical emphasis. Alternatively, such preferred drink selection for all the participants of the virtual social network may be automatically downloaded to each participants mobile computing device, for example when the participant initially checks-in or joins the virtual social network. This information may also be periodically updated as new participants check-in to the virtual social network and as existing participants leave. When any user is ready to send a drink to another, the mobile computing device of the buyer user may already have the preferred drink information for the target recipient available. In yet another alternative embodiment, the preferred drink information for the target recipient is automatically sent to the mobile computing device of the buyer in response to the buyer initiating a "send drink" request to the target recipient.

Figure 29:
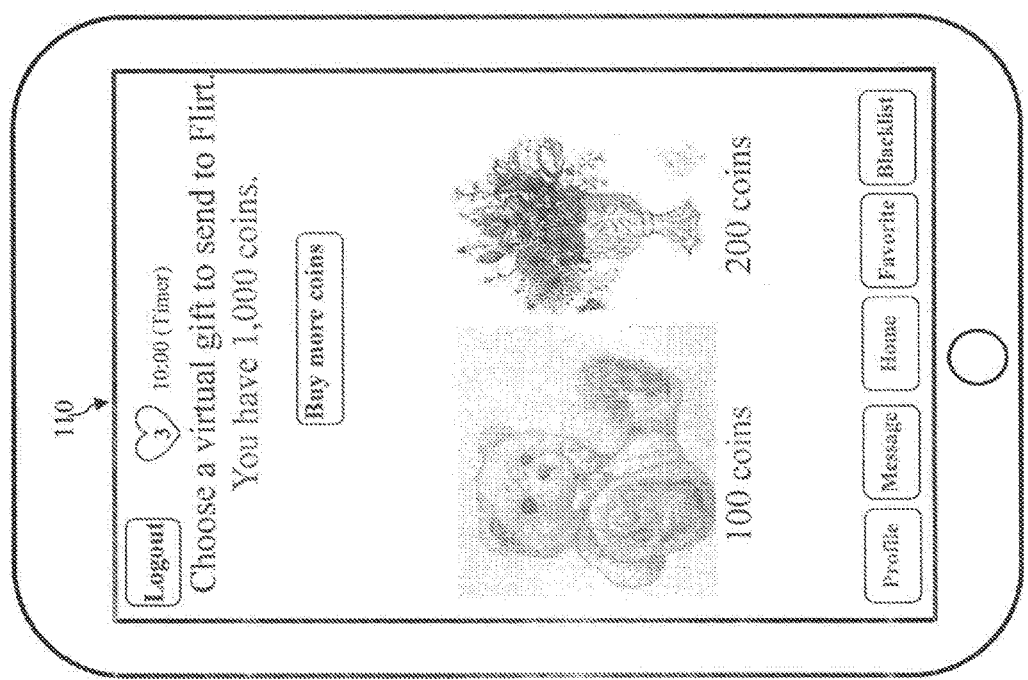

Referring now to FIG. 29, the user may send a gift to a target recipient instead of, or in addition to, one or more drinks. Such gifts may include, as examples, virtual stuffed animals, virtual flowers, or an animation sequence, etc. The purchase of these gifts cost virtual coins, which the user may purchase. Alternatively, the user may also send an actual gift such as a digital gift card to the recipient.

Figure 30:
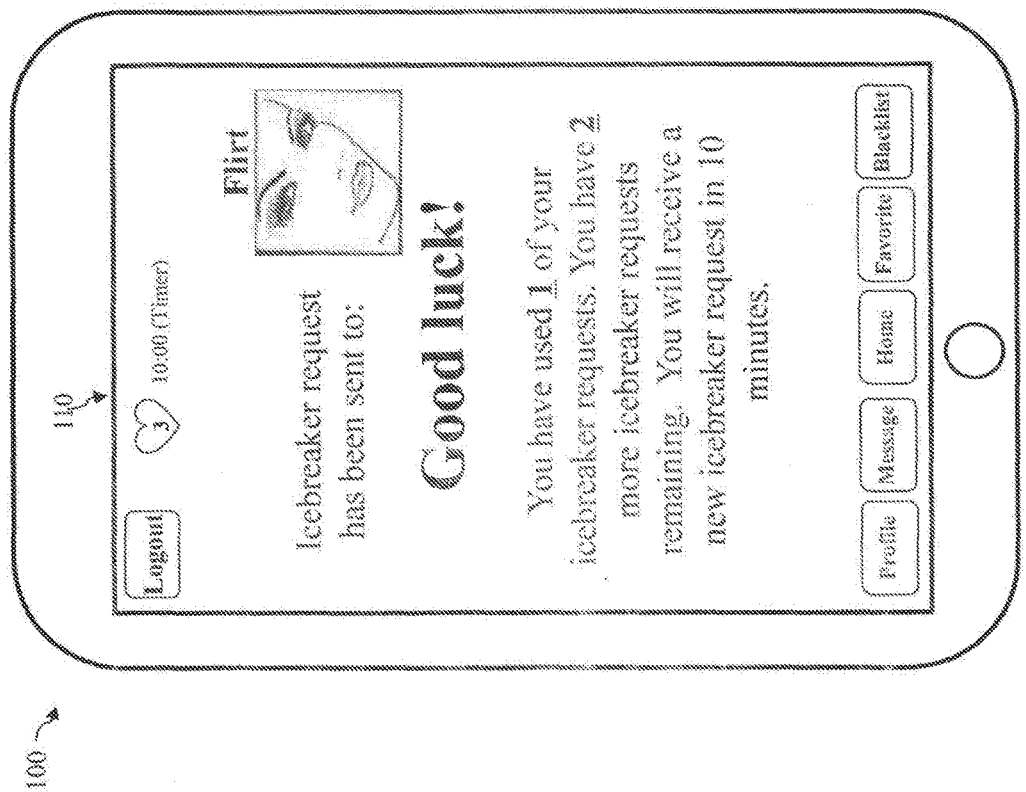

Referring now to FIG. 30, regardless of how the user decides to initiate an "icebreaker" request (e.g., just a chat request, or a chat request accompanied by an offer to buy a drink, or a chat request accompanied by a gift), once the request is sent, a timer starts. Initially, the user may be given a certain number of icebreaker requests, for example 3. Once he sends a request to someone, he now has only two requests left. The timer counts down from a predefined number (e.g., 10 minutes). When the timer counts down to 0 (i.e., 10 minutes have passed), then, a new request is made available. Thus, the user may be given a new icebreaker request every 10 minutes, though, he cannot go above the initial number (e.g., 3) of requests initially assigned to him. In this example, if the user has used up all 3 requests within a 10-minute span, then he may not be able to send another icebreaker request to a target recipient until the timer has finished counting down to zero.

Limiting each user to a certain number of icebreaker request may be beneficial in at least two aspects. One, this prevents the user from indiscriminately sending icebreaker requests to all participants at the venue, which would overwhelm and annoy them. Two, psychologically, people tend to treasure things that are of limited quantity. Since a user only has a certain number of icebreaker requests available, he is likely to take each request more seriously and therefore become more vested in his participation of the virtual social network, which would likely enhance his and everyone else's user experience.

Figure 31:
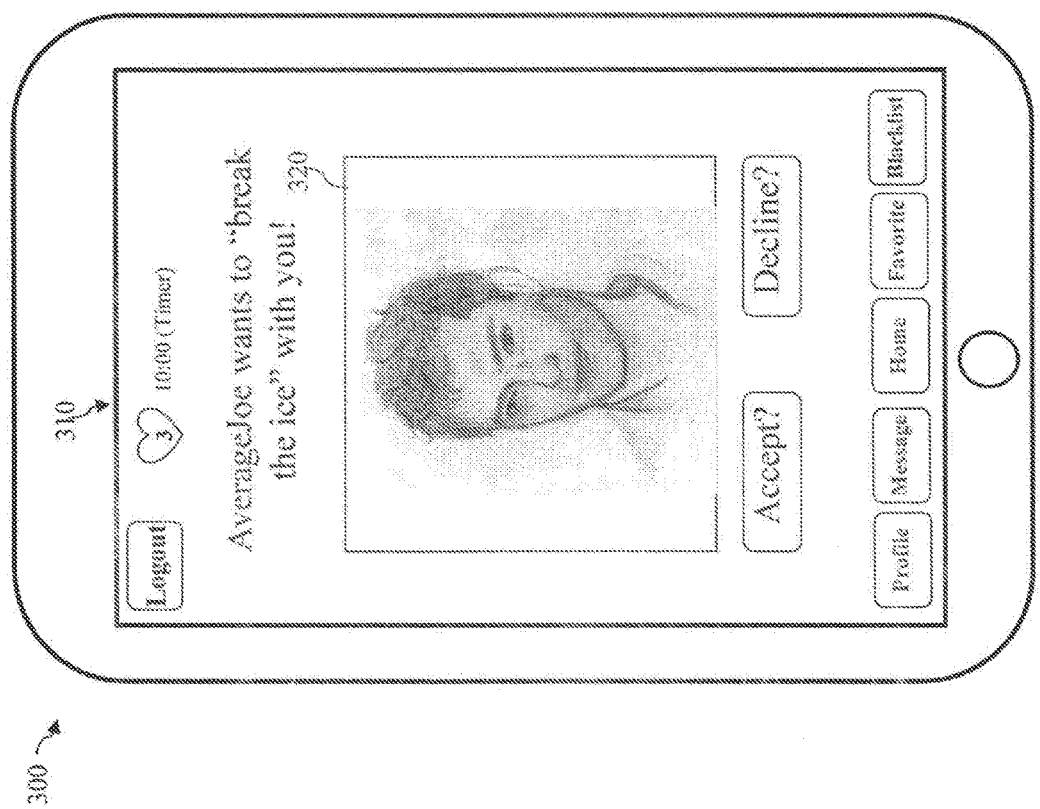

FIG. 31 illustrates a screen 310 of a mobile computing device 300 of the target recipient of user AverageJoe's chat request. In this case the participant with the handle "Flirt." The screen 310 displays an incoming message from user AverageJoe who initiated the chat request. The incoming message includes a digital profile picture 320 of AverageJoe.

Flirt has an option to either accept the chat request or decline it by clicking on the "Accept" or "Decline" buttons.

Figure 32:
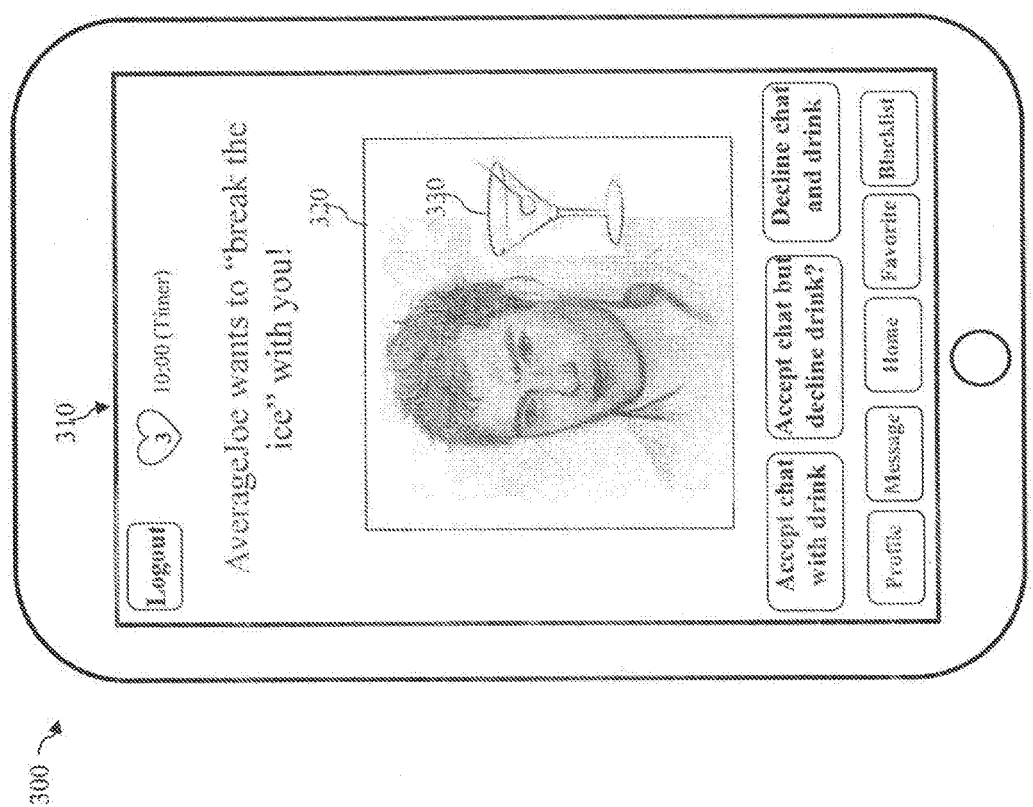

FIG. 32 illustrates an example of what is displayed on the screen 310 when the user AverageJoe had sent the chat request along with an offer to buy Flirt a drink. In this case, along with the digital profile picture 320 of the sender—AverageJoe—the recipient Flirt may also see a graphical icon 330 representing a drink being displayed on the screen 310. The graphical icon 330, along with the text of the message, informs the recipient that a drink has been sent her way. The recipient Flirt may "Accept chat with drink", "Accept chat, but decline drink" or "Decline chat and drink" by clicking on the corresponding buttons.

Figure 33:
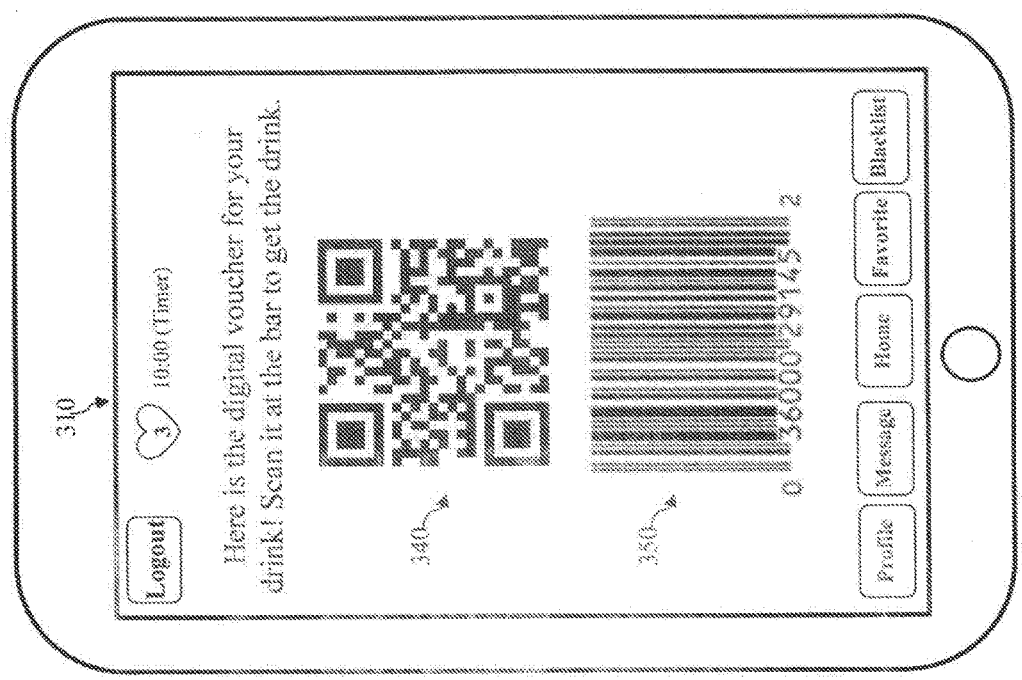

FIG. 33 illustrates an example of a digital voucher or codes displayed on the screen 310 if Flirt decides to accept the chat request with one drink. In more detail, the drink that is purchased for the recipient Flirt is in the form of a digital voucher/coupon that can be redeemed at the venue for the corresponding drink. In the embodiment illustrated, the digital voucher may be either a quick response (QR) code 340, a barcode 350, or both. The QR code 340 or the barcode 350 may be scanned or electronically read by a scanner (for example a smartphone or a tablet computer) to redeem the corresponding drink. In some embodiments, the QR code 340 or the barcode 350 are each generated dynamically in response to a drink request being sent. Each drink for a target recipient has a uniquely generated QR code 340 or barcode 350 associated therewith, so as to prevent using the same QR code 340 or barcode 350 to redeem multiple drinks.

Here, AverageJoe has sent a cosmopolitan to Flirt in the form of the QR code 340 or the barcode 350, and thus Flirt may go to the bar and have the bartender scan either of these codes 340/350 with his/her smartphone or tablet computer to redeem, an order of cosmopolitan. This whole drink ordering process is convenient because AverageJoe knows exactly what Flirt prefers to drink and thus sends her the drink of her choice. Flirt may get the drink without having to talk to AverageJoe in person (i.e., she merely has agreed to chat with him via their mobile computing devices). This is also safe because Flirt gets the drink herself, and she can make sure that no one has put any drugs in her drink.

Figure 34:
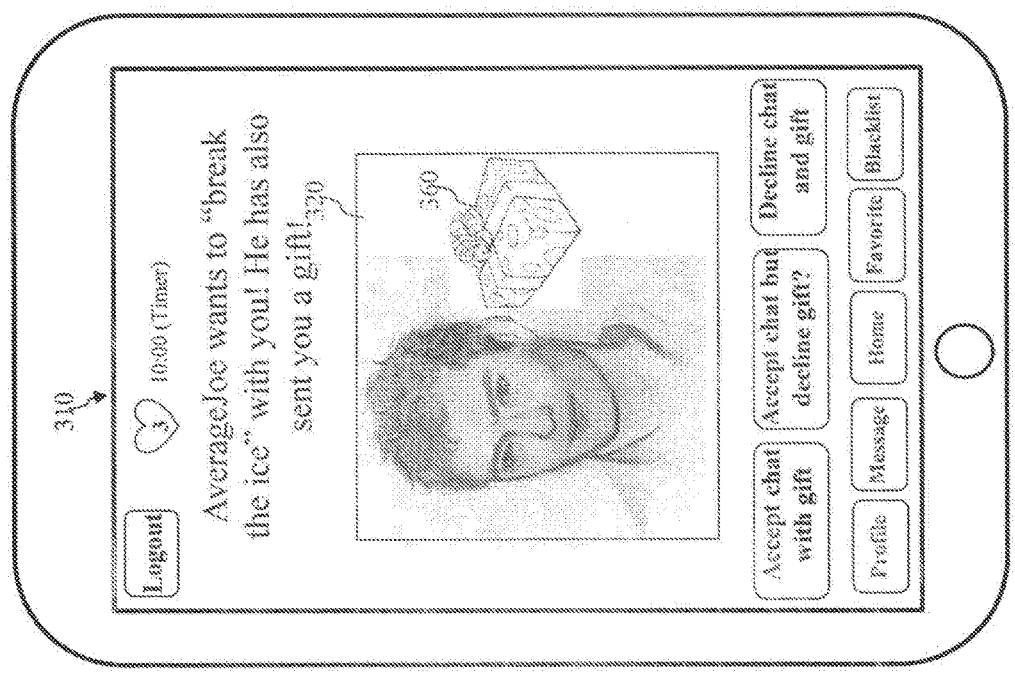

FIG. 34 illustrates an example of what is displayed on the screen 310 when the user AverageJoe had sent the chat request along with a gift. In this case, along with digital profile picture 320 of the sender—AverageJoe—the recipient Flirt may also see a graphical icon 360 representing a gift displayed on the screen 310. The graphical icon 360, along with the text of the message, informs the recipient that a gift has been sent her way. The recipient Flirt may "Accept chat with gift", "Accept chat but decline gift", or "Decline chat and gift" by clicking on the corresponding buttons.

In some embodiments, the gift may be a virtual gift, such as a virtual hug, a virtual teddy bear, a virtual kiss, or a suitable image or animation sequence. In other embodiments, the gift may be of real value, for example a code that can be used to redeem purchases at physical stores such as Starbucks or online stores such as ITUNES.

Figure 35:
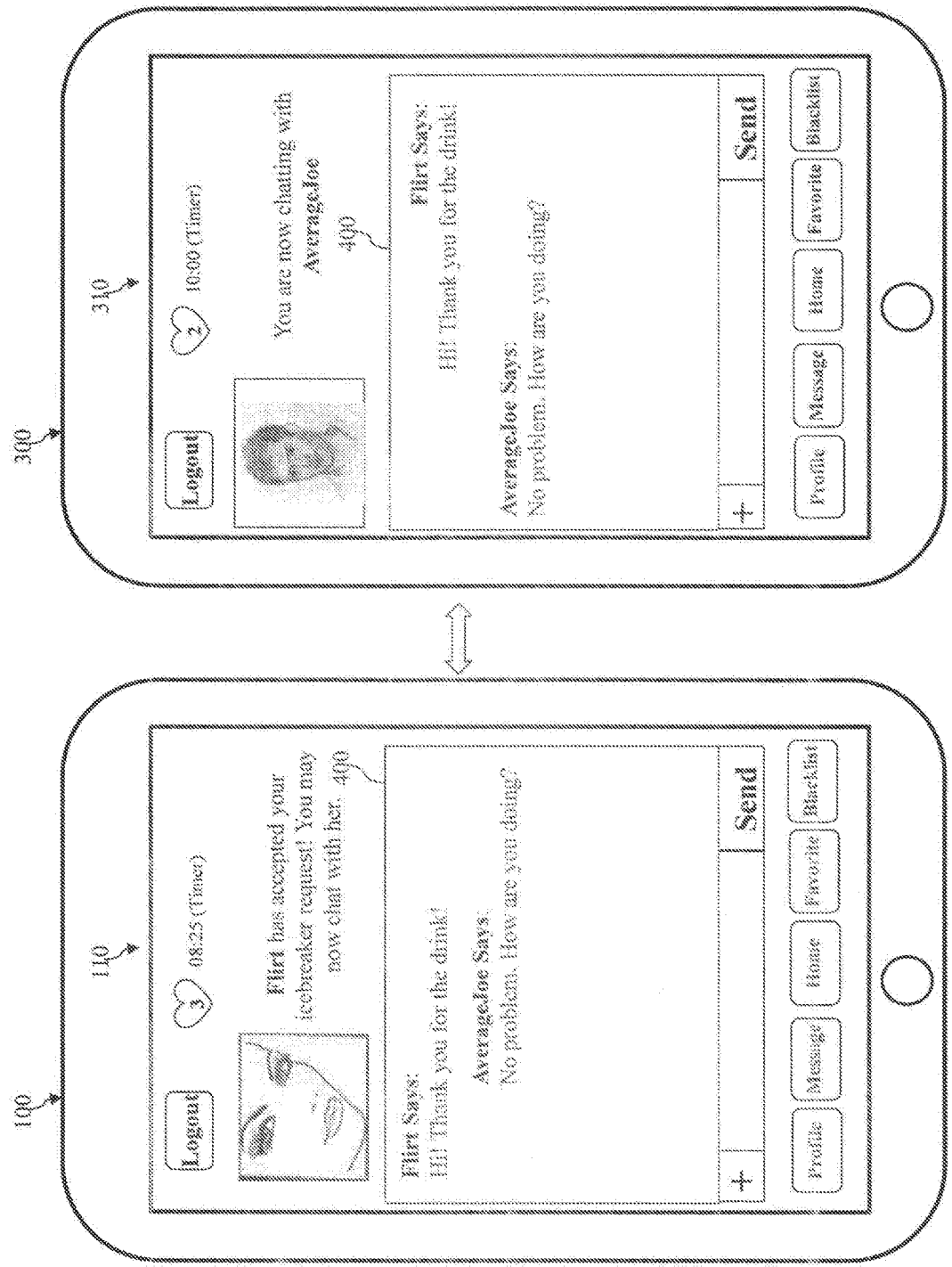

FIG. 35 illustrates an example of what is being displayed on the screens 110 and 310 of both of the users AverageJoe and Flirt, respectively, once a chat request has been accepted. In addition to having the profile pictures of Flirt and AverageJoe displayed on the other person's mobile computing device's screen, a chat window 400 is displayed, where AverageJoe and Flirt may send electronic messages back and forth.

Figure 36:
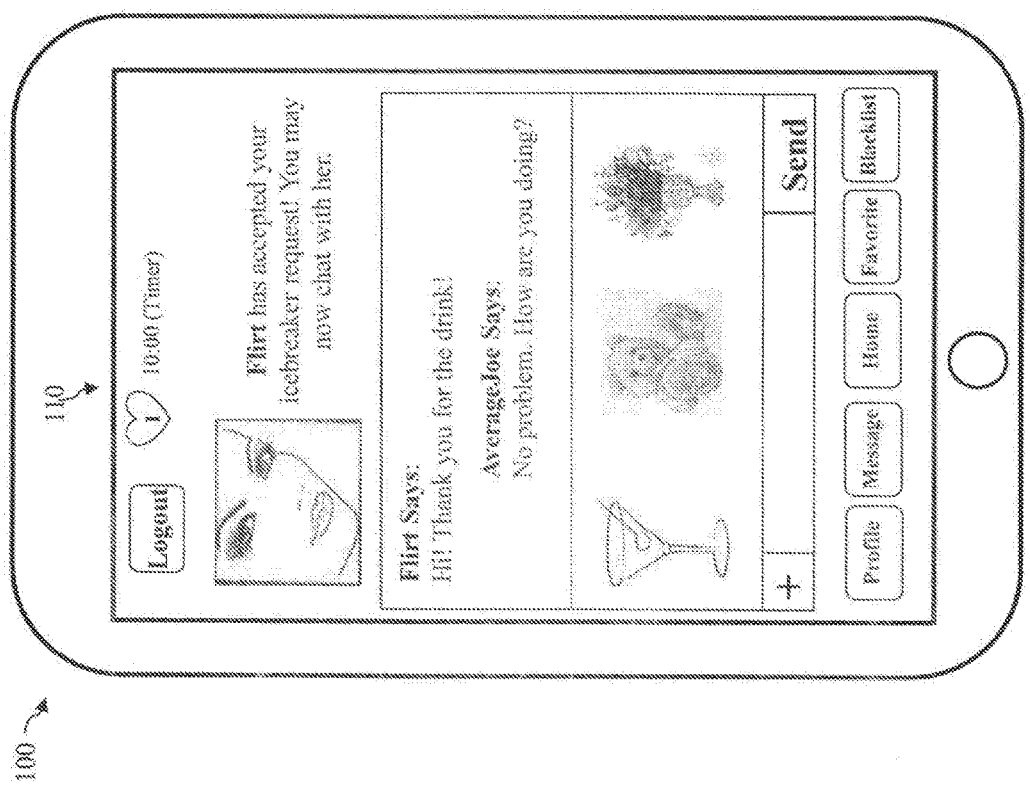

FIG. 36 illustrates an example of what each chat participant may send to the other party during the chat. For example, the user AverageJoe may click on the "+" button, which will trigger the display of a list of items available for sending to Flirt, such as a drink, a virtual teddy bear, a virtual flower, etc.

Figure 37:
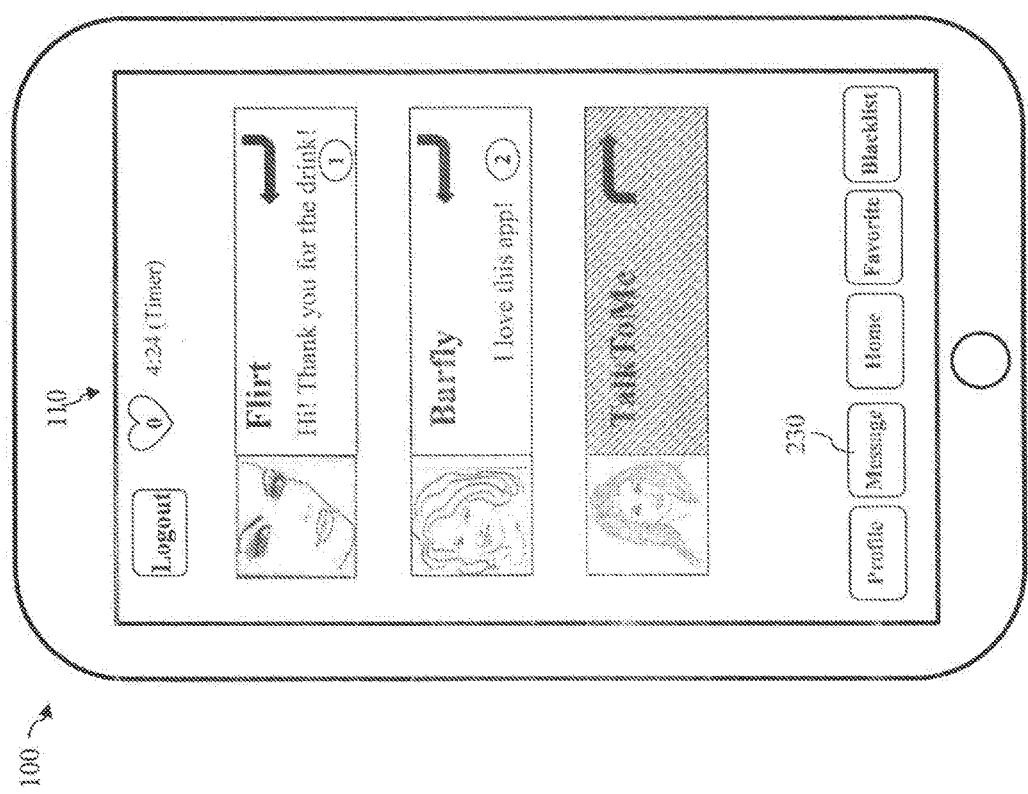

FIG. 37 illustrates an example message inbox on the screen 110 of AverageJoe's mobile computing device 100. He may get to this message inbox by clicking on the message button 230 at any time. The message inbox shows a list of active or inactive chats with various other participants. In the example shown herein, AverageJoe has established active chats with the participants Flirt and Barfly, but TalkToMe has not accepted AverageJoe's invitation to chat. In some embodiments, the inactive chats (e.g., the chat, with TalkToMe herein) may be visually distinguished from the active chats (e.g., the chats with Flirt and Barfly), for example the inactive chat may be grayed out.

Figure 38:
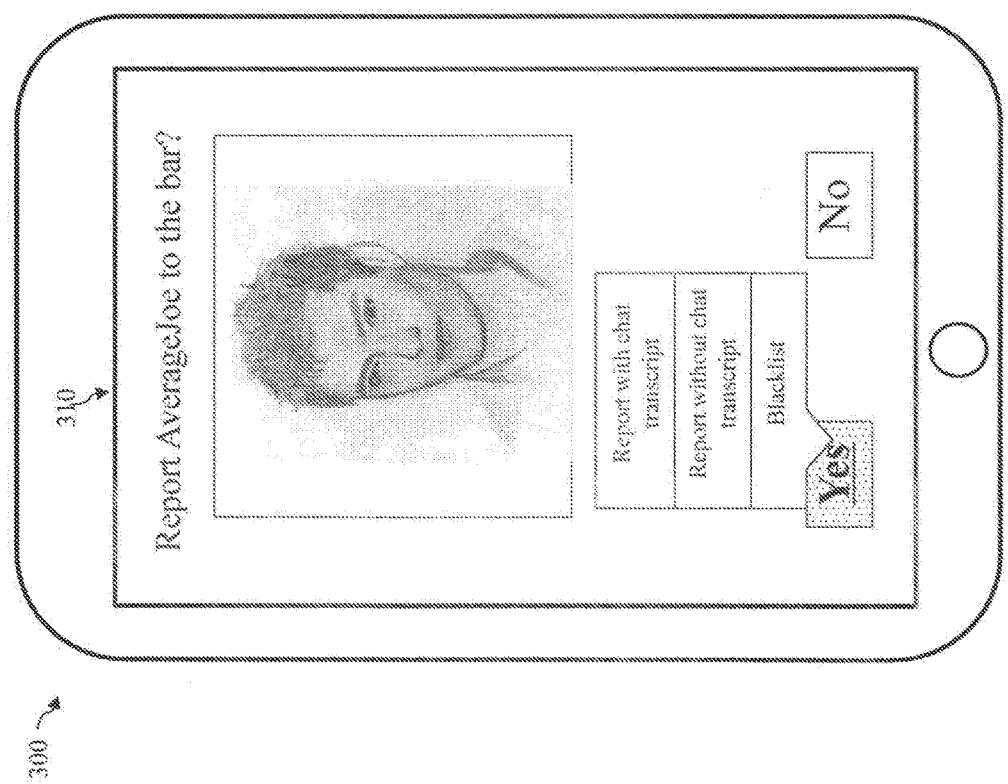

Flirt may also decline AverageJoe's chat request. And if AverageJoe (or any other user) consistently harasses Flirt and makes her feel uncomfortable, she may report that user to a manager or other personnel (hereinafter collectively referred to as the manager) at the venue. This is illustrated in FIG. 38, where the user Flirt is asked to confirm whether or not she wishes to proceed with the reporting. She is also given the option of continuing with the reporting with or without a copy of the chat transcript (or at least a portion thereof, for example the most recent messages within the last 30 minutes or the last 20 messages). If she chooses to send the report, the digital profile picture (and optionally the handle) of the offending user may be sent to an electronic device of the manager at the venue. In some embodiments, the user Flirt may report another offensive user anonymously. She can also elect to simply put the offending user on the blacklist instead of reporting him.

Figure 39:
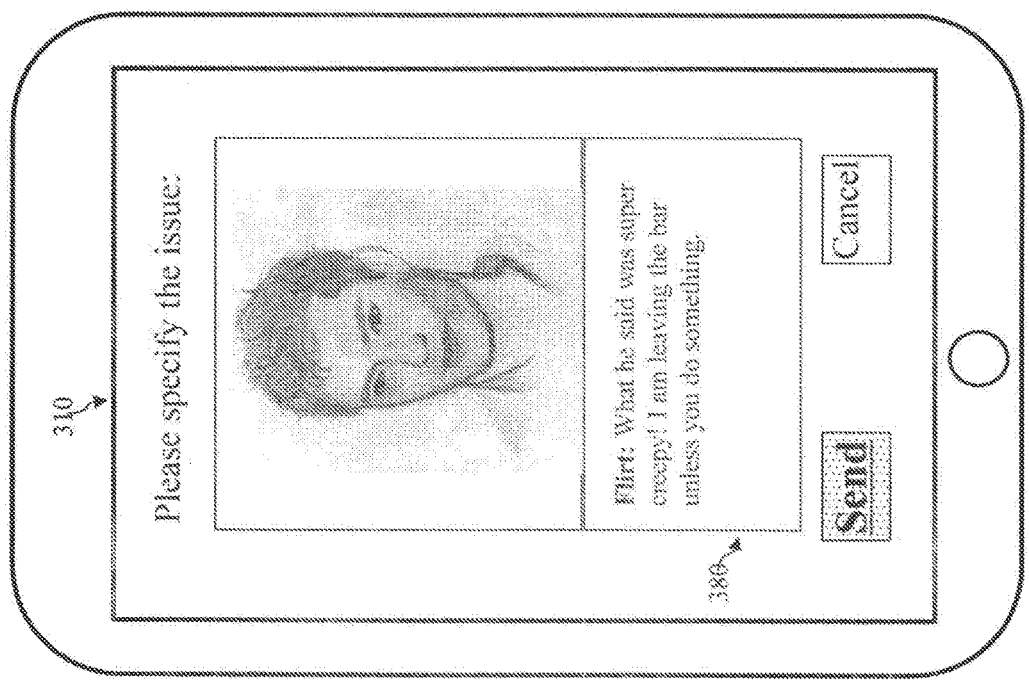

Referring now to FIG. 39, in some embodiments, if Flirt elects to not include a copy of the chat transcript, she will be prompted to specify the issue in a text box. The more specific she can describe the issue, the better equipped the manager at the venue may be to deal with the offending user.

Figure 40:
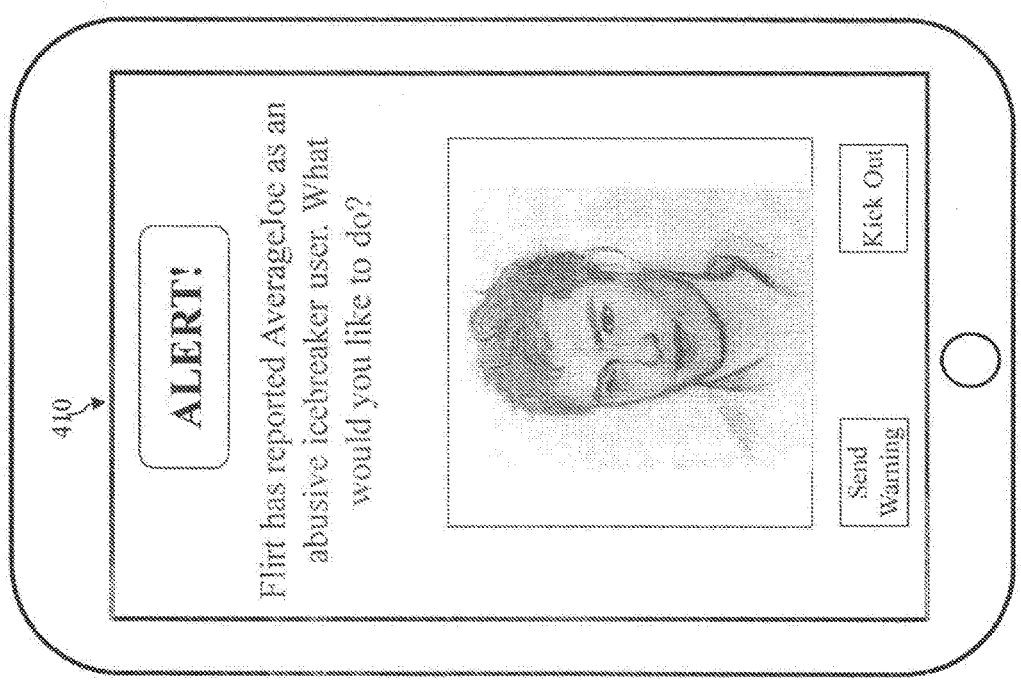

FIG. 40 displays a screen 410 of an example mobile computing device 400 of the manager at the venue after a report regarding an offensive user has been received. In this embodiment, the reporting user has chosen not to include a copy of the chat transcript, and therefore the manager of the venue may only receive an alert saying that the user AverageJoe has been reported, along with a picture and/or a handle of the reported user. In embodiments where the reporting is done anonymously, the reporting user's identity is not revealed to the manager. In response to the report, the manager may elect to send the reported user a warning message, or to kick him out of the virtual social network.

Figure 41:
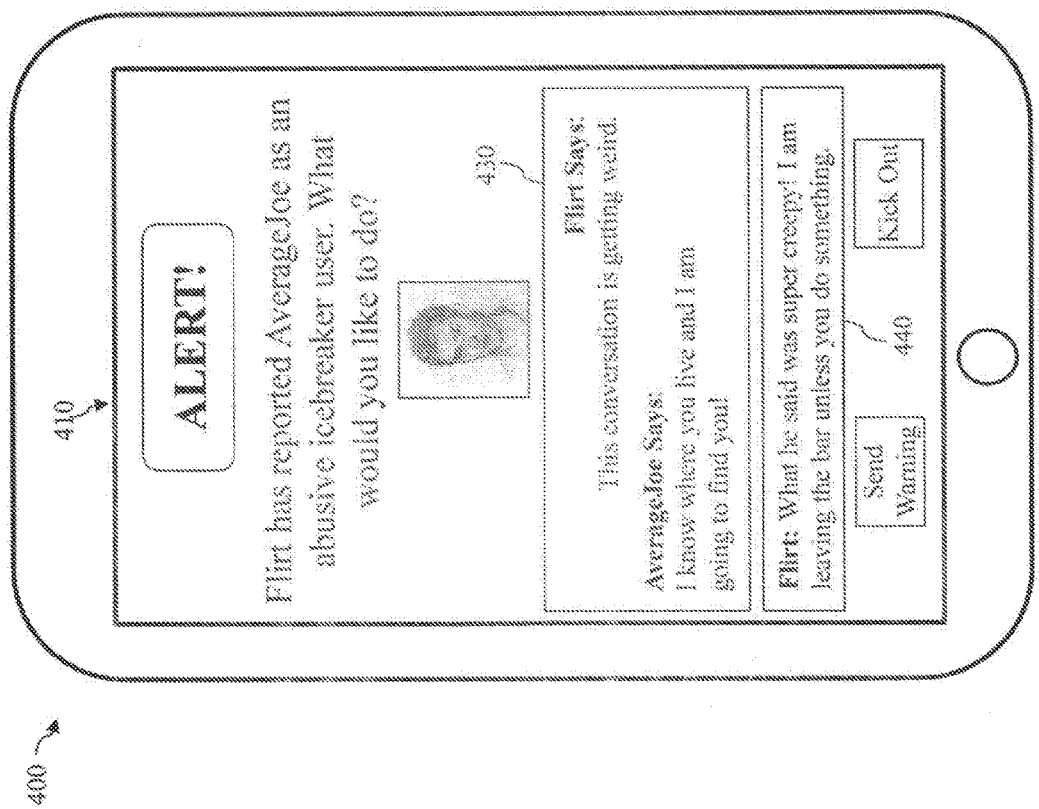

FIG. 41 displays a screen 410 of another example mobile computing device 400 of the manager at the venue after a report regarding an offensive user has been received. In this embodiment, the reporting user has chosen to include a copy of the chat transcript 430, as well as an explanation 440 of why the reported user made her feel uncomfortable. Again, the manager may elect to send the reported user a warning message, or to kick him out of the virtual social network in response to the report. In some severe situations, the manager may have the bouncer at the venue physically locate and remove the offending user from the venue. It is understood that although FIGS. 40-41 illustrate mobile computing devices such as smartphones or tablet computers as example electronic devices used by the manager at the venue to receive the report, the electronic devices may also be desktop or laptop computers in alternative embodiments.

Figure 42:
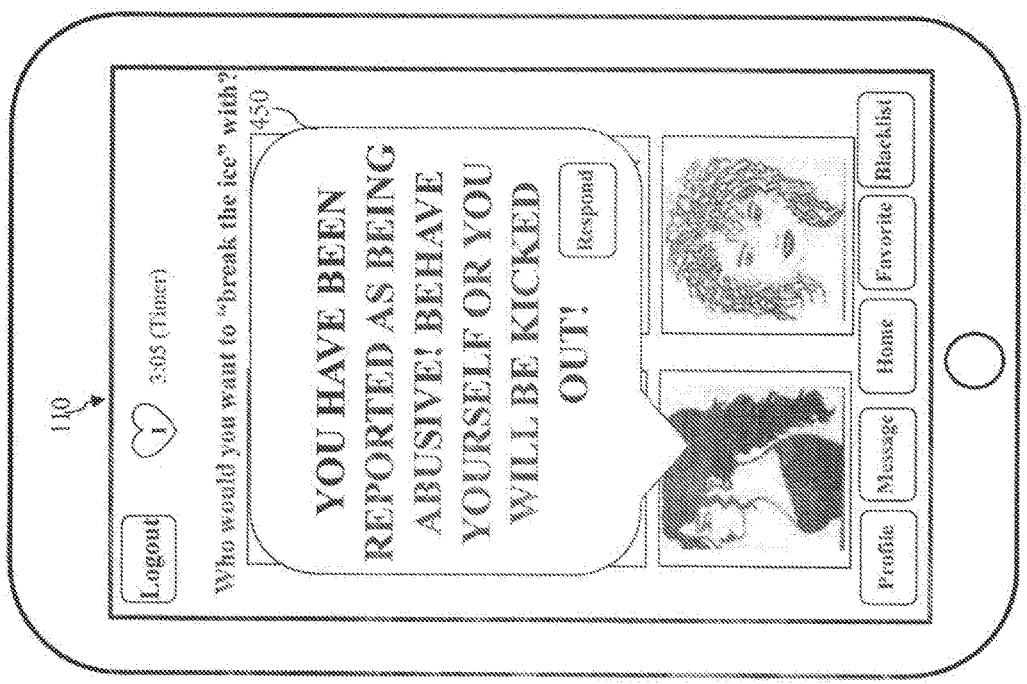

FIG. 42 displays the screen 110 of the user who has been reported now receiving a warning message from the venue in response to the reporting. He may receive a pop-up message 450 saying that he has been reported as being abusive and that he needs to behave. The user may then be given an option to respond to tell his side of the story if he wishes.

Figure 43:
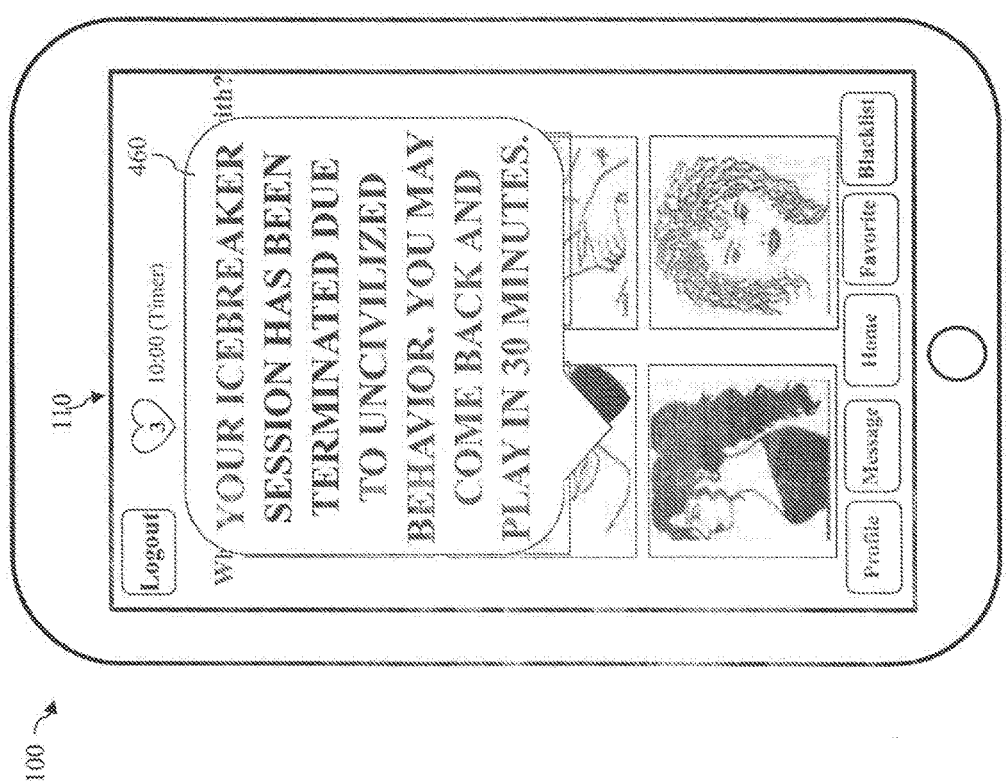

FIG. 43 displays the screen 110 of the user who has been reported now being kicked out of the virtual social network. He may receive a notification 460 from the venue that his icebreaker session has been terminated due to uncivilized behavior, and that he needs to wait a certain period of time before being allowed to rejoin. This will take him back to the home screen on the mobile computing device 100.

It is understood that although the embodiments discussed above use the manager at the venue as an example of receiving the reports/complaints from the alleged harassment victims and warning or disciplining the alleged offensive users, these tasks may be alternatively performed by a remote server as well.

The ability to electronically report offensive and creepy users is beneficially for participants of the social network, especially for female participants. Often times, a woman may be offended by the behavior of another person (typically a male) who is attempting to engage with her. In a real world physical setting, though she may find such behavior offensive, she may not feel comfortable enough to actually alert the bar manager or bouncer, because she does not want to "make a big deal out of it." Also, without any witnesses or hard evidence, it may be a "he said" "she said" issue. In other words, the bar manager may not take her complaint seriously because he may feel that her story may is one sided.

In comparison, the electronic reporting or complaint of another offensive user in the context of the present disclosure is convenient and does not require the reporting user to actually explain in person to the bar manager what is bothering her. Thus, she may feel more comfortable reporting offensive behavior. Furthermore, with the ability to include a digital picture of the offending user and the chat transcript, she can show the manager exactly who and what made her feel uncomfortable. This also lends more credence to her story, and the bar manager may be able to take corrective actions with more confidence. As a result, the overall social environment at the bar may be improved.

Figure 44:
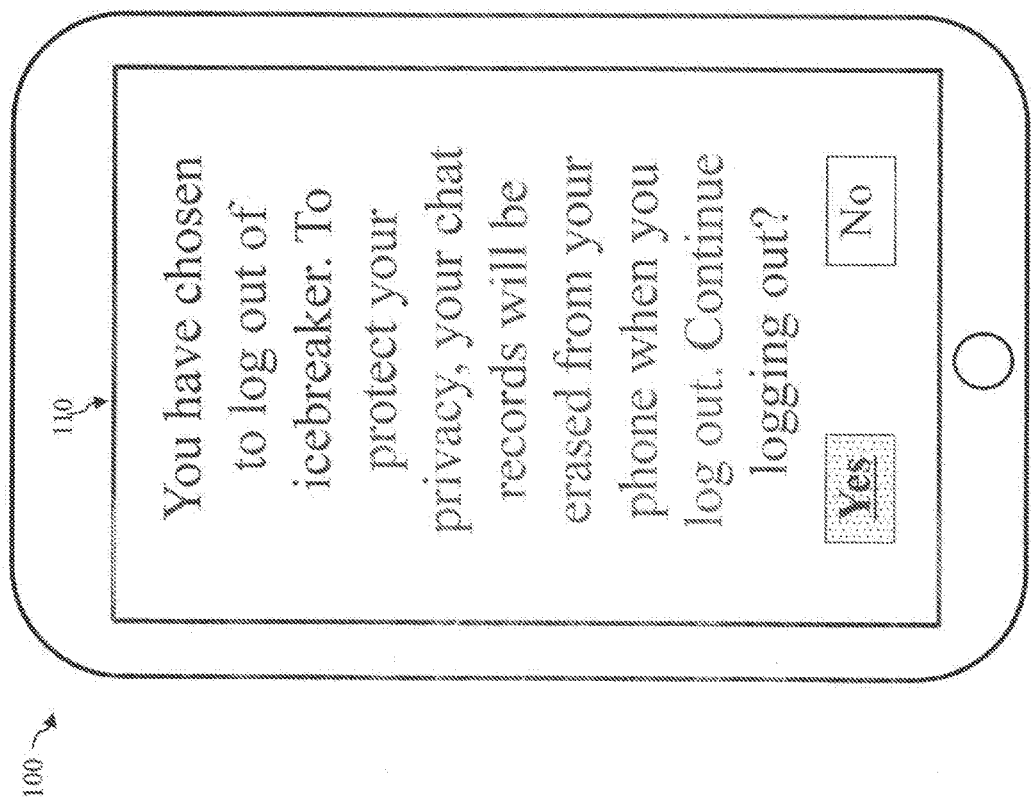

FIG. 44 illustrates an example logout screen when the user chooses to exit the virtual social network. To protect the user's privacy, the user will be alerted that the electronic chat records produced as a result of the user's participation in the virtual social network will be erased by default. In this manner, the user may be saved from being reminded with embarrassing messages later on, particularly if his/her mobile computing device gets into the wrong hands.

In some embodiments, even if the user forgot to logout of the virtual social network, the mobile computing device 100 may still erase the electronic records related to the user's participation on the virtual social network by automatically detecting that the user has departed from the venue that was hosting the virtual social network. For example, the mobile computing device 100 may detect, via a GPS sensor implemented thereon, that the user has moved from the venue by a distance exceeding a predetermined threshold, for instance more than half a mile or a quarter of a mile from the geographical location of the venue.

Alternatively, the mobile computing device 100 may detect a break with the Wi-Fi signal at the venue. Based on the occurrence of these events, the mobile computing device 100 may determine that the user has moved on from the venue, and thus the mobile computing device 100 will force an exit from the virtual social network and wipe out the electronic records pertaining to the session from the mobile computing device 100 itself, even though he/she did not specifically choose to exit the virtual social network.

In yet another embodiment, the mobile computing device 100 may detect that it has physically remained at the venue for a period of time exceeding a predetermined threshold (e.g., longer than 12 hours). This may be done either by the GPS sensor on the mobile computing device 100 detecting no movement or very little movement of the mobile computing device 100 within the past number of hours, or by the mobile computing device 100 detecting a continuous connection with the wireless network at the venue. In response to this detection, the mobile computing device 100 may force an exit from the virtual social network automatically and again erase all the electronic records from itself. This is because this situation likely indicates that the user has forgotten or lost his/her mobile computing device 100 at the venue. Thus, to prevent authorized access thereto, the mobile computing device 100 will erase the electronic records pertaining to the user's involvement on the victual social network.

In some embodiments, the exiting of a user's session from the virtual social network not only erases the electronic records produced by the session front his/her mobile computing device also causes the electronic records to be erased from the mobile computing devices of other users who have been interacting with the user. For example, when user A logs out of the virtual network (or if her physical departure was detected, etc.), her mobile computing device will erase, from itself all the electronic records pertaining to her most recent session at the virtual social network. In addition, if she had been chatting with a user B, then such chat records will also be erased from user B's mobile computing device. This may be accomplished, for example, by having the mobile computing device of user A send an electronic signal upon the detected exit of user A. The signal is received by the mobile computing device of User B and is interpreted as a request to erase the appropriate electronic records (e.g., chats) involving user A. Thus, if user B had been charting with users A and C, then only the chat records involving user A will be erased, but user B may still carry on a chat with user C, that is, until user B or C exits the virtual social network.

The automatic erasure electronic records affords the users another level of privacy and security. Conventional text messages have produced many embarrassing stories and tales, especially after a night of drinking/partying at a bar or club. Here, since the chat history and other electronic exchanges between the users are automatically erased, the users may feel more at east interacting with one another, as they have less fear or being haunted by an embarrassing message later.

Figure 45:
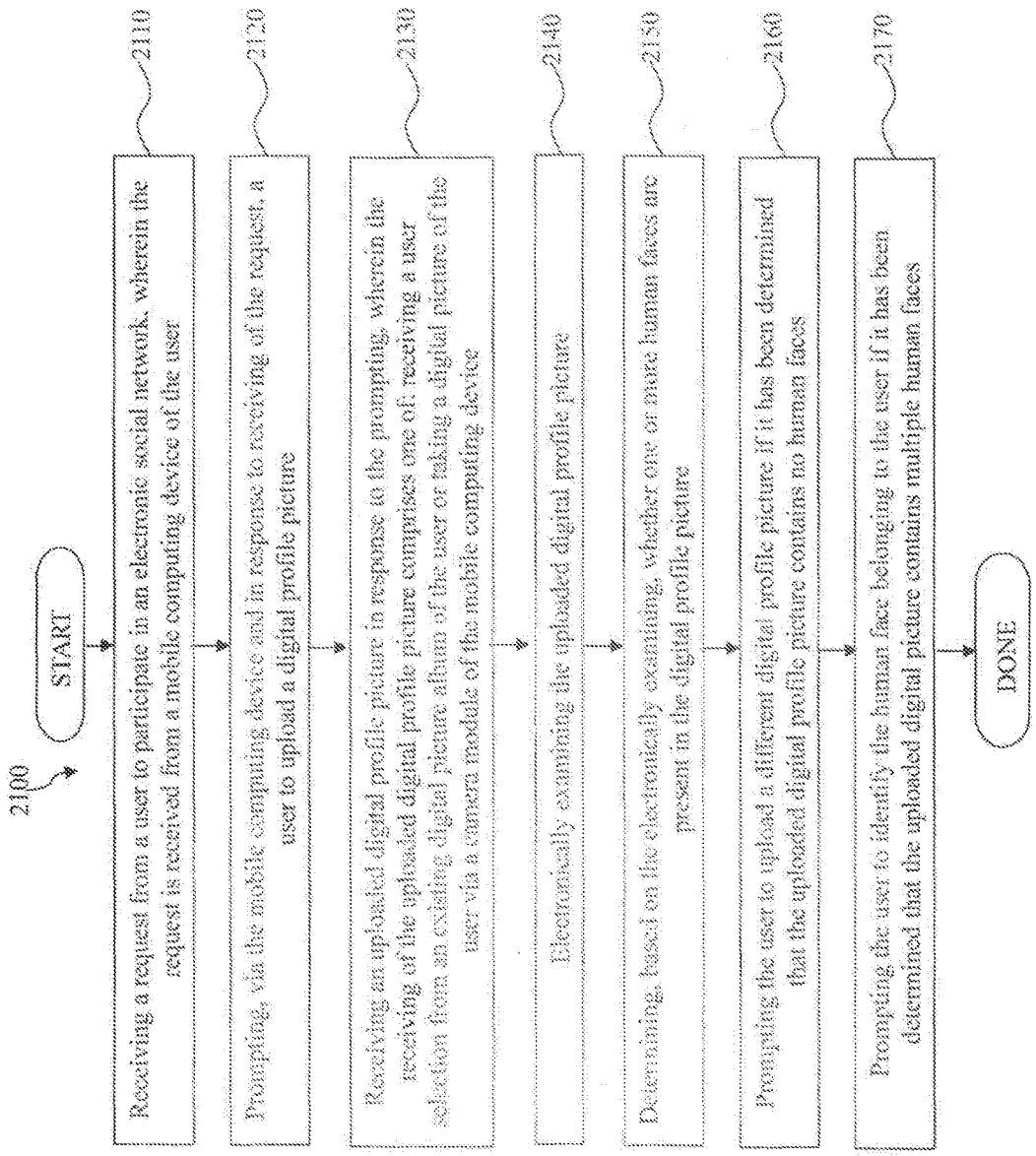
FIGS. 45-49 are flowcharts illustrating various example methods for using the mobile computing device to facilitate a user's participation on the electronic virtual social network according to various aspects of the present disclosure.

FIG. 45 is a simplified flowchart illustrating a method 2100 for electronically identifying users via a mobile computing device within an electronic social networking context discussed above according to some embodiments. In some embodiments, the mobile computing device includes a mobile telephone, a tablet computer, a laptop computer, or a smart watch or glass.

The method 2100 includes a step 2110 of receiving a request from a user to participate in an electronic social network. The request is received from a mobile computing device of the user.

The method 2100 includes a step 2120 of prompting, via the mobile computing device and in response to receiving of the request, a user to upload a digital profile picture.

The method 2100 includes a step 2130 of receiving an uploaded digital profile picture in response to the prompting. The receiving of the uploaded digital profile picture comprises one of: receiving a user selection from an existing digital picture album of the user or taking a digital picture of the user via a camera module of the mobile computing device.

The method 2100 includes a step 2140 of electronically examining the uploaded digital profile picture. In some embodiments, the electronically examining comprises detecting, in the uploaded digital picture, objects that resemble human eyes.

The method 2100 includes a step 2150 of determining, based on the electronically examining, whether one or more human faces are present in the digital profile picture. In some embodiments, the determining comprises determining that no human faces are present in the digital profile picture if no objects resembling human eyes are detected. In some embodiments, the determining comprises determining that multiple human faces are present in the digital profile picture if objects resembling multiple pairs of human eyes are detected.

The method 2100 includes a step 2160 of prompting the user to upload a different digital profile picture if it has been determined that the uploaded digital profile picture contains no human faces.

The method 2100 includes a step 2170 of prompting the user to identify the human face belonging to the user if it has been determined that the uploaded digital picture contains multiple human faces.

It is understood that unless otherwise specified, the steps 2110-2170 of the method 2100 are not necessarily performed in numerical order. It is also understood that addition steps may be performed before, during, or after the steps 2110-2170. For example, the method 2100 may include a step of making the digital profile picture of the user available for viewing on a plurality of other mobile computing devices whose users are participants of the electronic social network. The method 2100 may further include a step of before the making of the digital profile picture of the user available for viewing: preventing the user from participating in the electronic social network until it has been determined that: the uploaded digital picture contains only one human face; or the user has identified the human face belonging to the user if the uploaded digital picture contains multiple human faces. For reasons of simplicity, these additional steps are not discussed in detail herein.

Figure 46:
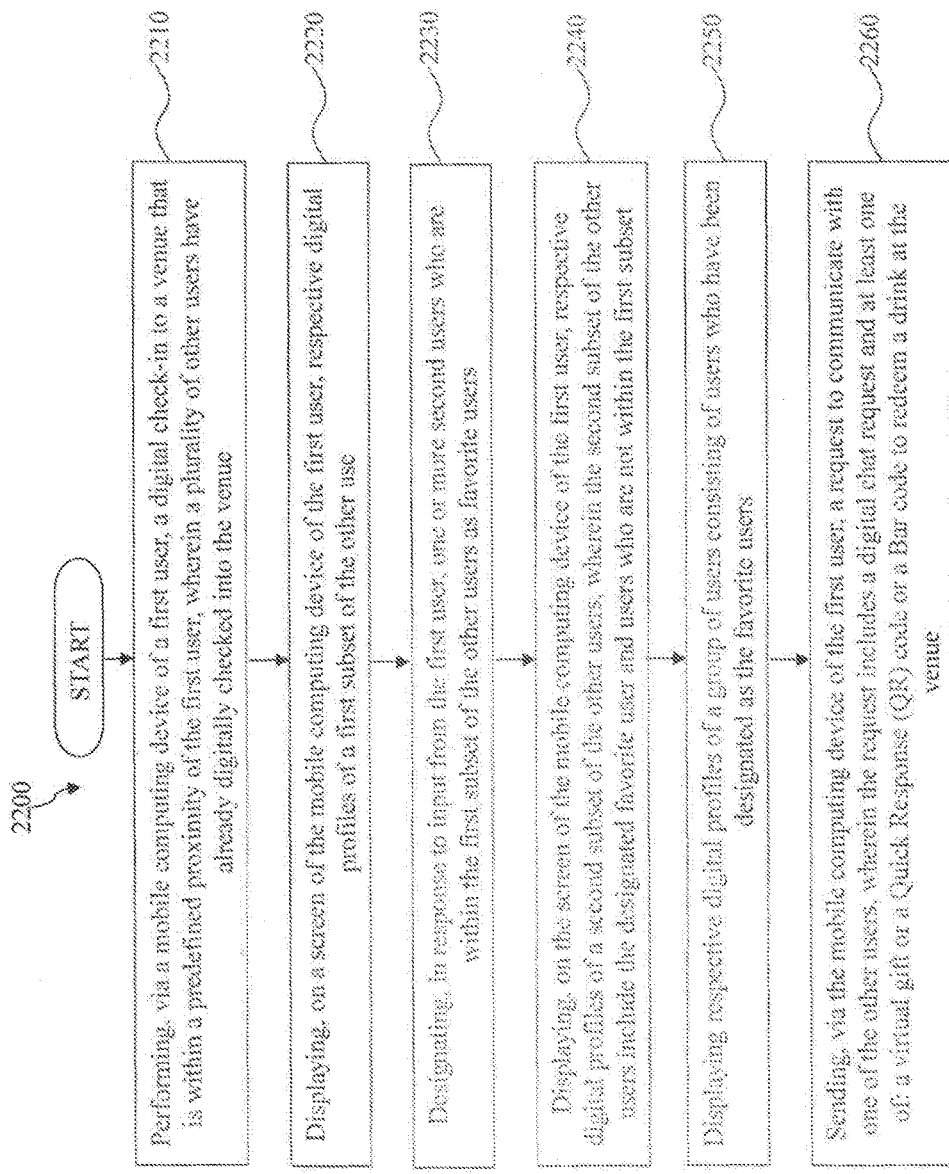

FIG. 46 is a simplified flowchart illustrating a method 2200 for viewing and selecting users via a mobile computing device within an electronic social networking context discussed above according to some embodiments. In some embodiments, the mobile computing device includes a mobile telephone, a tablet computer, a laptop computer, or a smart watch or glass.

The method 2200 includes a step 2210 of performing, via a mobile computing device of a first user, a digital check-in to a venue that is within a predefined proximity of the first user. A plurality of other users have already digitally clicked into the venue. In some embodiments, the venue includes a bar, a club, or a restaurant. In some embodiments, the step 2210 of performing the digital, check-in comprises establishing a wireless telecommunications connection with a network at the venue.

The method 2200 includes a step 2220 of displaying, on a screen of the mobile computing device of the first user, respective digital profiles of a first subset of the other users.

The method 2200 includes a step 2230 of designating, in response to input from the first user, one or more second users who are within the first subset of the other users as favorite users. In some embodiments, the step 2230 of designating comprises displaying a symbol on, or adjacent to, the digital profile of each of the one or more favorite users The method 2200 includes a step 2240 of displaying, on the screen of the mobile computing device of the first user, respective digital profiles of a second subset of the other users. The second subset of the other users includes the designated favorite user and users who are not within the first subset. In some embodiments, the first and second subsets of the plurality of other users have a different gender than the first user. In some embodiments, the users in the first and second subsets each have a gender that is one that is selected by the first user.

In some embodiments, the respective digital profiles of the first subset of the other users are displayed as a first grid, the respective digital profiles of the second subset of the other users are displayed as a second grid, and the digital profiles of the one or more favorite users occupy the same positions in both the first and second grids.

In some embodiments, the digital profiles of the first and second subsets of the users are displayed as a scrollable list, and the digital profiles of the one or more favorite users remain displayed on the screen as the list is being scrolled through.

The method 2200 includes a step 2250 of displaying respective digital profiles of a group of users consisting of users who have been designated as the favorite users.

The method 2200 includes a step 2260 of sending, via the mobile computing device of the first user, a request to communicate with one of the other users. The request includes a digital chat request and at least one of: a virtual gift or a Quick Response (QR) code or a Barcode to redeem a drink at the venue.

It is understood that, unless otherwise specified, the steps 2210-2260 of the method 2200 are not necessarily performed in numerical order. It is also understood that addition steps may be performed before, during, or after the steps 2210-2260. For reasons of simplicity, these additional steps are not discussed in detail herein.

Figure 47:
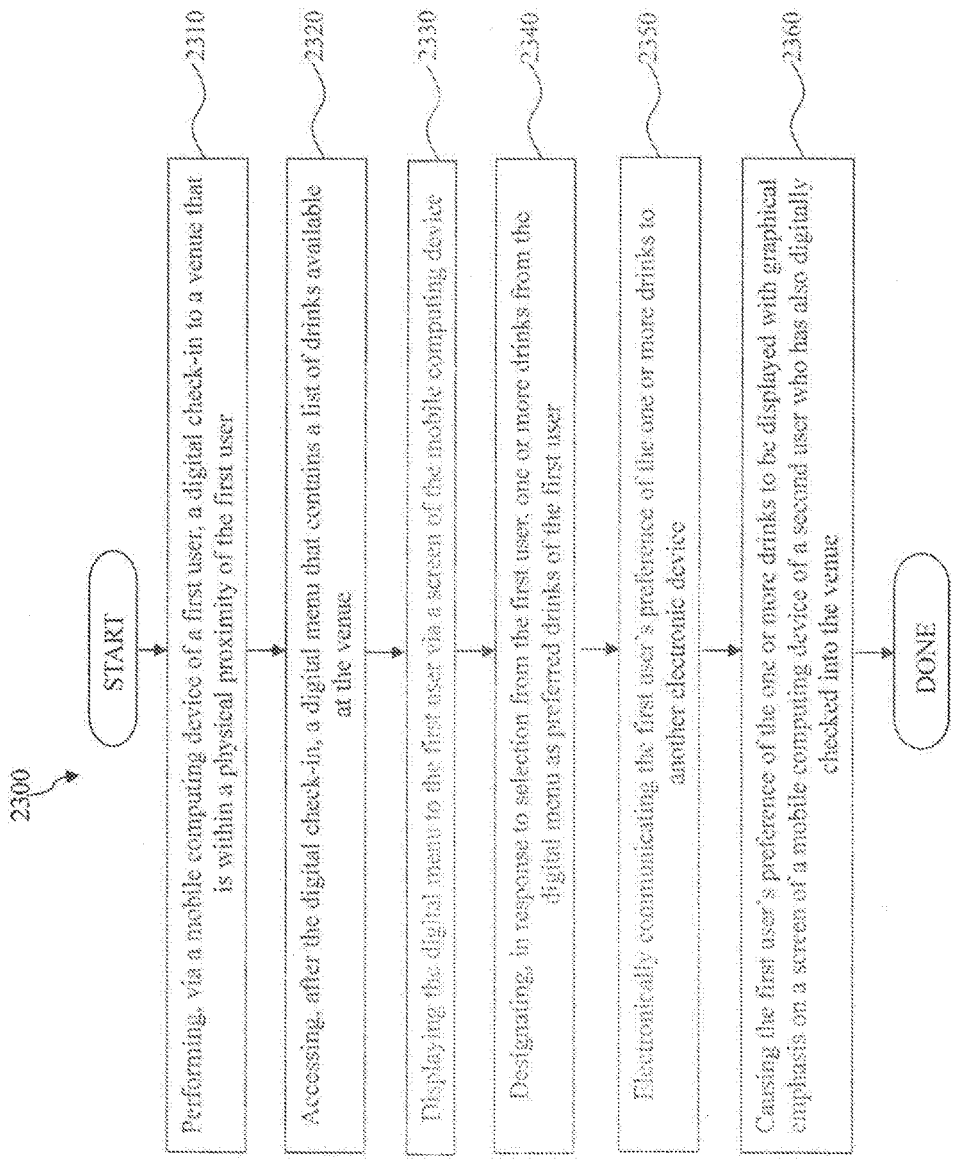

FIG. 47 is a simplified flowchart illustrating a method 2300 for selecting, displaying and purchasing favorite drinks for users via a mobile computing device within an electronic social networking context discussed above according to some embodiments. In some embodiments, the mobile computing device includes a mobile telephone, a tablet computer, a laptop computer, or a smart watch or glass.

The method 2300 includes a step 2310 of performing, via a mobile computing device of a first user, a digital check-in to a venue that is within a physical proximity of the first user.

The method 2300 includes a step 2320 of accessing, after the digital check-in, a digital menu that contains a list of drinks available at the venue.

The method 2300 includes a step 2330 of displaying the digital menu to the first user via a screen of the mobile computing device.

The method 2300 includes a step 2340 of designating, in response to selection from the first user, one or more drinks from the digital menu as preferred drinks of the first user.

The method 2300 includes a step 2350 of electronically communicating the first user's preference of the one or more drinks to another electronic device. In some embodiments, the step 2350 of electronically communicating comprises sending the first user's preference of the one or more drinks to a remote computer server. In some embodiments, the step 2360 of electronically communicating comprises sending the first user's preference of the one or more drinks to a mobile computing device of a second user The method 2300 includes a step 2360 of causing the first user's preference of the one or more drinks to be displayed with graphical emphasis on a screen of a mobile computing device of a second user who has also digitally checked into the venue. In some embodiments, the causing of the first user's preference of the one or more drinks to be displayed is performed in response to a request from the second user to electronically communicate with the first user via their respective mobile computing devices. In some embodiments, the request from the second user comprises a request from the second user to electronically order a drink from the digital menu and send the drink to the first user in a form of a digital coupon that can be used to redeem the drink. In some embodiments, the graphical emphasis includes one of: highlighting the one or more drinks on the digital menu; or showing the one or more drinks while hiding the rest of the drinks on the digital menu.

In some embodiments, the mobile computing device further includes a radio component. The step 2310 of performing of the digital check-in comprises establishing, via the radio component, a wireless connection with a network at the venue. The step 2350 of electronically communicating comprises sending the first user's preference of the one or more drinks to an electronic device on the network.

It is understood that, unless otherwise specified, the steps 2310-2360 of the method 2300 are not necessarily performed in numerical order. It is also understood that addition steps may be performed before, during, or after the steps 2310-2360. For reasons of simplicity, these additional steps are not discussed in detail herein.

Figure 48:
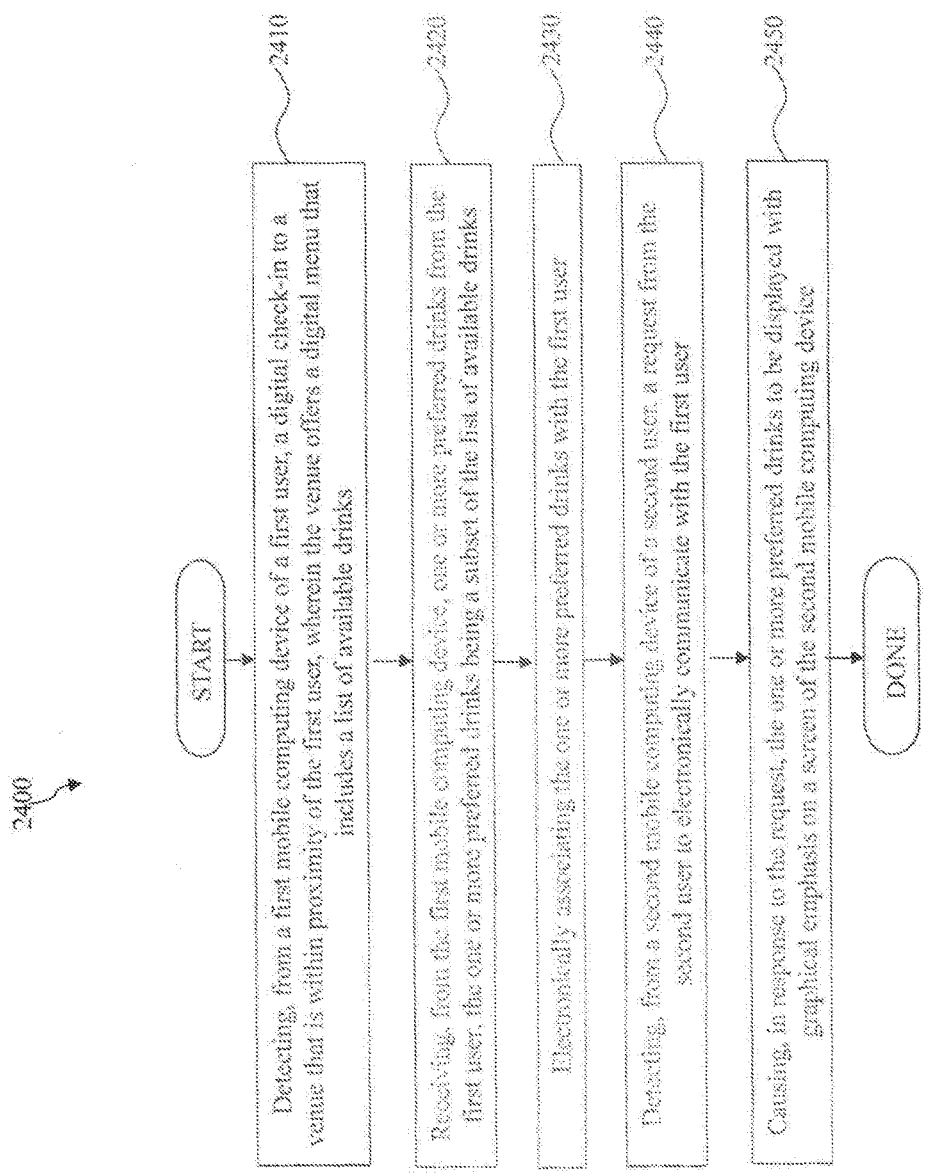

FIG. 48 is a simplified flowchart illustrating a method 2400 for selecting, displaying and purchasing favorite drinks for users via a mobile computing device within an electronic social networking context discussed above according to some embodiments. In some embodiments, the mobile computing device includes a mobile telephone, a tablet computer, a laptop computer, or a smart watch or glass.

The method 2400 includes a step 2410 of detecting, from a first mobile computing device of a first user, a digital check-in to a venue that is within proximity of the first user, wherein the venue offers a digital menu that includes a list of available drinks. In some embodiments, the step 2410 of detecting of the request comprises detecting a request from the second user to electronically order a drink from the digital menu and send a digital coupon to the first mobile computing device. The digital coupon is redeemable for at least one of the one or more preferred drinks of the first user.

The method 2400 includes a step 2420 of receiving, from the first mobile computing device, one or more preferred drinks from the first user, the one or more preferred drinks being a subset of the list of available drinks.

The method 2400 includes a step 2430 of electronically associating the one or more preferred drinks with the first user.

The method 2400 includes a step 2440 of detecting, from a second mobile computing device of a second user, a request from the second user to electronically communicate with the first user.

The method 2400 includes a step 2450 of causing, in response to the request, the one or more preferred drinks to be displayed with graphical emphasis on a screen of the second mobile computing device. In some embodiments, the graphical emphasis includes highlighting the one or more preferred drinks on the digital menu. In some embodiments, the graphical emphasis include displaying only the one or more preferred drinks but not the rest of the drinks on the digital menu.

It is understood that, unless otherwise specified, the steps 2410-2450 of the method 2400 are not necessarily performed in numerical order. It is also understood that addition steps may be performed before, during, or after the steps 2410-2450. For reasons of simplicity, these additional steps are not discussed in detail herein.

Figure 49:
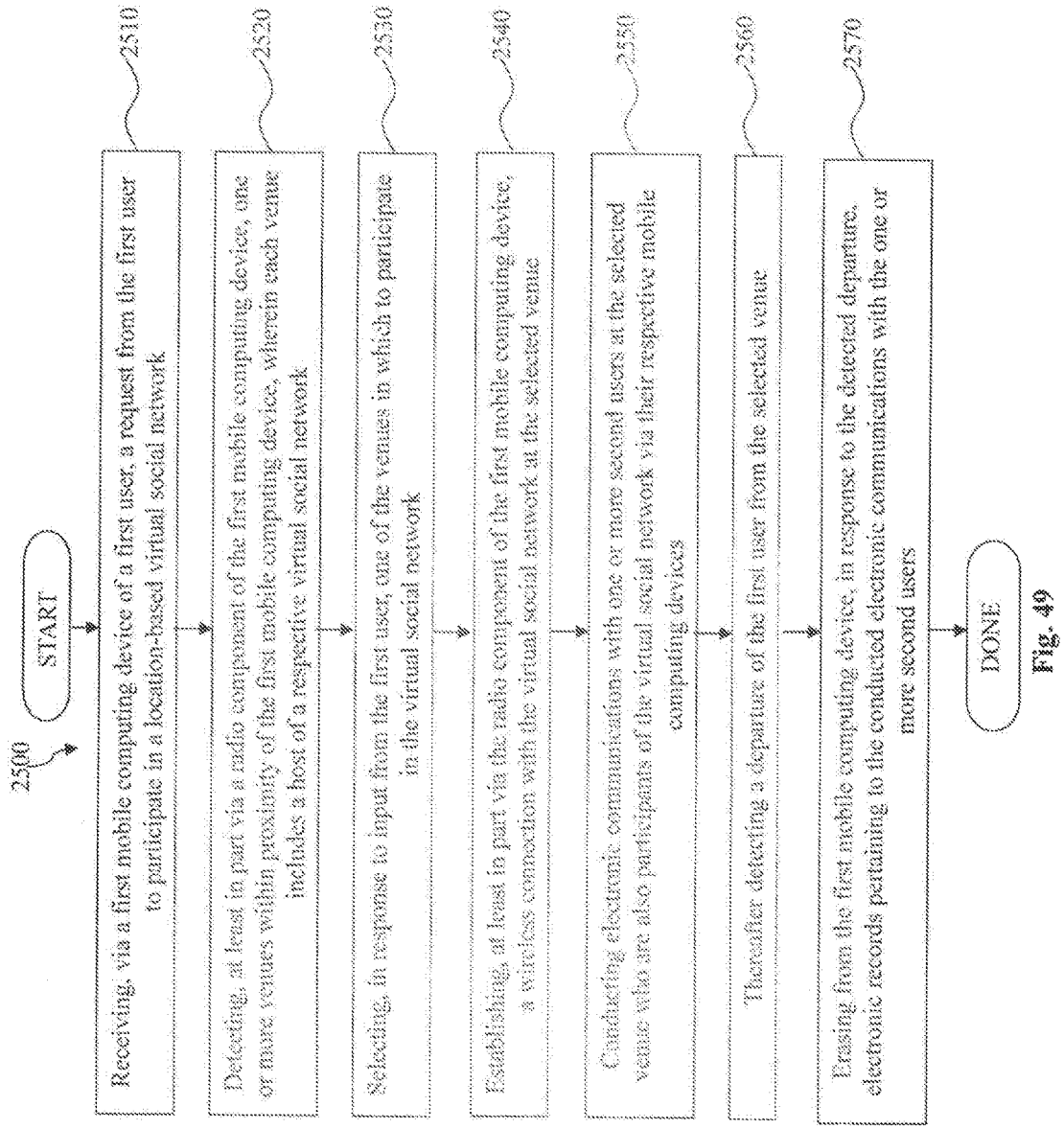

FIG. 49 is a simplified flowchart illustrating a method 2500 enhancing user privacy and security within a location-based virtual social networking context via a mobile computing device. In some embodiments, the mobile computing device includes a mobile telephone, a tablet computer, a laptop computer, or a smart watch or glass.

The method 2500 includes a step 2510 of receiving, via a first mobile computing device of a first user, a request from the first user to participate in a location-based virtual social network.

The method 2500 includes a step 2520 of detecting, at least in part via a radio component of the first mobile computing device, one or more venues within proximity of the first mobile computing device. Each venue includes a host of a respective virtual social network.

The method 2500 includes a step 2530 of selecting, in response to input from the first user, one of the venues in which to participate in the virtual social network.

The method 2500 includes a step 2540 of establishing, at least in part via the radio component of the first mobile computing device, a wireless connection with the virtual social network at the selected venue.

The method 2500 includes a step 2550 of conducting electronic communications with one or more second users at the selected venue who are also participants of the virtual social network via their respective mobile computing devices. In some embodiments, the step 2550 of conducting the electronic communications comprises one or more of the following: making a digital profile of the first user available for viewing on respective mobile computing devices of the one or more second users; sending chat requests to the one or more second users; receiving chat requests from the one or more second users; electronically chatting with the one or more second users; sending, to the one or more second users, a digital code that is redeemable for a drink at the selected venue; receiving, from the one or more second users, a digital code that is redeemable for a drink at the selected venue; sending a virtual gift to the one or more second users; and receiving a virtual gift from the one or more second users. In some embodiments, the step 2550 of conducting the electronic communications further comprises: blacklisting a selected one of the second users in response to a request from the first user; and thereafter making the digital profile of the first user unavailable for viewing on the mobile computing device of the blacklisted second user. In some embodiments, the making of the digital profile of the first user unavailable for viewing comprises causing the digital profile of the first user to disappear from the mobile computing device of the blacklisted second user. In some embodiments, the step 2550 of countering the electronic communications further comprises: reporting a selected one of the second users to the host of the virtual social network for harassment. The reporting comprises electronically sending, to the host, at least a portion of a chat transcript between the first user and the reported second user.

The method 2500 includes a step 2560 of thereafter detecting a departure of the first user from the selected venue.

The method 2500 includes a step 2570 of erasing from the first mobile computing device, in response to the detected departure, electronic records pertaining to the conducted electronic communications with the one or more second users.

It is understood that, unless otherwise specified, the steps 2510-2570 of the method 2500 are not necessarily performed in numerical order. It is also understood that addition steps may be performed before, during, or after the steps 2510-2570. For example, the method 2500 may include a step of: in response to the detected departure: causing the mobile computing devices of the one or more second users to erase electronic records pertaining to the conducted electronic communications with the first user. As another example, the method 2500 may include a step of determining that the first mobile computing device has maintained the wireless connection with the virtual social network at the selected venue for a period of time exceeding a predefined threshold; and erasing from the first mobile computing device, in response to the determining, electronic records pertaining to the conducted electronic communications with the one or more second users. For reasons of simplicity, additional steps are not discussed in detail herein.

Figure 50:
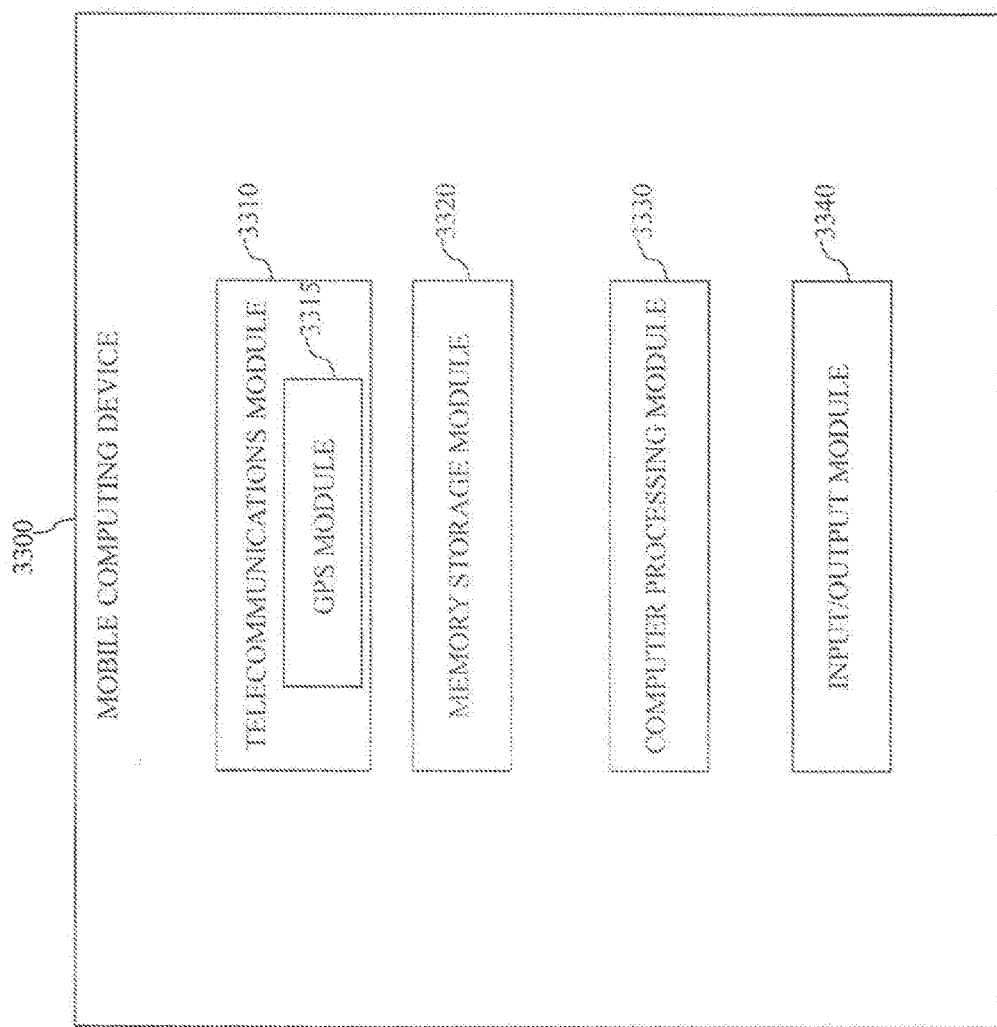
FIG. 50 is a simplified block diagram of an example mobile computing device for performing one or more of the processes of FIGS. 1-49 according to various aspects of the present disclosure.

FIG. 50 is a simplified clock diagram of an electronic device 3300 according to the various aspects of the present disclosure. The electronic device 3300 may be implemented as an embodiment of the mobile computing device 100 discussed above.

The electronic device 3300 includes a telecommunications module 3310, which may also be referred to as a radio component. The telecommunications module 3310 contains various electronic circuitry components configured to conduct telecommunications with one or more external devices. The electronic circuitry components allow the telecommunications module 3310 to conduct telecommunications in one or more of the wired or wireless telecommunications protocols, including communications protocols such as IEEE 802.11 (WiFi), IEEE 802.15 (Bluetooth), GSM, CDMA, LTE, WIMAX, DLNA, HDMI, etc. In some embodiments, the telecommunications module 3310 includes antennas, filters, low-noise amplifiers, digital-to-analog (DAC) converters, analog-to-digital (ADC) converters, and transceivers. The transceivers may further include circuitry components such as mixers, amplifiers, oscillators, phase-locked loops (PLLs), and/or filters. Some of these electronic circuitry components may be integrated into a single discrete device or an integrated circuit (IC) chip. By way of these transceivers, the telecommunications module 3310 may be used to establish connections to the venues hosting the electronic virtual social networks, or establish connections with other devices on the electronic virtual social network, or establish connections with a remote server.

The telecommunications module 3310 may also include a GPS module 3315. As discussed above, the GPS module 3315 may be used to determine the location of the electronic device 3300, or the departure of the electronic device 3300 from a certain venue, etc.

The electronic device 3300 may include a computer memory storage module 3320. The memory storage module 3320 may contain various forms of digital memory, such as hard disks, FLASH, SRAM, DRAM, ROM, EPROM, memory chips or cartridges, etc. Computer programming code may be permanently or temporarily stored in the memory storage module 3320, for example. In some embodiments, the computer memory storage module 3320 may include a cache memory where files can be temporarily stored.

The electronic device 3300 may also include a computer processing module 3330. The computer processing module 3330 may contain one or more central processing units (CPUs), graphics processing units (GPUs), or digital signal processors (DSPs), which may each be implemented using various digital circuit blocks (including logic gates such as AND, OR, HAND, NOR, XOR gates, etc) along with certain software code. The computer processing module 3330 may be used to execute the computer programming code stored in the memory storage module 3320.

The electronic device 3300 may also include an input/output module 3340, which may serve as a communications interface for the electronic device 3300. In some embodiments, the input/output module 3340 may include one or more touch-sensitive screens, physical and/or virtual buttons (such as power and volume buttons) on or off the touch-sensitive screen, physical and/or virtual keyboards, mouse, track balls, speakers, microphones, light-sensors, light-emitting diodes (LEDs), communications ports (such as USB or HDMI ports), joy-sticks, image-capture devices (for example cameras), etc. In some embodiments, the touch-sensitive screen may be used to display visual objects discussed above, for example the profile pictures of the users of the virtual social network, or the virtual gifts and digital vouchers. In alternative embodiments, a non-touch screen display may be implemented as a part of the input/output module 3340.

According to the various aspects of the present disclosure, the virtual social network software application may reside in the memory storage module 3320. It can be retrieved by the computer processing module 3310 for execution. During its execution, it may take command of the telecommunications module (e.g., the Wi-Fi transceiver or GPS module 3315 implemented therein) and/or the input/output module 3340 (e.g., to display objects on a screen and receive input from the screen), so as to facilitate the user's participation of the electronic virtual social network via the electronic device 3300. In some embodiments, the electronic device 3300 is equipped to execute the methods 2100-2500 described above with reference to FIGS. 45-40, respectively.

Figure 51:
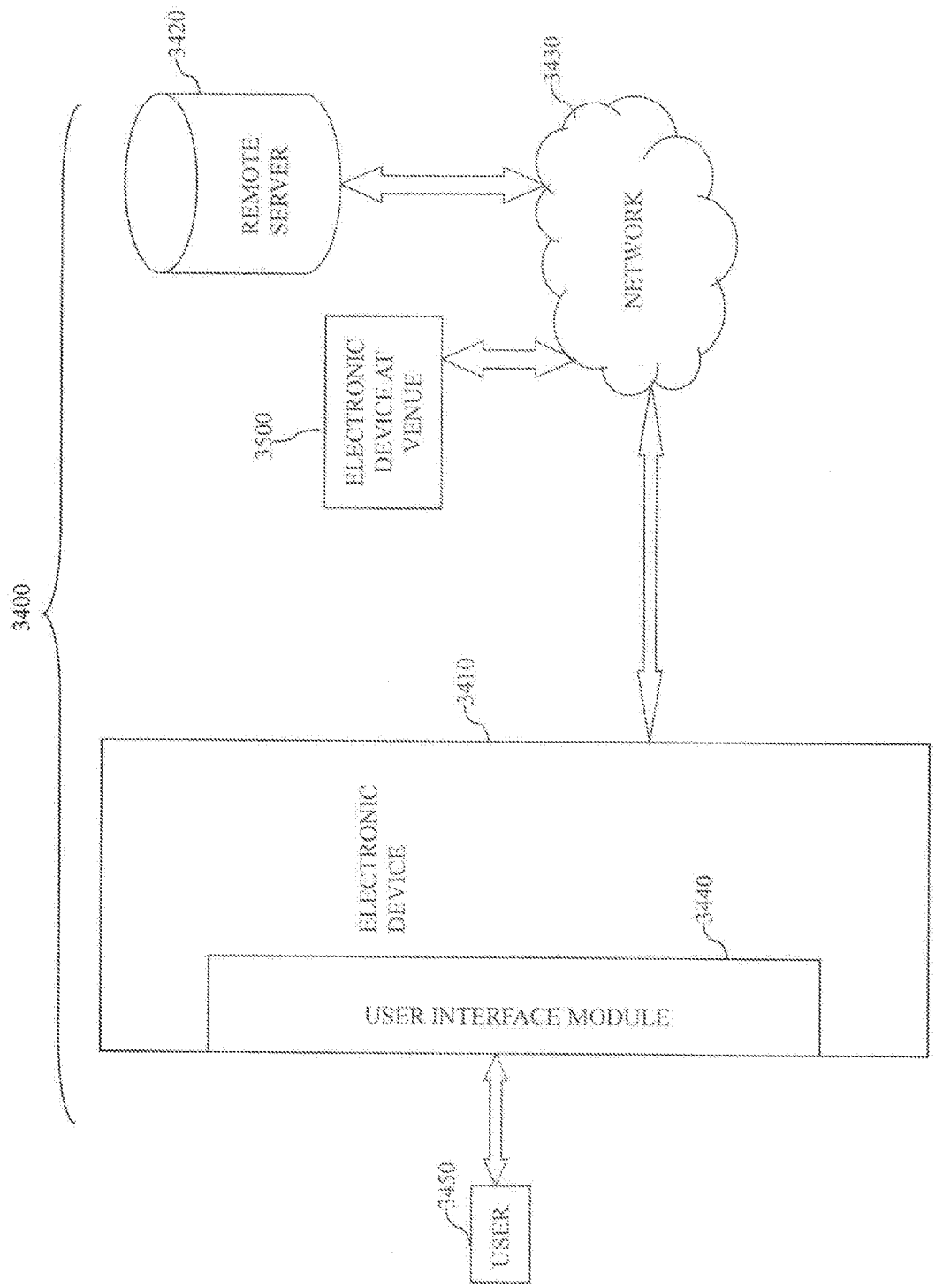
FIG. 51 is a simplified block diagram of an example system for performing one or more of the processes of FIGS. 1-49 according to various aspects of the present disclosure.

FIG. 51 is a simplified diagrammatic view of a system 3400 that may be used to carry out certain aspects of the electronic virtual social network of the present disclosure discussed above. In some embodiments, the system 3400 may include an electronic device 3410. The electronic device 3410 may be implemented as an embodiment of the electronic device 3300 of FIG. 50 (and therefore as an embodiment of the mobile computing device 100 discussed above). In some embodiments, the electronic device 3410 includes a tablet computer, a mobile telephone, a laptop, a smart watch, or a smart glass.

The system 3400 also includes a remote server 3420. The remote server 3420 may be implemented in a "cloud" computing environment and may include one or more databases that store files, for example the various files that can also be stored locally in the electronic device 3410 as discussed above. The remote server 3420 may also collect data from the electronic device 3410 to facilitate the user of the electronic device 3410's participation on the electronic virtual social outwork.

The electronic device 3410 and the remote server 3420 may be communicatively coupled together through a network 3430. The network 3430 may include cellular towers, routers, switches, hubs, repeaters, storage units, cabling (such as fiber-optic cabling or telephone cabling), and other suitable devices. The network 3430 may be implemented using any of the suitable wired or wireless networking protocols. The electronic device 3410 and the remote server 3420 may also be able to communicate with other devices on the network 3430 and either carry out instructions received from the network, or send instructions through the network to these external devices to be carried out.

To facilitate user's interaction with the electronic virtual social network, a service provider (that hosts or operates the remote server 3430) may provide a user interface module 3440. The user interface module 3440 may include software programming code and may be installed on the electronic device 3410 (for example in a memory storage module). In some embodiments, the user interface module 440 may include a downloadable "app" for example an app that is downloadable through a suitable service such as APPLE'S® ITUNES®, THE APP STORE® from APPLE®, ANDROID's® PLAY STORE®, AMAZON's® INSTANT VIDEO®, MICROSOFT's® WINDOWS STORE®, RESEARCH IN MOTION's® BLACKBERRY APP WORLD®, etc. In the embodiment shown, the user interlace module 3440 includes an instance of the "app" that has been downloaded and installed on the electronic device 3410. The app may also be used to perform the various aspects of the present disclosure discussed above, such as registering and participating on the virtual social network, detecting human faces in digital profile photos, browsing through the participants on the virtual social network, selecting favorite participants, buying and sending drinks and gifts to other participants, and reporting offensive participants, etc.

A user 3450 may internet with the system 3400 by sending instructions to the electronic device 3410 through the user interface module 3440. For example, the user 3450 may be a subscriber of the services offered by the service provider running/hosting/operating the remote server 3420. The user 3450 may attempt to log in to the remote server 3420 by launching the "app" of the user interface 3440. The users login credentials are electrically sent to the remote server 3420 through the network 3430. After verifying the user login credentials, the remote server 3420 may instruct the user interlace module 3440 to display a suitable interface to interact with the user in a suitable manner.

In some embodiments, the system 3400 further includes air electronic device 3500 that resides at a venue that is hosting the virtual social network. The electronic device 3500 may include a smartphone, a tablet computer, a desktop computer, a laptop computer, a wireless router, etc. The electronic device 3500 is communicatively coupled to the remote server 3420 and to the electronic device 3410 through the network 3430. As such, it may be used to host the virtual social network for participant users via their respective mobile computing devices. The electronic device 3500 may also be used to receive complaints (such as user reports) from the users on its virtual social network, as well as send messages to other users, or to discipline other users, for example by removing them from the virtual social network.

Another problem that exists in electronic social networking is a scam of fraud commonly known as "catfishing." Generally, catfishing in the electronic social networking context refers to someone who pretends to be someone they are not (e.g., by creating false identities or profiles) in order to engage in deceptive activities, for example deceptive activities involving romance or dating. The present disclosure also offers methods and apparatuses for preventing or discouraging catfishing and other deceptive practices in the electronic or virtual social networking context, as discussed below.

As discussed above with reference to FIGS. 1-51, the app 120A herein may be implemented as an embodiment of the "icebreaker" app. Specifically, the app 120A may be used by a user X to purchase drinks, food, or other merchandise items at an entertainment venue. That user X may then send the purchased drink or food item to another user Y in the form of a scan-able QR (quick response) code or a barcode. The user Y may redeem the purchased drinks or ideal items at the entertainment venue by scanning the QR code or barcode. Users X and Y may be participants of an electronic social network, where they can browse through the profile pictures of other participants (e.g., members of the opposite sex) present at the entertainment venue, for example at a bar. These participants may message one another via the app 120A installed on their respective mobile devices, and use the app 120A to buy and send the digital drink vouchers (containing the QR codes or barcodes) to one another. Frequently, a user X (e.g., a guy) may see a profile picture of an attractive girl via the app 120A. To facilitate conversation (or to "break the ice"), he may decide to buy her a drink—by sending her the digital drink voucher containing the QR code or barcode. She may then accept the drink voucher and redeem it at the bar for the desired drink.

However, a problem may arise when the person posing as the attractive girt is not really her. For example, a user (either man or woman) may take a picture of a random attractive girl (for example a picture of an attractive girl found on the internet) and use that picture as that user's own profile picture in order to gain attention from other users. That person may then receive one or more electronic drink vouchers—under the false pretense that he/she is the attractive girl in the profile picture—and redeem them for free drinks. This scam artist may choose to never see or talk to the sender of the drink voucher in person, and thus avoid being spotted as a poser. A similar scenario may occur where a user may use a fake picture of an attractive guy and use that picture as that user's own profile picture to get free electronic drink vouchers from other girls (or gay men) as well. If this type of catfishing occurs frequently, it may reduce the interest of users in participating in the social network and/or buying drink/food for other users.

According to the various aspects of the present disclosure, the user receiving the free drinks must also present a digital copy of the profile picture that the user has previously uploaded, so as to prove that the person receiving the drink is the same person as the person shown in the profile picture. In an example scenario, a user with the username "Flirt" is a participant at the virtual social network discussed above, and more specifically, she is at a particular physical venue (e.g., a bar or a restaurant) where the virtual social network is taking place. In other words, the user "Flirt" and other users may use the icebreaker app discussed above to electronically "check-in" to this venue, so that they can internet with other users via the app.

Figure 52:
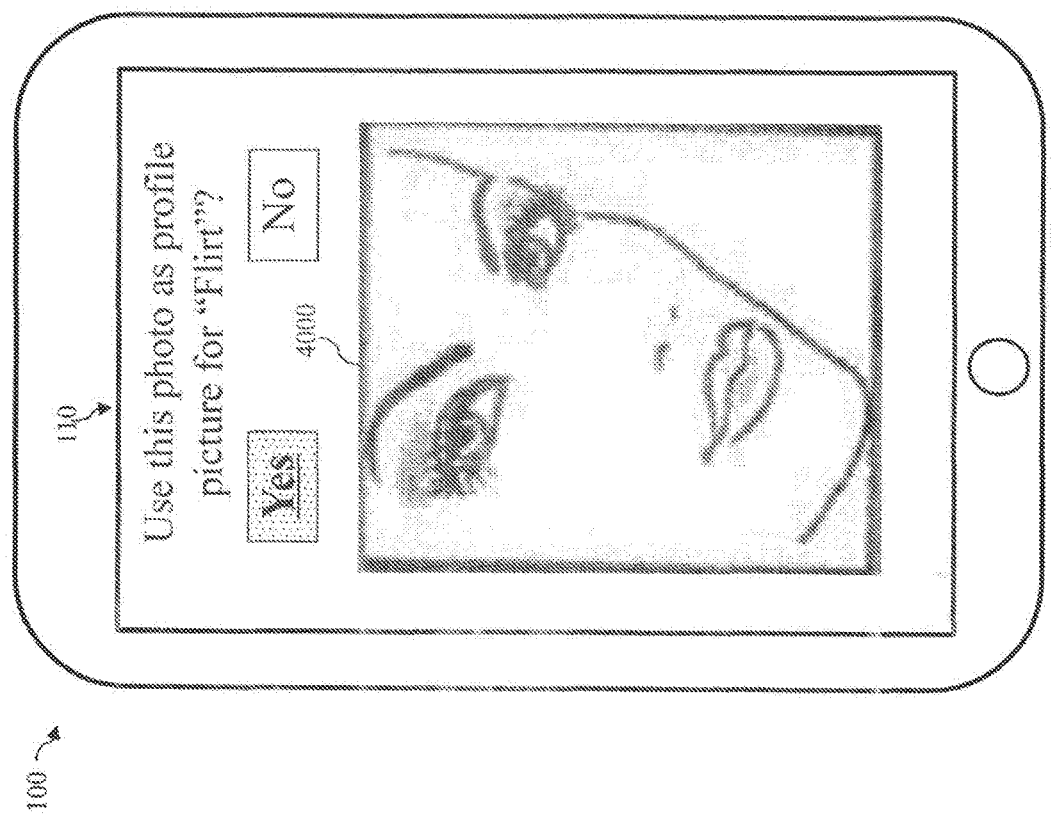
FIGS. 52-57 are diagrammatic views of one or more example mobile computing devices at various stages of participation with an electronic virtual social network according to various aspects of the present disclosure.

An a part of participating in the virtual social network, "flirt" is prompted to electronically upload a profile picture that is representative of a physical appearance of her. This may be done as a part of an initial user registration as discussed above with reference to FIGS. 3-11. Of course, it is understood that "Flirt" may revise or replace the profile picture any time after the initial user registration. In any case, the user "Flirt" uploads an electronic photograph 4000 as her profile picture 4000 via the icebreaker app in the embodiment shown in FIG. 52. This uploaded profile picture 4000 is saved in an electronic database, which may either be located remotely from the venue (e.g., a bar), or it may reside locally on the mobile computing device (e.g., smartphone) of the user "Flirt".

As discussed above with reference to FIGS. 15-24, participants of the virtual social network at the venue who are interested in interacting with other users will now see the profile picture 4000 as a representation of the physical appearance of the user "Flirt". In other words, since the social network at the venue is virtual, participants (i.e., the user's) only see the virtual representation of the other users, which is in the form of their user-supplied digital profile pictures. If any other user is interested in interacting with the user "Flirt", it is presumed that the motivation for the interaction is attributed to the profile picture 4000 uploaded by the user "Flirt". Stated differently, other users see (e.g., via the app on their respective mobile computing devices) the profile picture 4000 of the user "Flirt", and they may reasonably assume that the actual physical appearance of the user "Flirt" is consistent with the person portrayed in the profile picture 4000. Any subsequent interaction between other users and the user "Flirt" is perforated under by this assumption.

Suppose that another user "AverageJoe" sees the profile picture 4000 of the user "Flirt" and subsequently offers to the user "Flirt" a drink (in the form of an electronic voucher or coupon discussed above), so as to "break the ice" with "Flirt." "Flirt" may get a notification similar to what is shown in FIG. 31 or 32 and may decide whether to accept the drink or not. In some embodiments, if the recipient (in this case, "Flirt") accepts the drink offer, a digital code such as a QR code or a barcode is generated. In other embodiments, the digital code is generated as soon as the sender (in this case, "AverageJoe") offers to buy the drink for the recipient. Regardless, the generated digital code contains sufficient information such that an operator of the virtual social network will be able to identify the drink that is being offered to the recipient. This information may be conveyed to appropriate personnel at the venue (e.g., a bartender) if necessary, so that the personnel can prepare the drink for the user.

Figure 53:
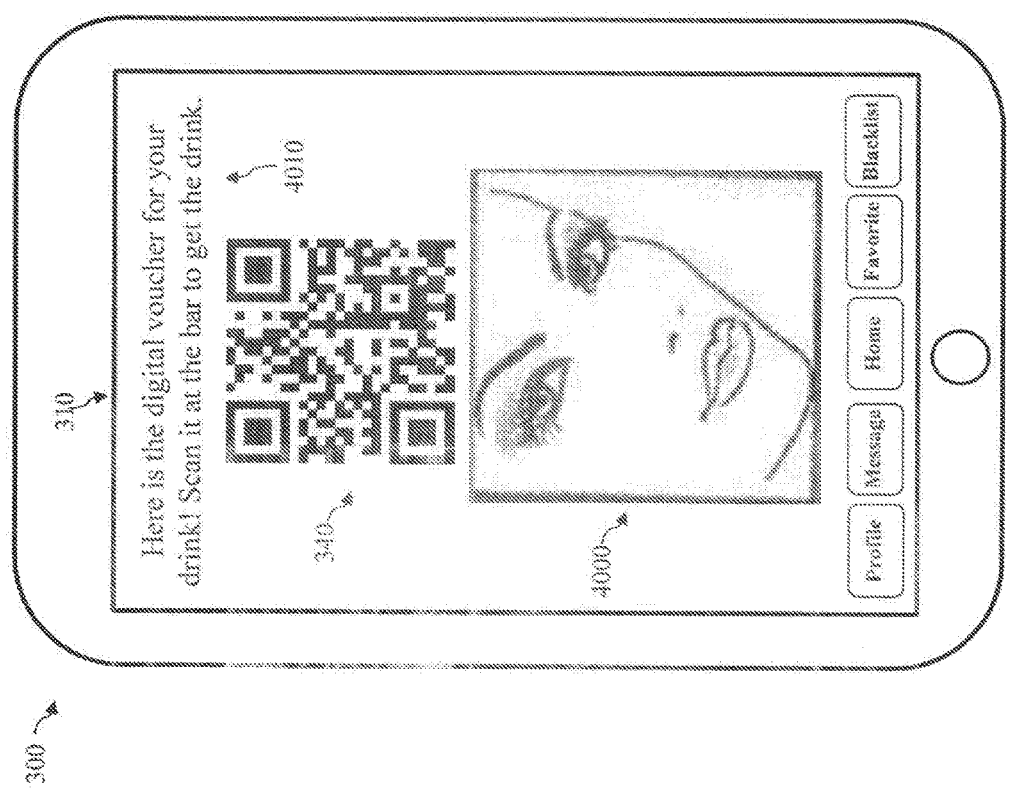

According to the various aspects of the present disclosure, once the digital code is generated, it is presented on the recipient's (i.e., "Flirt") mobile computing device alongside the profile picture uploaded by the recipient. One embodiment of this is shown in FIG. 53, where the icebreaker app of displays a screen 310 on the mobile computing device of "Flirt." The screen 310 contains a QR code 340 containing embedded digital data (e.g., drink order information), which can be retrieved or read digitally in response to an electronic scan.

The screen 310 also contains a digital copy of the profile picture 4000 uploaded by "Flirt". The digital copy of the profile picture 4000 is displayed adjacent to (for example, above, below, to the left or right) of the QR code 340. Note that "adjacent to" as used herein may include embodiments where the profile picture 4000 and the QR code 340 are separated by a certain amount of distance, or even by other visual objects or texts in between. The screen 310 further contains a message 4010 informing "Flirt" that the QR code 340 may be scanned at the bar to redeem a drink. In that sense, the QR code 340 represents an electronic/digital coupon or voucher. It is also understood that the entire screen 310 may be considered the electronic/digital coupon or voucher as well. The reason for displaying the OR code 340 on the same screen as the profile picture 4000 supplied by the recipient of the drink voucher is to prevent fraud, for example fraud related to catfishing, which will be discussed below in more detail.

Figure 54:
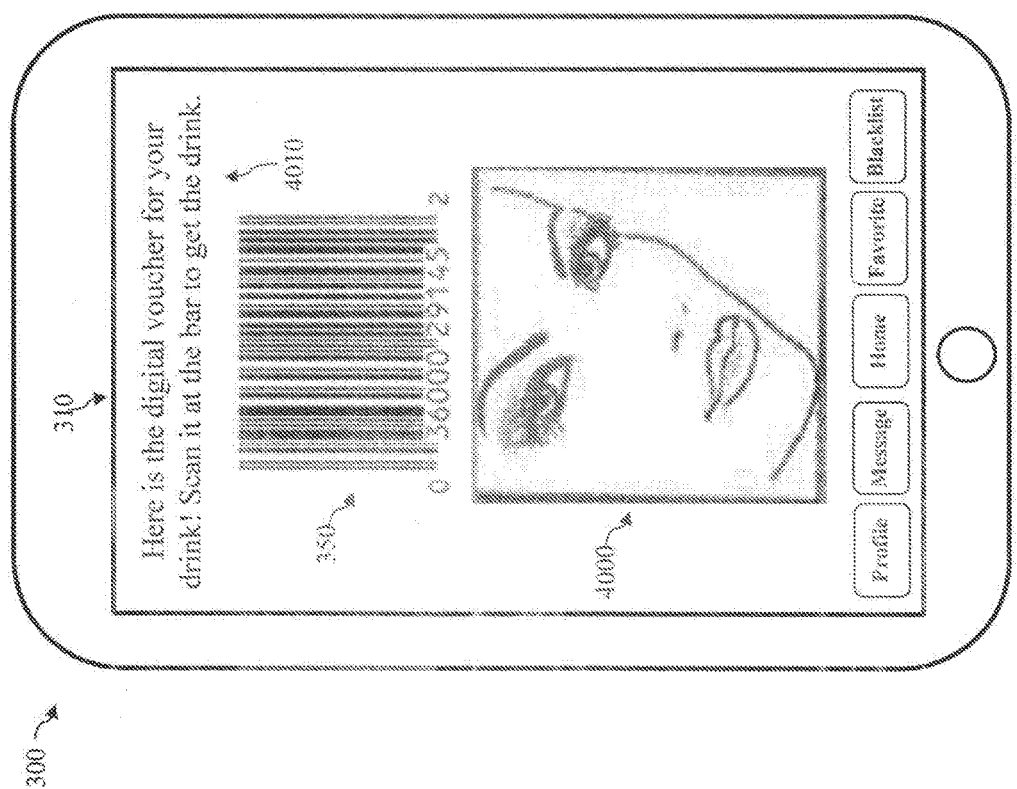

FIG. 54 illustrates an alternative embodiment of the screen 310, where the QR code 340 has been replaced with a barcode 350. The barcode 350 typically does not contain as much digital information as the QR code 340, but the digital information embedded in the barcode 350 may still be sufficient to allow drink order information to be extracted in response to an electronic scan. The remaining aspects of the screen 310 shown in FIG. 54 are similar to the screen 310 shown in FIG. 53. Note that in the embodiments shown in FIG. 53 or FIG. 54, neither of the screen 310 displays the personal information of the user "Flirt". For example, her real name is not included on the screen 310 (which is at least in part due to the fact that she has not supplied this information). Even her username "Flirt" was not displayed in the embodiments of FIGS. 53-54 in order to protect her privacy. However, it is understood that the username may be displayed in alternative embodiments.

Figure 55:
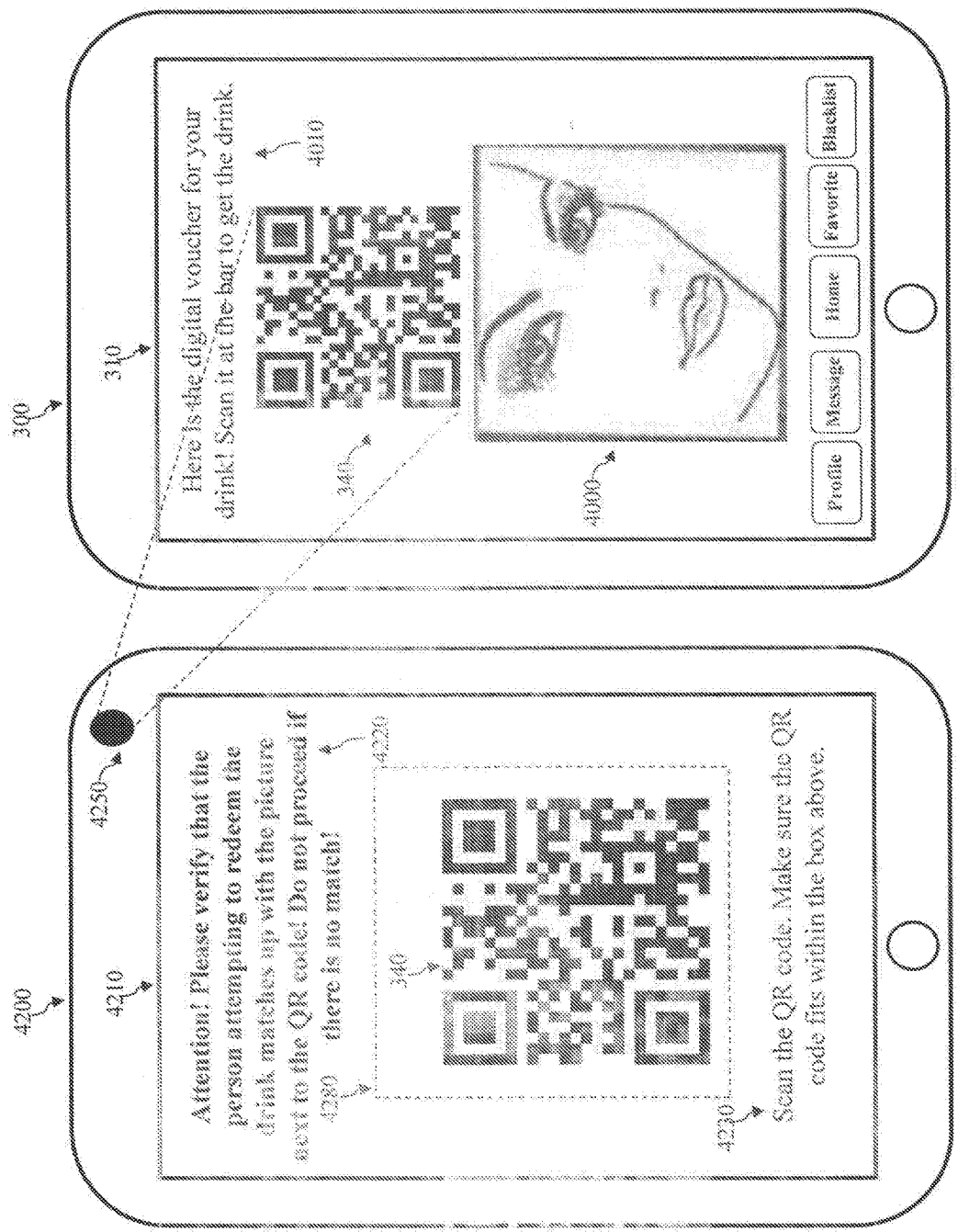

FIG. 55 illustrates an example scenario where the electronic voucher received by the user "Flirt" undergoes a redemption process. The person corresponding to the user "Flirt" presents the screen 310 displayed on the mobile computing device to a personnel at the venue. As discussed above, both the QR code 340 and the profile picture 4000 of the user "Flirt" are displayed on the screen a 310, such that the personnel at the venue can easily see the profile picture 4000.

The electronic voucher redemption process involves the personnel at the venue scanning the QR code 340 via another mobile device 4200, which may be a smartphone, a tablet computer, or a custom-made electronic scanner. As shown in FIG. 55, a screen 4210 of the mobile device 4200 displays a message 4220 prompting the personnel at the venue to verify that the person who is attempting to redeem the electronic voucher is indeed the person depicted in the profile picture. For example, the message 4220 may read, "Attention! Please verify that the person attempting to redeem the drink matches up with the picture next to the QR code! Do not proceed if there is no match!"

In response to this message 4220, the personnel at the venue will visually inspect the physical appearance of the person attempting to redeem the electronic voucher, as well as the profile picture 4000 displayed on the screen 310. Now suppose that the person who is attempting to redeem the electronic voucher is catfishing. For example, the person corresponding to the user "Flirt" may actually be a man who did not accurately represent his gender and did not provide an accurate profile picture of himself, but who uploaded an electronic photograph of a pretty girl (e.g., found on the Internet) instead. In essence, the man is pretending to be someone be is not—a pretty girl who is the person shown in the picture 4000. The motivation behind this may be to induce other users (users who may be attracted to the looks of the girl shown in the picture 4000) to buy drinks or other merchandise offered for sale at the venue. Of course, catfishing is not limited to people pretending to be a member of the opposite sex. It is possible that a female user who is not the girl shown in the picture 4000 is pretending to be that girl, perhaps because the actual female user is not as physically attractive as the girl shown in the picture 4000, and she thought that using a prettier girl's picture to represent herself will garner more attention from other users and consequently more free drink vouchers.

It is understood that though the examples above involve male or female users pretending to be an attractive woman, the same may occur with male or female users pretending to be an attractive man too. In that case, the person shown in the picture 4000 will be a man, while the actual person who claims to be that man may be a less attractive man or a woman.

Another possible scenario is that a man or a woman may use an outdated electronic photograph to represent himself/ herself. For example, the person who is representing herself as the user "Flirt" may have uploaded a picture of herself from 20 or 30 years ago. In other words, the actual person who is attempting to redeem the electronic voucher may be 20 or 30 years older man the girl shown in the picture 4000, even though they are the same person (just at quite different points in time). As such, the person shown in the picture 4000 is much more attractive than the actual person. As yet another example, the person may have uploaded a picture of herself/himself before that person put on a lot of weight. This also results in a scenario where the person shown in the picture 4000 is more attractive than the actual person, even if they are the same person.

In all of the above examples, the problem is that the electronic voucher is received under false pretenses. The other user—for example, "AverageJoe"—does not know what user "Flirt" actually looks like, so he makes the reasonable assumption that she looks like the person shown in the picture 4000. Any action "AverageJoe" takes to facilitate an interaction, with the "Flirt" is done so at least in part in reliance of "Flirt" looking like the person portrayed in her profile picture 4000. Therefore, "AverageJoe" will be disappointed if he finds out (either from personal experience or through other information sources) that "Flirt" is not really who "AverageJoe" thought she was based on the picture 4000. Had "AverageJoe" known what "Flirt" really looked like (e.g., "she" may be a man), "AverageJoe" most likely would have acted differently, for example by not sending "Flirt" a free electronic drink voucher in the first place.

As a result of Flirt's intentional (or even inadvertent) deception, "AverageJoe" (and other users like him) may be less interested in participating in the virtual social network. It can thus be concluded that, by not accurately representing her true physical appearance via the uploaded profile picture 4000, "Flirt" unfairly gains economic favors (e.g., by receiving free electronic drink vouchers) at the detriment of other users, while hurting the credibility of the virtual social network discussed herein. As such, this type of behavior should be disallowed. The present disclosure solves this issue by asking the personnel in charge of scanning the electronic voucher to verify that the person attempting to redeem the free drink is indeed the person shown in the profile picture 4000. In the various scenarios, discussed above, if the profile picture of "Flirt" does not match up with the physical appearance of the actual person who is representing herself as "Flirt", then the voucher will be denied. In other words, the venue will not perform an electronic scan of the QR code 340 and will deny her the free drink (or other types of merchandise item). As such, "Flirt" is deprived of any economic incentive for perpetrating the fraud of misrepresenting her physical appearance with the uploaded profile picture 4000. Consequently, "Flirt" will either provide a more accurate profile picture of herself (or himself) or may quit participating in the virtual social network altogether. Either of these results leads to a reduction in fraud and an improvement in the credibility and integrity of the virtual social network, which may attract more honest and more engaged/interested users.

It is understood that the implementation of displaying the user's profile picture alongside the digital code such as the QR code 340 not only results in greater user satisfaction of the virtual social network, but it also offers an improvement in the system running the virtual social network itself. For example, as a result of preventing or discouraging scams involving the generation of QR codes, fewer QR codes will need to be generated, since previously a number of these codes would have been generated as a result of fraud, and now they are not being generated altogether. This reduces the drain on the resources of the system, for example resources needed to generate and keep track of the QR codes. It also reduces unnecessary data transmission required to send the QR codes between users. Consequently, the overall system capacity and performance is improved due to a reduction in the unnecessary waste of system resources.

If the user "Flirt" has accurately represented her physical appearance by uploading a profile picture 4000 that does match up with her actual looks, the personnel at the venue in charge of scanning the electronic voucher may proceed with the electronic scan. As showing in the screen 4210 in FIG. 55, a message 4230 may be displayed to instruct the personnel on how to perform the electronic scan. The message 4230 may read, "Scan the QR code. Make sure the QR code fits within the box above." The mobile device 4200 includes an imaging device 4250, such as a camera, that is configured to perform an electronic scan of the QR code 340. The screen 4210 displays a box 4280. To perform the scan, the personnel at the venue activates the imaging device 4250 and holds the mobile device 4200 above the mobile computing device 300. At this point, a portion of the screen 310 is captured by the imaging device 4250 and shown in the box 4280. The personnel at the venue adjusts the position of the mobile computing device 300 or the position of the mobile device 4200 until the QR code 340 is completely displayed within the box 4280.

Once the QR code is completely captured within the box 4280, the electronic scan of the QR code 4280 either occurs automatically, or it can be triggered by the personnel by a suitable engagement with the mobile device 4200 (e.g., by pressing a physical or virtual button on the mobile device 4200). When the electronic scan of the QR code 340 is completed, the remote server 3420 (shown in FIG. 51) is notified, and the remote server 3420 processes the electronic transaction in which a corresponding drink (or other merchandise item) is redeemed in response to the electronic scan of the QR code 340. The personnel at the venue is then notified of the successful transaction and will give the user "Flirt" the free drink.

Figure 56:
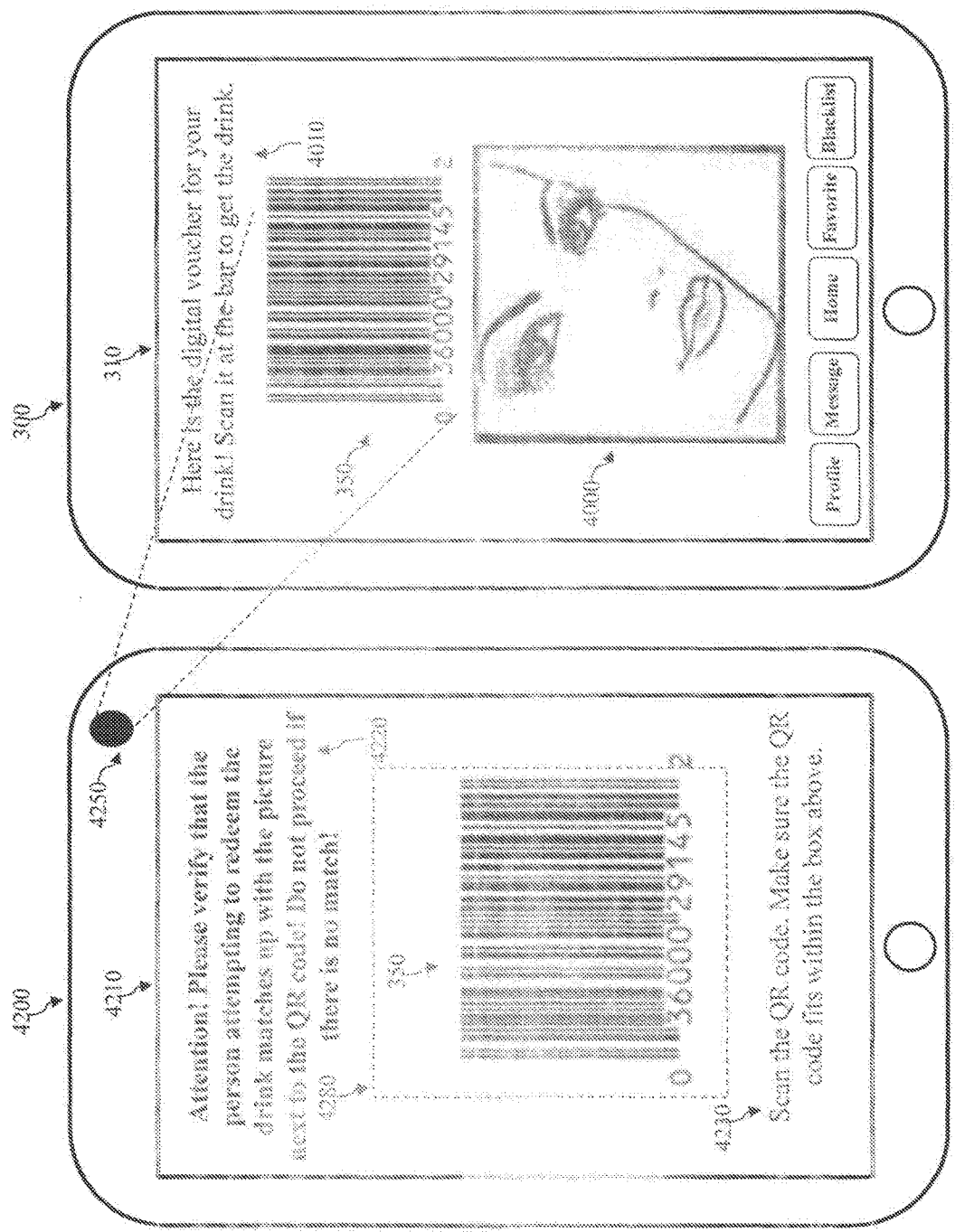

FIG. 56 illustrates an embodiment where the digital code being used for the electronic scan is the barcode 350, instead of the QR code 340. For reasons of clarity and consistency, the other elements appearing in FIGS. 55 and 56 are labeled the same. Similar to the embodiment discussed above in association with FIG. 55, the user Flirt's profile picture 4000 is displayed adjacent to the barcode 350 on the screen 310. When "Flirt" presents the barcode 350 to be electronically scanned by the mobile device 4200, the personnel at the venue can visually inspect the physical appearance of the users to make sure that it matches up with the person displayed in the profile picture 4000. The voucher will only be redeemed if there is a match, thereby taking away the economic incentive for potential "catfishing."

In addition to presenting the user's profile picture alongside the digital code corresponding to the redeemable item, the present disclosure further implements other measures to further reduce the perpetration of potential fraud. For example, the mobile computing device 300 includes a GPS sensor. The virtual social network is location-locked to within a predetermined distance of the GPS coordinates of the venue. For any user to be able to electronically check-in to the venue to participate on the social network, the remote server 3420 discussed above (or the mobile computing device of the user) will first extract the GPS coordinates of the user's mobile computing device, reported by its GPS sensor. The GPS coordinates of the mobile computing device are compared with the GPS coordinates of the venue, and if the GPS coordinates of the mobile computing device are within a predetermined radius of the GPS coordinates of the venue, then the user is allowed to check in and begin participating on the virtual social network.

This is advantageous over conventional virtual social networks where a user is typically allowed to electronically check in and interact with other users even if they are at drastically different physical locations. In that case, since neither user can see the other user (except their respective virtual profiles provided by themselves), the ease and likelihood of perpetrating fraud such as catfishing are much greater. In comparison, by restricting the access of the virtual social network to a particular physical locution, the present disclosure makes it more cumbersome for users to perpetrate fraud, because any user who intend on perpetrating fraud will have to physically visit and stay at the venue. Furthermore, the user perpetrating the fraud may be more easily discovered, since the victims of the fraud are at the same physical location. This further lessens the incentive for the user to perpetrate the fraud.

Figure 57:
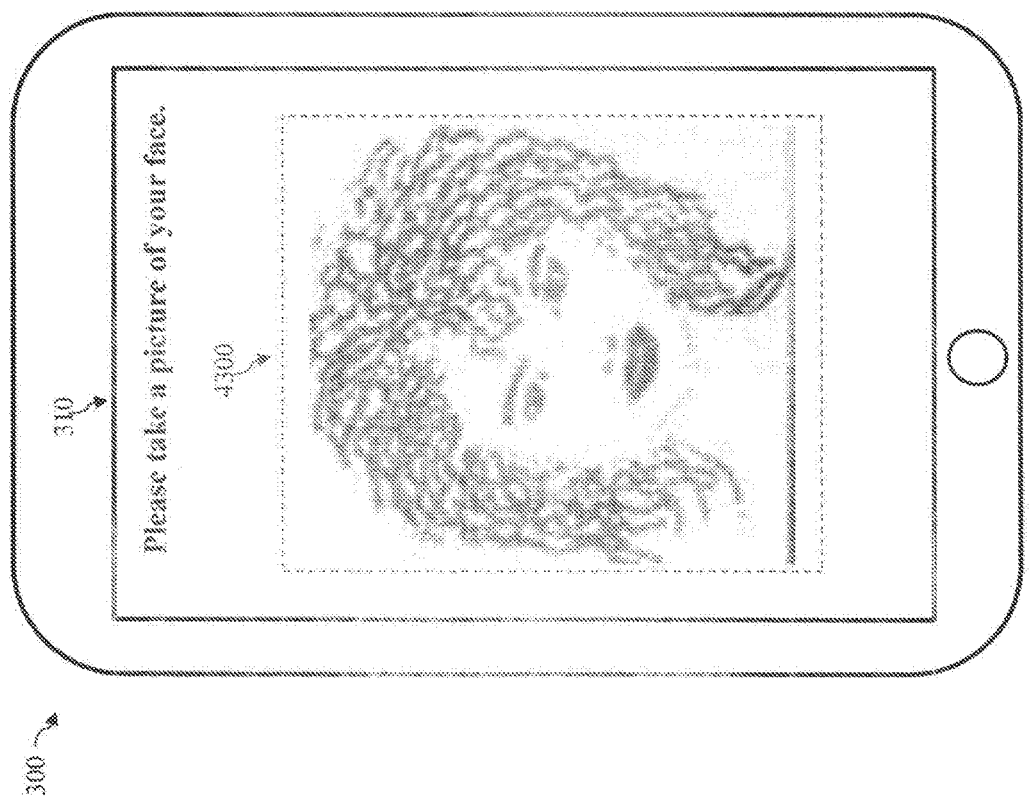

In some other embodiments, before the QR code or barcode is generated, the user who accepted the offer will be prompted to take a picture of himself/herself via its mobile computing device. An example of this is illustrated in FIG. 57, where the screen 310 of the mobile computing device of the user "Flirt" displays a message "Please take a picture of your face" after the user "Flirt" has accepted to receive the electronic drink voucher from the user "AverageJoe." The user "Flirt" may either take a "selfie", or may ask someone else to take a picture of herself. The resulting picture 4300 is shown in FIG. 57 as an example. A timestamp from the picture 4300 may be extracted to ensure that the picture 4300 is indeed recently taken (e.g., within the past hour of receiving the drink offer from the sender).

The remote server 3420 or the mobile computing device 300 then compares the picture 4300 with the profile picture 4000 previously uploaded by the user "Flirt." The comparison may involve breaking down the respective pictures into a plurality of pixels for each picture, and based on the pixels, identifying facial features such as eyes, eyebrows, hair, nose, mouth, forehead, cheeks, chin, etc. The comparison further includes checking for consistencies (or the lack thereof) between the identified facial features in the two respective pictures, such as consistencies in eye color, hair color, eye shape/size, mouth shape/size, nose shape/size, the distance between the eyes as a ratio of the size of the eyes, the distance between the nose and mouth as a ratio of the width of the mouth, the distance between the eyes and the eyebrows as a ratio if the distance between the eyes, etc.

The various consistencies or inconsistencies may be used to generate a matching score. For example, there may be a total of 10 different checks, and if there is consistency between each check, it results in a sub-score of 1. A perfect match for all the 10 checks will result in a total score of 10, whereas a total mismatch for all the 10 checks will result in a total score of 0. A match between some of the checks, but not the others, will result in a total score between 0 and 10. For any user, if the total score passes a predetermined threshold score (e.g., 5 or higher), then it may be deemed that there is a sufficient match between the profile picture 4000 previously uploaded by that user and the picture 4300 just taken by the user after receiving the drink offer. A corresponding digital code will be generated only if there is a sufficient match. Otherwise, the user may be prompted to retake the picture and run the comparison a few more times. If a sufficient match is still not satisfied, then the drink offer will be voided, and the buyer/sender of the drink will be refunded and notified that the recipient is likely not the person advertised in the profile picture 4000.

In the example, illustrated in FIG. 57, the person shown in the recently-taken picture 4300 is clearly not the same person shown in the previously uploaded profile picture of the user "Flirt", and this mismatch will be revealed by the comparison process discussed above. In other words, it is likely that the person representing herself as "Flirt" is using someone else's picture as her profile picture 4000 to induce other users to buy items for her. The present disclosure foils her plan and notifies the sender "Average Joe" as such. This implementation not only identities actual fraud (e.g., by checking for inconsistencies between the previously uploaded profile picture 4000 and the recently-taken picture 4000), but it also discourages users from attempting fraud in the first place, since they know that the fraud will likely be exposed before the free merchandise items can be redeemed, and they cannot derive any economic benefit from perpetrating the fraud.

As yet another example for further reducing fraud in the virtual social network, a user may be required to scan a QR code or a barcode in order to check in to the venue to participate in the virtual social network. For example, the user requests to check-in to a venue as discussed above with reference to FIG. 12. In response to this check-in request received from the user's mobile computing device, the remote server 3420 generates a QR code or a barcode specifically for that user and sends that code to the mobile computing device of the user. The user will have to present this QR code or barcode to a gate keeper at the venue, who uses an electronic scanner such as the mobile device 4200 to electronically scan the QR code or barcode on the user's mobile computing device. A successful scan of the QR code or barcode completes a digital check-in of the user. Compared to determining the user's location by GPS, requiring the user to scan the QR code or barcode is even more restrictive in terms of location accuracy. This ensures that any user participating in the location-based virtual social network is almost guaranteed to be at that venue.

In some embodiments, the user's profile picture (if the user has already completed a user profile registration previously) will be retrieved and displayed alongside the QR code or barcode on the user's mobile computing device, similar to the embodiments discussed above with reference to FIGS. 53-56. The gate keeper at the venue will not scan the QR code or barcode until he can visually inspect the physical appearance of the user to ensure that it matches with the physical appearance of the user portrayed in the picture displayed adjacent to the QR code or barcode. Again, this approach achieves the same benefits discussed above with respect to reducing catfishing or other fraud-related activities.

Figure 58:
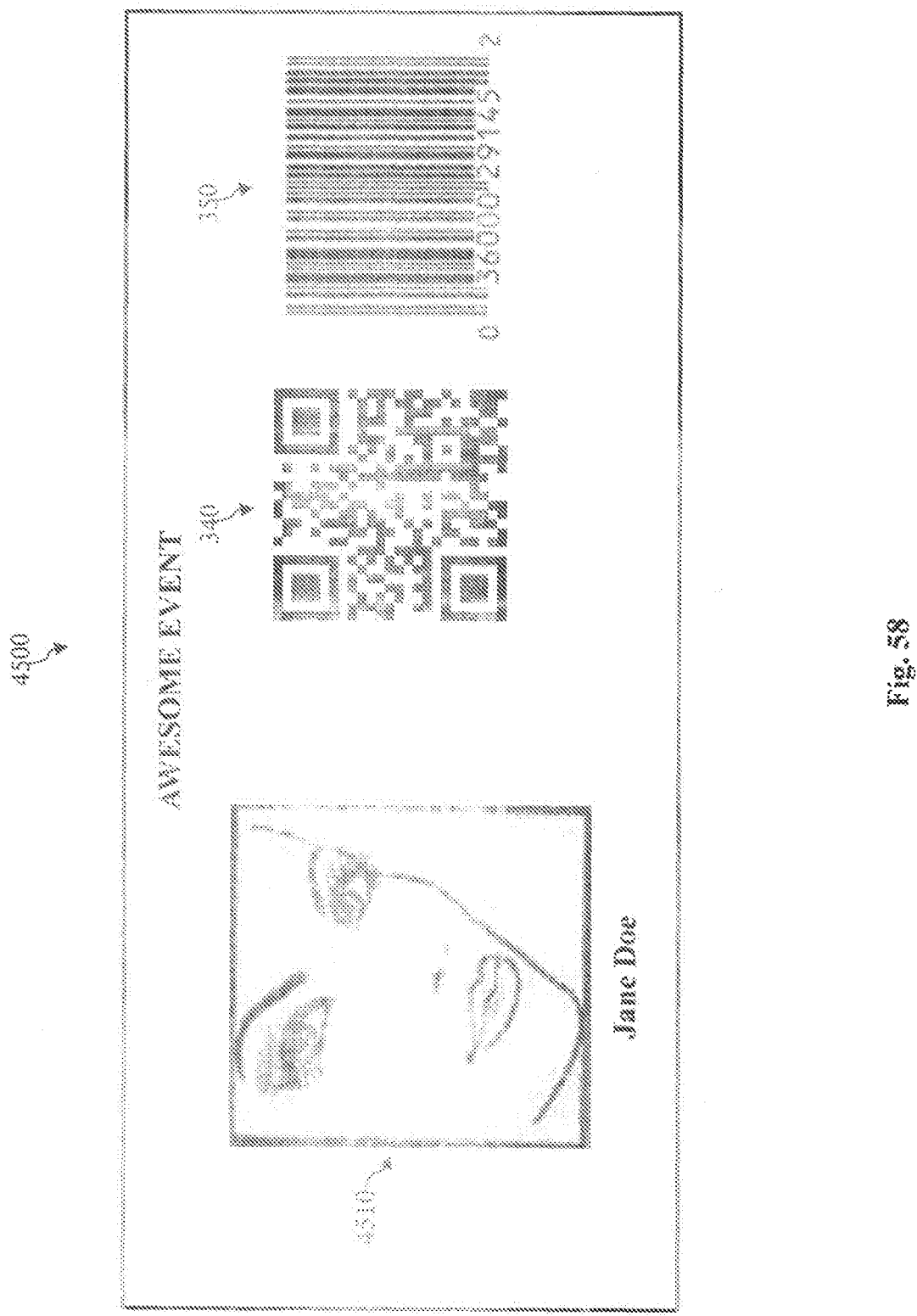
FIG. 58 is an example physical or electronic ticket according to various aspects of the present disclosure.

Although the example embodiments discussed above focus on the context of a virtual social network taking place at a physical venue, the various concepts discussed above may apply in other contexts as well. For example, they may be applied in a ticketing context. Referring to FIG. 58, an example ticket 4500 according to an embodiment of the present disclosure is illustrated. The ticket 4500 shows a title of the corresponding event (e.g., "AWESOME EVENT"). The ticket 4500 also shows a QR code 340 and/or a barcode 350. Either of these codes may be electronically scanned by a gate keeper at the event via a mobile scanning device, such as the mobile device 4200 discussed above. The scanning of the QR code 340 of the barcode 350 will correspond to a redemption (or use) of the ticket 4500.

The ticket 4500 also shows a picture 4510 of the user (e.g., Jane Doe) who is presenting the ticket. The picture 4510 may be obtained from the user when the user registered for the event or purchased the ticket electronically. For example, as a part of the ticket purchasing, the user may be asked to provide a digital picture 4000 of herself. The uploaded digital picture may be stored electronically in a server. Later, when the ticket 4500 is issued (either in paper copy or in an electronic copy, for example displayed as a screen on the mobile computing device of the user Jane Doe), the previously uploaded picture 4000 is retrieved and now displayed along with the QR code 340 or the barcode 350. When the user Jane Doe presents the ticket to the gate keeper, the gate keeper can visually inspect her and compare her physical appearance to the person portrayed in the picture 4510 to make sure that they match. Admission to the event will be granted only if there is a match. This will prevent other users from using Jane Doe's ticket, which may be with or without the user Jane Doe's permission.

Figure 59:
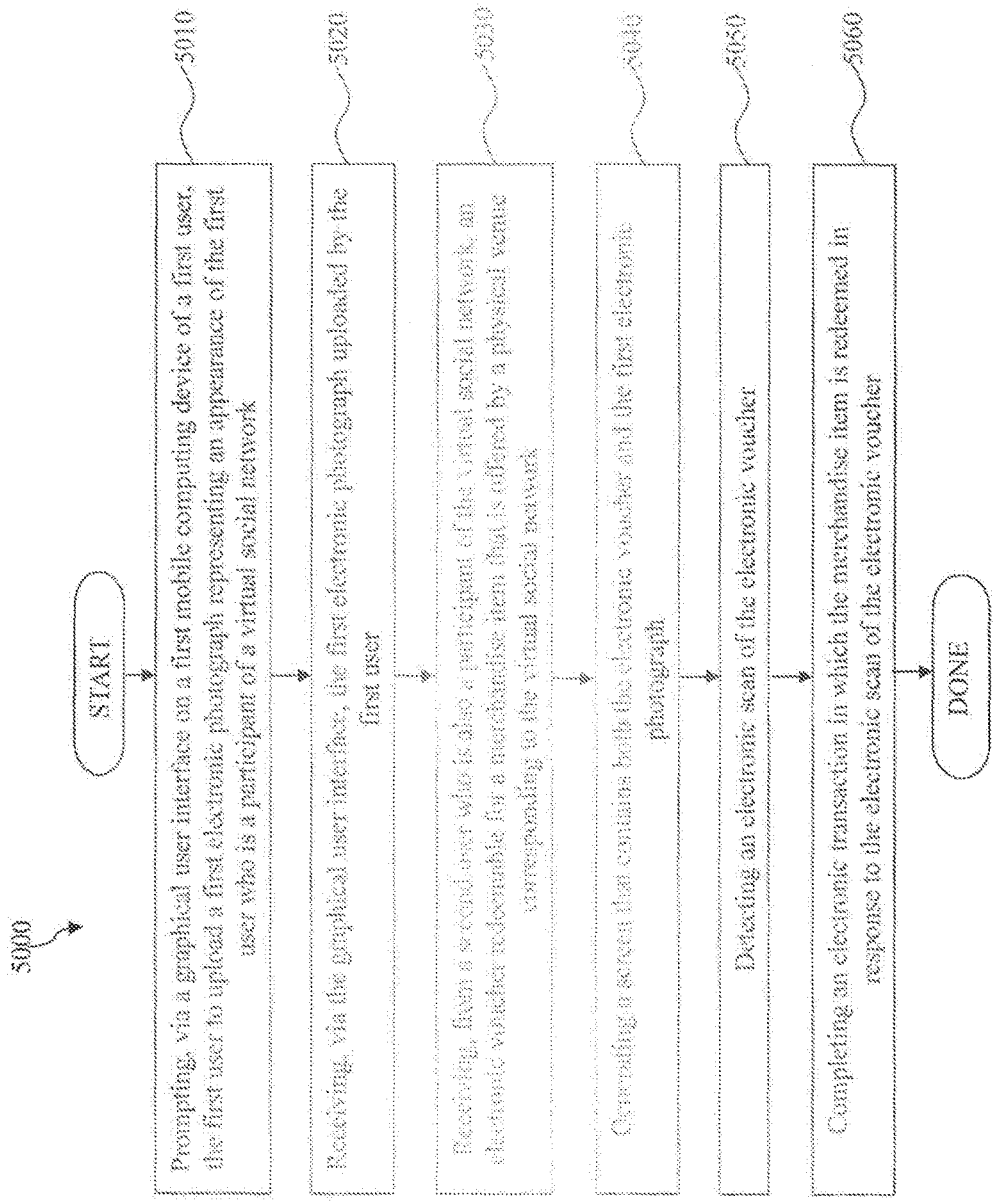

FIG. 59 is a simplified flowchart illustrating a method 5000 of reducing fraud in a location-based virtual social network. In some embodiments, the method 5000 is performed by a remote server (e.g., remotely located than the location of the virtual social network). In other embodiments, one or more steps of the method 5000 may be performed by a mobile computing device of a user.

The method 5000 includes a step 5010 of prompting, via a graphical user interface on a first mobile computing device of a first user, the first user to upload a first electronic photograph representing an appearance of the first user who is a participant of a virtual social network. In some embodiments, the prompting comprises prompting the first user to upload the electronic photograph as a part of a registration of the first user to participate in the virtual social network.

The method 5000 includes a step 5020 of receiving, via the graphical user interface, the first electronic photograph uploaded by the first user.

The method 5000 includes a step 5030 of receiving, from a second user who is also a participant of the virtual social network, an electronic voucher redeemable for a merchandise item that is offered by a physical venue corresponding to the virtual social network. In some embodiments, the electronic voucher comprises a QR code or a barcode that is digital associated with the merchandise item.

The method 5000 includes a step 5040 of generating a screen that contains both the electronic voucher and the first electronic photograph. In some embodiments, the screen is generated to be free of any name of the first user.

The method 5000 includes a step 5050 of detecting an electronic scan of the electronic voucher.

The method 5000 includes a step 5060 of completing an electronic transaction in which the merchandise item is redeemed in response to the electronic scan of the electronic voucher.

It is understood that, unless otherwise specified, the steps 5010-5060 of the method 5000 are not necessarily performed in numerical order. It is also understood that addition steps may be performed before, during, or after the steps 5010-5060. For example, the method 5000 may include a step of causing instructions to be displayed on a mobile device used to scan the electronic voucher. The instructions prompt a verification that a physical appearance of the first user matches with the first electronic photograph displayed on the screen. As another example, the method 5000 may include a step of detecting, via a global positioning system (GPS) sensor on the first mobile computing device, that the first user is physically present at the venue. As yet another example, the method 5000 may include the following steps: prompting, after the electronic voucher has been received, the first user to take a second electronic photograph representing an appearance of the first user via the first mobile computing device; receiving the second electronic photograph; digitally comparing the first electronic photograph with the second electronic photograph; determining, based on the digitally comparing, whether the first electronic photograph and the second electronic photograph both represent a same person; and denying a redemption of the electronic voucher in response to a determination that the first electronic photograph and the second electronic photograph do not represent the same person. And for reasons of simplicity, other additional steps are not discussed in detail herein.

FIG. 60 is a simplified flowchart illustrating a method 6000 of reducing fraud in a location-based virtual social network. In some embodiments, the method 6000 is performed by a remote server (e.g., remotely located than the location of the virtual social network). In other embodiments, one or more steps of the method 6000 may be performed by a mobile computing device of a user.

The method 6000 includes a step 6010 of causing a profile picture of a first user to be displayed on a mobile computing device of a second user.

The method 6000 includes a step 6020 of receiving an offer from the second user to purchase an item for a first user, the item being offered at a physical venue. The first user and the second user are participants of a virtual social network that is geo-fenced to the physical venue.

The method 6000 includes a step 6030 of detecting, from the first user, an acceptance of the offer.

The method 6000 includes a step 6040 of generating, in response to the acceptance of the offer, an electronically scan-able digital code for redeeming the item at the physical venue. In some embodiments, the scan-able digital code includes a barcode or a quick response (QR) code.

The method 6000 includes a step 6050 of displaying, via a mobile electronic device of the first user, the digital code adjacent to a digital copy of a profile picture uploaded by the first user, the profile picture being uploaded by the first user prior to the receiving of the offer.

The method 6000 includes a step 6060 of detecting an electronic scan of the digital code.

The method 6000 includes a step 6070 of completing an electronic transaction in which the item is redeemed in response to the electronic scan of the digital code.

It is understood that, unless otherwise specified, the steps 6010-6070 of the method 6000 are not necessarily performed in numerical order. It is also understood that addition steps may be performed before, during, or after the steps 6010-6070. For example, the method 6000 may include a step of communicating instructions to a person at the venue in charge of scanning the digital code to verify that the digital copy of the profile picture is consistent with a physical appearance of the first user.

It should be appreciated that like reference numerals in the present disclosure are used to identify like elements illustrated in one or more of the figures, wherein these label figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system for reducing fraud in a location-based virtual social network, comprising:
    an electronic memory storage configured to store computer-readable programming instructions; and
    one or more electronic processors configured to execute the computer-readable programming instructions to perform operations comprising:
        prompting, via a graphical touchscreen user interface on a first mobile computing device of a first user, the first user to upload a first electronic photograph representing a first appearance of the first user who is a participant of a virtual social network;
        receiving, via the first mobile computing device, the first electronic photograph uploaded by the first user;
        receiving, from a second mobile computing device of a second user who is also a participant of the virtual social network, a request to generate and send an electronic voucher to the first mobile computing device, the electronic voucher being redeemable for a merchandise item that is offered by a physical venue corresponding to the virtual social network;
        prompting, in response to receiving the request from the second mobile computing device, the first user to take a second electronic photograph of the first user via the first mobile computing device, the second electronic photograph representing a second appearance of the first user at a time the request from the second mobile computing device is received;
        receiving, via the first mobile computing device, the second electronic photograph taken by the first user;
        extracting a timestamp from the received second electronic photograph;
        determining, based on the timestamp, whether the second electronic photograph was taken within a predetermined timeframe from the time the request from the second mobile computing device is received;
        in response to a determination that the second electronic photograph was taken within the predetermined timeframe from the time the request from the second mobile computing device is received, digitally comparing the first electronic photograph with the second electronic photograph;
        determining, based on the digitally comparing, whether the first electronic photograph and the second electronic photograph represent a same person;
        generating, in response to a determination that the first electronic photograph and the second electronic photograph represent the same person, a screen that contains both the electronic voucher and the first electronic photograph, wherein the electronic voucher comprises a QR code or a barcode that is digitally associated with the merchandise item; and
        wirelessly transmitting the screen to the first mobile computing device.

2. The system of claim 1, wherein the operations further comprise: causing instructions to be displayed on a mobile device used to scan the electronic voucher, the instructions prompting a verification that a physical appearance of the first user matches with the first electronic photograph displayed on the screen.

3. The system of claim 1, wherein the operations further comprise:
    detecting an electronic scan of the electronic voucher; and
    completing an electronic transaction in which the merchandise item is redeemed in response to the electronic scan of the electronic voucher.

4. The system of claim 1, wherein the operations further comprise: detecting, via a global positioning system (GPS) sensor on the first mobile computing device, that the first user is physically present at the venue.

5. The system of claim 1, wherein the operations further comprise: in response to a determination that the second electronic photograph was taken outside the predetermined timeframe from the time the request from the second mobile computing device is received, declining the request from the second user to generate and send an electronic voucher to the first mobile computing device.

6. The system of claim 1, wherein the screen is generated to contain no name of the first user.

7. The system of claim 1, wherein the prompting the first user to upload the first electronic photograph comprises prompting the first user to upload the first electronic photograph as a part of an initial registration of the first user to participate in the virtual social network.

8. The system of claim 1, wherein the operations further comprise:
    preventing the electronic voucher from being redeemed in response to a determination that the first electronic photograph and the second electronic photograph do not represent the same person.

9. The system of claim 1, wherein the electronic memory storage and the one or more electronic processors are implemented on one of: a server remotely located from the physical venue, or the first mobile computing device.

10. A method of reducing fraud in a location-based virtual social network, comprising:
    prompting, via a graphical user interface on a first mobile computing device of a first user, the first user to upload a first electronic photograph representing a first appearance of the first user who is a participant of a virtual social network;
    receiving, via the first mobile computing device, the first electronic photograph uploaded by the first user;
    receiving, from a second mobile computing device of a second user who is also a participant of the virtual social network, a request to generate and send an electronic voucher to the first mobile computing device, the electronic voucher being redeemable for a merchandise item that is offered by a physical venue corresponding to the virtual social network;

prompting, in response to receiving the request from the second mobile computing device, the first user to take a second electronic photograph of the first user via the first mobile computing device, the second electronic photograph representing a second appearance of the first user at a time the request from the second mobile computing device is received;

receiving, via the first mobile computing device, the second electronic photograph taken by the first user;

extracting a timestamp from the received second electronic photograph;

determining, based on the timestamp, whether the second electronic photograph was taken within a predetermined timeframe from the time the request from the second mobile computing device is received;

in response to a determination that the second electronic photograph was taken within the predetermined timeframe from the time the request from the second mobile computing device is received, digitally comparing the first electronic photograph with the second electronic photograph;

determining, based on the digitally comparing, whether the first electronic photograph and the second electronic photograph represent a same person;

generating, in response to a determination that the first electronic photograph and the second electronic photograph represent the same person, a screen that contains both the electronic voucher and the first electronic photograph, wherein the electronic voucher comprises a QR code or a barcode that is digitally associated with the merchandise item; and wirelessly transmitting the screen to the first mobile computing device.

11. The method of claim 10, further comprising: causing instructions to be displayed on a mobile device used to scan the electronic voucher, the instructions prompting a verification that a physical appearance of the first user matches with the first electronic photograph displayed on the screen.

12. The method of claim 10, further comprising:
detecting an electronic scan of the electronic voucher; and
completing an electronic transaction in which the merchandise item is redeemed in response to the electronic scan of the electronic voucher.

13. The method of claim 10, further comprising: detecting, via a global positioning system (GPS) sensor on the first mobile computing device, that the first user is physically present at the venue.

14. The method of claim 10, further comprising: in response to a determination that the second electronic photograph was taken outside the predetermined timeframe from the time the request from the second mobile computing device is received, declining the request from the second user to generate and send an electronic voucher to the first mobile computing device.

15. The method of claim 10, wherein the screen is generated to be free of any name of the first user.

16. The method of claim 10, wherein the prompting the first user to upload the first electronic photograph comprises prompting the first user to upload the first electronic photograph as a part of an initial registration of the first user to participate in the virtual social network.

17. The method of claim 10, further comprising:
denying a redemption of the electronic voucher in response to a determination that the first electronic photograph and the second electronic photograph do not represent the same person.

18. A non-transitory machine-readable medium having stored thereon machine readable instructions executable to cause operations comprising:

prompting, via a graphical touchscreen user interface on a first mobile computing device of a first user, the first user to upload a first electronic photograph representing a first appearance of the first user who is a participant of a virtual social network;

receiving, via the first mobile computing device, the first electronic photograph uploaded by the first user;

receiving, from a second mobile computing device of a second user who is also a participant of the virtual social network, a request to generate and send an electronic voucher to the first mobile computing device, the electronic voucher being redeemable for a merchandise item that is offered by a physical venue corresponding to the virtual social network;

prompting, in response to receiving the request from the second mobile computing device, the first user to take a second electronic photograph of the first user via the first mobile computing device, the second electronic photograph representing a second appearance of the first user at a time the request from the second mobile computing device is received;

receiving, via the first mobile computing device, the second electronic photograph taken by the first user;

extracting a timestamp from the received second electronic photograph;

determining, based on the timestamp, whether the second electronic photograph was taken within a predetermined timeframe from the time the request from the second mobile computing device is received;

in response to a determination that the second electronic photograph was taken within the predetermined timeframe from the time the request from the second mobile computing device is received, digitally comparing the first electronic photograph with the second electronic photograph;

determining, based on the digitally comparing, whether the first electronic photograph and the second electronic photograph represent a same person;

generating, in response to a determination that the first electronic photograph and the second electronic photograph represent the same person, a screen that contains both the electronic voucher and the first electronic photograph, wherein the electronic voucher comprises a QR code or a barcode that is digitally associated with the merchandise item; and wirelessly transmitting the screen to the first mobile computing device.

19. The non-transitory machine-readable medium of claim 18, wherein the operations further comprise:
detecting an electronic scan of the electronic voucher; and
completing an electronic transaction in which the merchandise item is redeemed in response to the electronic scan of the electronic voucher.

20. The non-transitory machine readable medium of claim 18, wherein the operations further comprise: detecting, via a global positioning system (GPS) sensor on the first mobile computing device, that the first user is physically present at the venue.

* * * * *